United States Patent
Huang et al.

(10) Patent No.: US 12,440,295 B2
(45) Date of Patent: Oct. 14, 2025

(54) PORT PLACEMENT ASSISTANCE

(71) Applicant: Auris Health, Inc., Redwood City, CA (US)

(72) Inventors: Yanan Huang, Sunnyvale, CA (US); Suryansh Saxena, Noida (IN)

(73) Assignee: Auris Health, Inc., Santa Clara, CA (US)

( * ) Notice: Subject to any disclaimer, the term of this patent is extended or adjusted under 35 U.S.C. 154(b) by 174 days.

(21) Appl. No.: 18/089,464

(22) Filed: Dec. 27, 2022

(65) Prior Publication Data

US 2023/0200922 A1 Jun. 29, 2023

Related U.S. Application Data

(60) Provisional application No. 63/294,384, filed on Dec. 28, 2021.

(51) Int. Cl.
| | |
|---|---|
| *A61B 34/37* | (2016.01) |
| *A61B 17/34* | (2006.01) |
| *A61B 17/00* | (2006.01) |
| *A61B 34/00* | (2016.01) |
| *A61B 90/00* | (2016.01) |

(52) U.S. Cl.
CPC .......... *A61B 34/37* (2016.02); *A61B 17/3423* (2013.01); *A61B 2017/00199* (2013.01); *A61B 2034/252* (2016.02); *A61B 2090/061* (2016.02)

(58) Field of Classification Search
CPC ..... A61B 34/30; A61B 34/37; A61B 17/3423; A61B 2034/252; A61B 2017/00199; A61B 2090/061; A61B 2034/301; A61B 2034/302; A61B 2034/303
See application file for complete search history.

(56) References Cited

U.S. PATENT DOCUMENTS

| | | | |
|---|---|---|---|
| 9,763,741 B2 | 9/2017 | Alvarez et al. | |
| 2014/0148816 A1 | 5/2014 | McDonald et al. | |
| 2018/0325608 A1* | 11/2018 | Kang | ............. A61B 17/1671 |
| 2019/0321115 A1* | 10/2019 | Anderson | .......... A61B 17/3423 |
| 2019/0380794 A1* | 12/2019 | Al Jewad | ............... A61B 34/20 |
| 2020/0311928 A1 | 10/2020 | Ashida | |
| 2020/0330166 A1* | 10/2020 | Meglan | ............. A61B 17/3423 |
| 2020/0345438 A1* | 11/2020 | Stricko, III | ............ A61B 34/35 |
| 2021/0113239 A1 | 4/2021 | Donovan | |
| 2021/0145523 A1 | 5/2021 | Xing et al. | |
| 2021/0192759 A1 | 6/2021 | Lang | |
| 2023/0081437 A1 | 3/2023 | Russell | |

* cited by examiner

*Primary Examiner* — Tuan V Nguyen
(74) *Attorney, Agent, or Firm* — FROST BROWN TODD LLP

(57) ABSTRACT

Robotic medical systems may provide port placement guidance to a physician before incisions are made in a patient. A robotic medical system can include a robotic arm and a measurement tool coupled to the robotic arm. The robotic medical system can be configured to determine, based on a location of the measurement tool, a user-selected location for placing a port on a patient. The robotic medical system can compare the user-selected location with a recommended location for placing the port on the patient and provide a notification in accordance with the comparison.

19 Claims, 41 Drawing Sheets

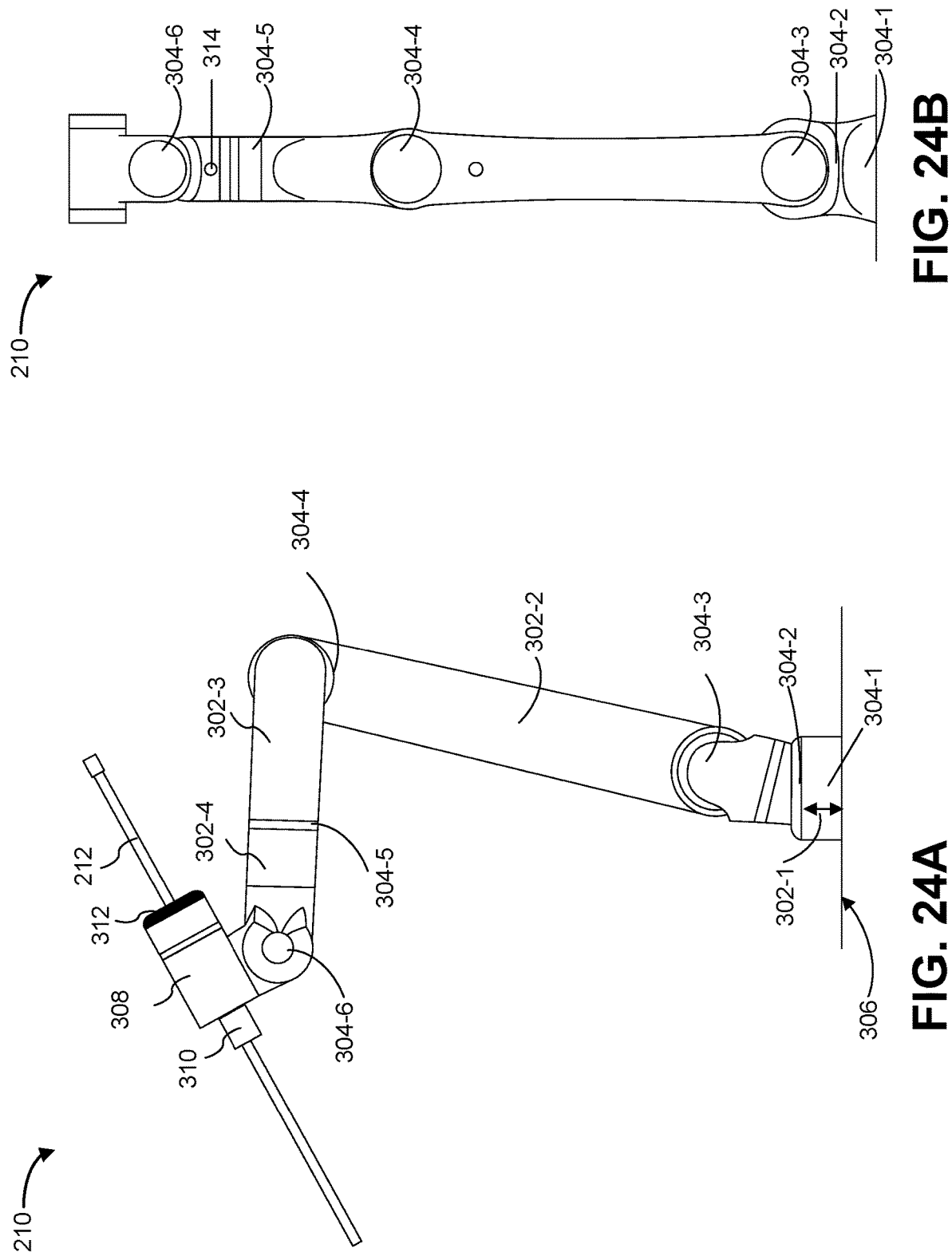

PORT PLACEMENT ASSISTANCE

CROSS-REFERENCE TO RELATED APPLICATION(S)

This application claims the benefit of U.S. Provisional Application No. 63/294,384, filed on Dec. 28, 2021, entitled "Port Placement Assistance," which is hereby incorporated by reference in its entirety.

TECHNICAL FIELD

The systems and methods disclosed herein are directed to robotic medical systems, and more particularly to configuring robotically controlled arms of robotic medical systems for medical (e.g., surgical) procedures.

BACKGROUND

A robotically enabled medical system is capable of performing a variety of medical procedures, including both minimally invasive procedures, such as laparoscopy, and non-invasive procedures, such as endoscopy (e.g., bronchoscopy, ureteroscopy, gastroscopy, etc.).

Such robotic medical systems may include robotic arms configured to control the movement of medical tool(s) during a given medical procedure. In order to achieve a desired pose of a medical tool, a robotic arm may be placed into a particular pose during a set-up process or during teleoperation. Some robotically enabled medical systems may include an arm support (e.g., a bar) that is connected to respective bases of the robotic arms and supports the robotic arms.

SUMMARY

For minimally invasive procedures, it is important to place ports at correct locations. Ports define entry points for surgical tools, and thus, incorrect placement of ports can lead to difficulties throughout the minimally invasive procedures, especially with manipulation of surgical tools.

Accordingly, there is a need for a method that can provide the port placement guidance or assistance to a physician. As disclosed herein, a robotic medical system can include a port placement assistance mode that assists a physician to determine patient port locations before the physician makes the incisions in the patient. Port placement guidance enables port locations to be determined more accurately based on information available to the robotic medical system. The robotic medical system can provide port placement assistance after the robotic arms (and/or the adjustable arm supports coupled thereto) are moved to an initial docking pose, and prior to docking of the robotic arms. For example, after the robotic arms and/or the adjustable arm supports are moved to an initial docking phase, the port placement assistance mode can be activated either manually (e.g., via user input on a display device or a user interface of the robotic medical system) or automatically (e.g., via automatic detection by the robotic medical system of a measurement tool for port placement).

As disclosed herein, the robotic medical system can include a robotic arm that is coupled to a measurement tool for port placement. The physician can position the measurement tool at or near a user-selected port location (e.g., an intended location) for the incision. The robotic medical system can then determine the user-selected port location (e.g., via the measurement tool) and compare it to a recommended port location based on a procedure development model (e.g., based on a type of procedure and/or machine learning). In accordance with a determination that the user-selected port location deviates from the recommended port location, the robotic medical system can provide a recommendation to a user (e.g., a physician, physician assistant, operator, etc.) as to how to reconcile the difference.

As disclosed herein, the robotic medical system can display the recommendation on a display device or a user interface of the robotic medical system. The recommendation can include guidance to the user to move at least a portion of the robotic arm from the user-selected port location to the recommended port location. In some embodiments, the user can move the robotic arm (and the corresponding measurement tool) to the recommended port location manually. In some embodiments, the robotic medical system can cause (e.g., execute) robotic movement, to automatically move at least a portion of the robotic arm (and the corresponding measurement tool) from the user-selected port location to the recommended port location.

As disclosed herein, in some embodiments, the measurement tool comprises a designated stylus tool with a tip (e.g., a blunt tip). In some embodiments, the measurement tool can be an accessory such as a cannula that serves as a measuring tip during port placement assistance mode. In some embodiments, the measurement tool can be a laser or a sensor that is positioned on an end effector of the robotic arm. In some embodiments, the measurement tool is detachably coupled to the robotic arm. In some embodiments, the measurement tool is integrated with the robotic arm.

Accordingly, the systems and/or methods disclosed herein advantageously improve the setup process and/or patient safety during surgery. For example, the port placement locations can be determined more accurately before incisions are made to the patient. This leads to a better user experience for a physician because the physician can reach the target anatomy safely and efficiently.

The systems, methods and devices of this disclosure each have several innovative aspects, no single one of which is solely responsible for the desirable attributes disclosed herein.

In accordance with some embodiments of the present disclosure, a robotic medical system includes a robotic arm and a measurement tool coupled to the robotic arm. The robotic medical system includes one or more processors and memory. The memory stores instructions that, when executed by the one or more processors, cause the one or more processors to determine, based on a location of the measurement tool, a user-selected location for placing a port on a patient and compare the user-selected location with a recommended location for placing the port on the patient. The recommended location is based on a procedure model. The memory also stores instructions that, when executed by the one or more processors, cause the one or more processors to provide a notification in accordance with the comparison.

In some embodiments, the notification includes a recommendation to place the port at the recommended location instead of the user-selected location.

In some embodiments, the memory further includes instructions that, when executed by the one or more processors, cause the one or more processors to generate the recommendation in accordance with a determination that a distance between the user-selected location and the recommended location exceeds a threshold distance.

In some embodiments, the robotic medical system includes a display device. The memory further includes instructions that, when executed by the one or more processors, cause the one or more processors to display the recommendation on the display device.

In some embodiments, the robotic medical system provides a user interface for moving the robotic arm. The memory further includes instructions that, when executed by the one or more processors, cause the one or more processors to: receive, via the user interface, a user request for activating movement of at least a portion of the robotic arm; and in response to receiving the request, cause robotic movement of the at least a portion of the robotic arm. The robotic movement causes a corresponding movement of the measurement tool from the user-selected location to the recommended location.

In some embodiments, the memory further includes instructions that, when executed by the one or more processors, cause the one or more processors to retract the measurement tool prior to causing the robotic movement.

In some embodiments, the robotic medical system provides a user interface for moving the robotic arm. The memory further includes instructions that, when executed by the one or more processors, cause the one or more processors to receive, via the user interface, a user request for activating a manual manipulation mode that allows manual movement of at least a portion of the robotic arm; and in response to receiving the request, activate the manual manipulation mode. The manual movement causes a corresponding movement of the measurement tool.

In some embodiments, the memory further includes instructions that, when executed by the one or more processors, cause the one or more processors to retract the measurement tool prior to activating the manual manipulation mode.

In some embodiments, comparing the user-selected location with the recommended location includes determining a separation distance between the user-selected location and the recommended location.

In some embodiments, comparing the user-selected location with the recommended location includes determining a difference between a first distribution of a plurality of first user-selected locations and a second distribution of a plurality of first recommended locations. The plurality of first user-selected locations includes the user-selected location and the plurality of first recommended locations includes the recommended location.

In some embodiments, the memory further includes instructions that, when executed by the one or more processors, cause the one or more processors to determine the location of the measurement tool based on a configuration of the robotic arm.

In some embodiments, the memory further includes instructions that, when executed by the one or more processors, cause the one or more processors to determine information of the patient based on the user-selected port location.

In some embodiments, the memory further includes instructions that, when executed by the one or more processors, cause the one or more processors to, prior to comparing the user-selected location with the recommended location, generate the recommended location based on the procedure model and the information of the patient.

In some embodiments, the procedure model is based on a procedure type.

In some embodiments, the memory further includes instructions that, when executed by the one or more processors, cause the one or more processors to activate a port placement assistance mode based on a user input. The determining, comparing, and providing are performed in accordance with a determination that the robotic medical system is in the port placement assistance mode.

In some embodiments, the memory further includes instructions that, when executed by the one or more processors, cause the one or more processors to: detect removal of the measurement tool from the robotic arm; and in response to detecting the removal, deactivate the port placement assistance mode.

In some embodiments, the memory further includes instructions that, when executed by the one or more processors, cause the one or more processors to, after deactivating the port placement assistance mode: (i) determine a pre-docking pose of the robotic arm based on the recommended location; and (ii) cause movement of the robotic arm to the pre-docking pose in accordance with the determination.

In some embodiments, the memory further includes instructions that, when executed by the one or more processors, cause the one or more processors to: (i) detect the coupling of the measurement tool to the robotic arm; and (ii) in response to detecting the coupling, activate a port placement assistance mode on the robotic medical system. The determining, comparing, and providing are performed in accordance with a determination that the robotic medical system is in the port placement assistance mode.

In some embodiments, the memory further includes instructions that, when executed by the one or more processors, cause the one or more processors to: (i) detect removal of the measurement tool from the robotic arm; and (ii) in response to detecting the removal, deactivate the port placement assistance mode.

In some embodiments, the memory further includes instructions that, when executed by the one or more processors, cause the one or more processors to, after deactivating the port placement assistance mode: (i) determine a pre-docking pose of the robotic arm based on the recommended location; and (ii) cause movement of the robotic arm to the pre-docking pose in accordance with the determination.

In some embodiments, the measurement tool comprises a tool for making a physical contact with a patient.

In some embodiments, the tool comprises a cannula.

In some embodiments, the tool comprises a stylus.

In some embodiments, the measurement tool comprises a non-contact tool capable of locating a surface on a patient without a physical contact.

In some embodiments, the non-contact tool comprises a laser or sensor coupled to a distal end of the robotic arm.

In accordance with some embodiments of the present disclosure, a method is performed by a medical robotic system. The robotic medical system includes a robotic arm and a measurement tool coupled to the robotic arm. The method includes determining, based on a location of the measurement tool, a user-selected location for placing a port on a patient. The method includes comparing the user-selected location with a recommended location for placing the port on the patient. The recommended location is based on a procedure model. The method also includes providing a notification in accordance with the comparison.

In some embodiments, the method further includes, prior to the determining, receiving user selection of a procedure to be performed on the patient. The method further includes causing movement of the robotic arm to a pre-docking pose based on the selected procedure.

In some embodiments, the method further includes, while the robotic arm is in the pre-docking pose, receiving a user request for activating a manual manipulation mode that allows manual movement of at least a portion of the robotic arm. The method includes in response to receiving the request, activating the manual manipulation mode. The manual movement causes a corresponding movement of the measurement tool.

In some embodiments, the method further includes activating a port placement assistance mode based on a user input. The determining, comparing, and providing are performed in accordance with a determination that the robotic medical system is in the port placement assistance mode.

In some embodiments, the method further includes detecting a coupling of the measurement tool to the robotic arm. The method further includes in response to detecting the coupling, activating a port placement assistance mode on the robotic medical system. The determining, comparing, and providing are performed in accordance with a determination that the robotic medical system is in the port placement assistance mode.

In some embodiments, the robotic medical system includes a display device. The method further includes prior to the determining, receiving user selection of a procedure to be performed on the patient. The recommended location for placing the port on the patient is based on the selected procedure. The method further includes displaying, on the display device, a visualization of one or more port placement locations corresponding to the selected procedure, the one or more port placement locations including the recommended port location.

In some embodiments, the notification includes a recommendation to place the port at the recommended location instead of the user-selected location.

In some embodiments, the method further includes generating the recommendation in accordance with a determination that a distance between the user-selected location and the recommended location exceeds a threshold distance.

In some embodiments, the method further includes receiving a user request for activating movement of at least a portion of the robotic arm. The method further includes in response to receiving the request, causing robotic movement of the at least a portion of the robotic arm. The robotic movement causes a corresponding movement of the measurement tool from the user-selected location to the recommended location.

In some embodiments, the method further includes retracting the measurement tool prior to causing the robotic movement.

In some embodiments, the method further includes, after causing the robotic movement of the at least a portion of the robotic arm, receiving a user request for activating movement of the robotic arm to a predefined pose. The method further includes in response to the user request, causing movement of at least a portion of the robotic arm.

In some embodiments, the method further includes detecting removal of the measurement tool from the robotic arm. The method further includes in response to detecting the removal, causing movement of the robotic arm from the predefined pose to a pre-docking pose.

In accordance with some embodiments of the present disclosure, a robotic medical system includes a robotic arm, a measurement tool coupled to the robotic arm, one or more processors, and memory. The memory stores instructions that, when executed by the one or more processors, cause the one or more processors to perform any of the methods disclosed herein.

In accordance with some embodiments of the present disclosure, a non-transitory computer-readable storage medium stores one or more programs configured for execution by a robotic medical system that includes a robotic arm, a measurement tool coupled to the robotic arm, one or more processors, and memory. The one or more programs include instructions for performing any of the methods described herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 24A to 24C illustrate different views of an exemplary robotic arm according to some embodiments.

DETAILED DESCRIPTION

1. Overview

Aspects of the present disclosure may be integrated into a robotically enabled medical system capable of performing a variety of medical procedures, including both a minimally invasive procedure, such as laparoscopy, and a non-invasive procedure, such as endoscopy. Among endoscopy procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various embodiments will be described below in conjunction with the drawings for purposes of illustration. It should be appreciated that many other embodiments of the disclosed concepts are possible, and various advantages can be achieved with the disclosed embodiments. Headings are included herein for reference and to aid in locating various sections. These headings are not intended to limit the scope of the concepts described with respect thereto. Such concepts may have applicability throughout the entire specification.

A. Robotic System—Cart.

Figure 1:
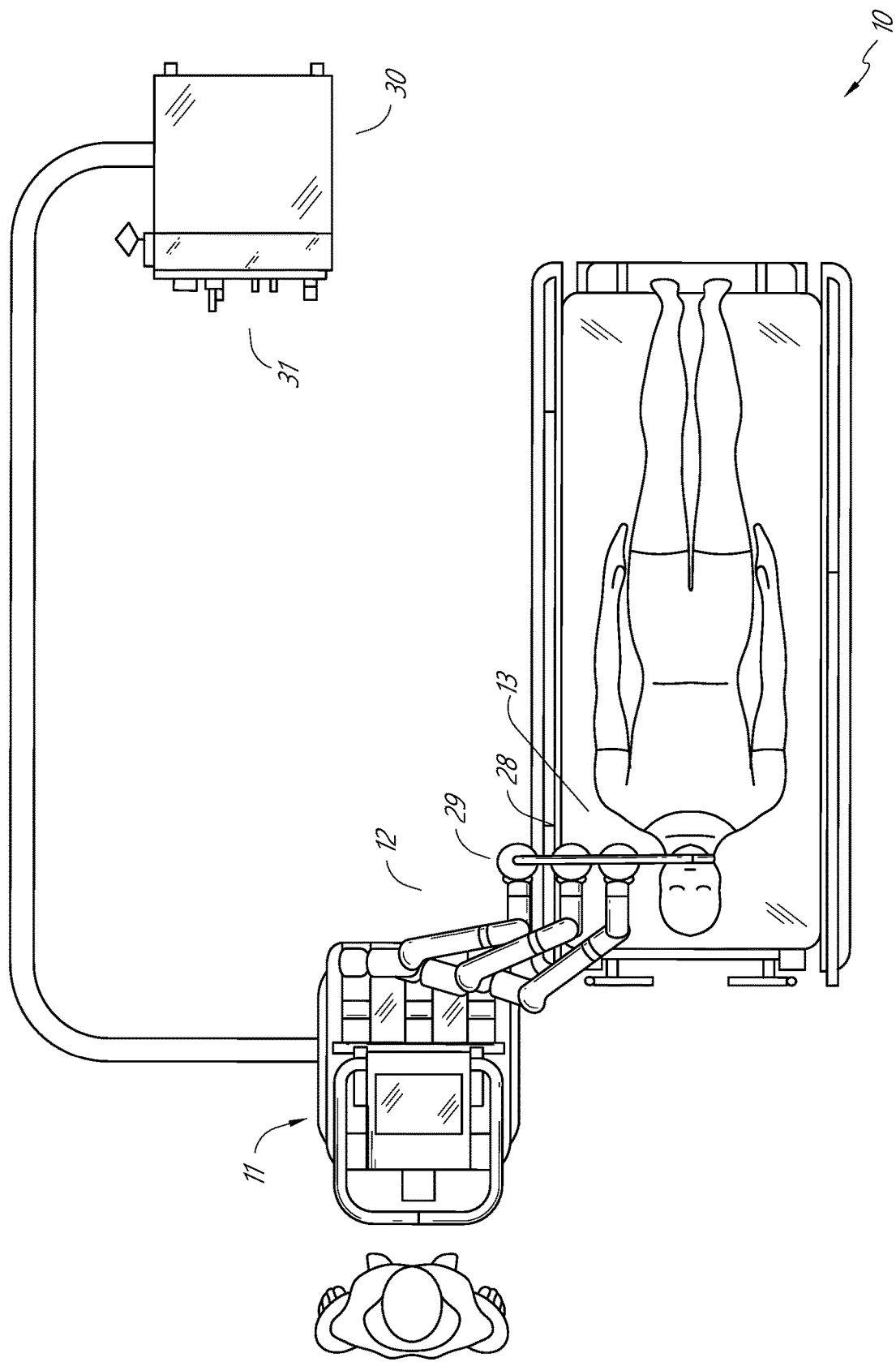
FIG. 1 illustrates an embodiment of a cart-based robotic system arranged for diagnostic and/or therapeutic bronchoscopy procedure(s).
Figure 2:
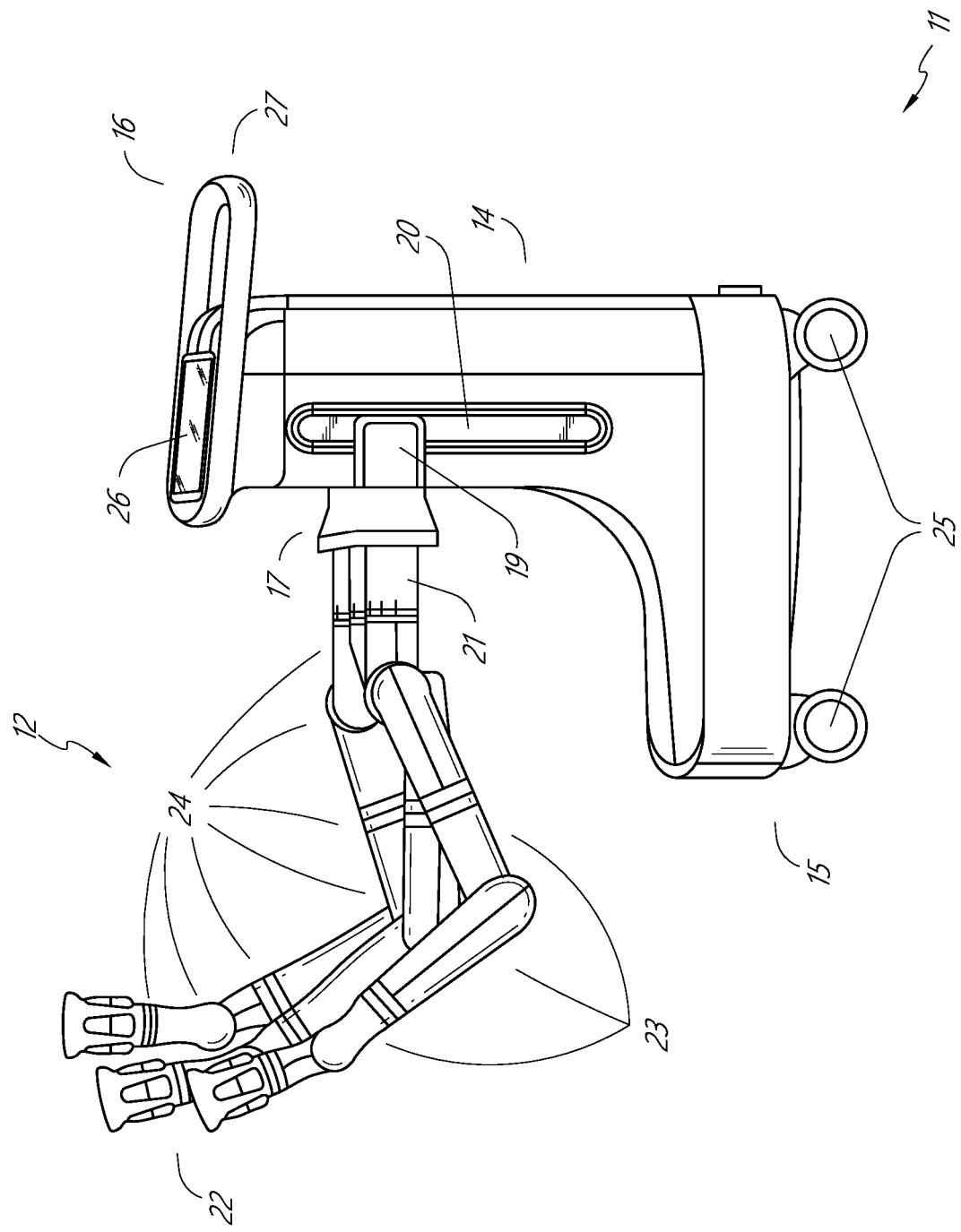
FIG. 2 depicts further aspects of the robotic system of FIG. 1.

The robotically enabled medical system may be configured in a variety of ways depending on the particular procedure. FIG. 1 illustrates an embodiment of a cart-based robotically enabled system 10 arranged for a diagnostic and/or therapeutic bronchoscopy procedure. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso in order to provide access to the access point. Similarly, the robotic arms 12 may be actuated to position the bronchoscope relative to the access point. The arrangement in FIG. 1 may also be utilized when performing a gastro-intestinal (GI) procedure with a gastroscope, a specialized endoscope for GI procedures. FIG. 2 depicts an example embodiment of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independent of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a movable tower 30, which may be connected via support cables to the cart 11 to provide support for controls, electronics, fluidics, optics, sensors, and/or power to the cart 11. Placing such functionality in the tower 30 allows for a smaller form factor cart 11 that may be more easily adjusted and/or re-positioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access in order to provide controlled irrigation and aspiration capabilities to the system that may be deployed through the endoscope 13. These components may also be controlled using the computer system of tower 30. In some embodiments, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include opto-electronics equipment for detecting, receiving, and processing data received from the optical sensors or cameras throughout the robotic system 10. In combination with the control system, such opto-electronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in system 10 are generally designed to provide both robotic controls as well as pre-operative and real-time information of the procedure, such as navigational and localization information of the endoscope 13. When the console 31 is not the only console available to the physician, it may be used by a second operator, such as a nurse, to monitor the health or vitals of the patient and the operation of system, as well as provide procedure-specific data, such as navigational and localization information. In other embodiments, the console 30 is housed in a body that is separate from the tower 30.

The tower 30 may be coupled to the cart 11 and endoscope 13 through one or more cables or connections (not shown). In some embodiments, the support functionality from the tower 30 may be provided through a single cable to the cart 11, simplifying and de-cluttering the operating room. In other embodiments, specific functionality may be coupled in separate cabling and connections. For example, while power may be provided through a single power cable to the cart, the support for controls, optics, fluidics, and/or navigation may be provided through a separate cable.

FIG. 2 provides a detailed illustration of an embodiment of the cart from the cart-based robotically enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (alternatively "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of robotic arms 12 to be angled in a variety of configurations.

In some embodiments, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree of freedom available to the robotic arm. Each of the arms 12 have seven joints, and thus provide seven degrees of freedom. A multitude of joints result in a multitude of degrees of freedom, allowing for "redundant" degrees of freedom. Redundant degrees of freedom allow the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and arms 12 over the floor. Accordingly, the cart base 15 houses heavier components, such as electronics, motors, power supply, as well as components that either enable movement and/or immobilize the cart. For example, the cart base 15 includes rollable wheel-shaped casters 25 that allow for the cart to easily move around the room prior to a procedure. After reaching the appropriate position, the casters 25 may be immobilized using wheel locks to hold the cart 11 in place during the procedure.

Positioned at the vertical end of column 14, the console 16 allows for both a user interface for receiving user input and a display screen (or a dual-purpose device such as, for example, a touchscreen 26) to provide the physician user with both pre-operative and intra-operative data. Potential pre-operative data on the touchscreen 26 may include pre-operative plans, navigation and mapping data derived from pre-operative computerized tomography (CT) scans, and/or notes from pre-operative patient interviews. Intra-operative data on display may include optical information provided from the tool, sensor and coordinate information from sensors, as well as vital patient statistics, such as respiration, heart rate, and/or pulse. The console 16 may be positioned and tilted to allow a physician to access the console from the side of the column 14 opposite carriage 17. From this position, the physician may view the console 16, robotic arms 12, and patient while operating the console 16 from behind the cart 11. As shown, the console 16 also includes a handle 27 to assist with maneuvering and stabilizing cart 11.

Figure 3:
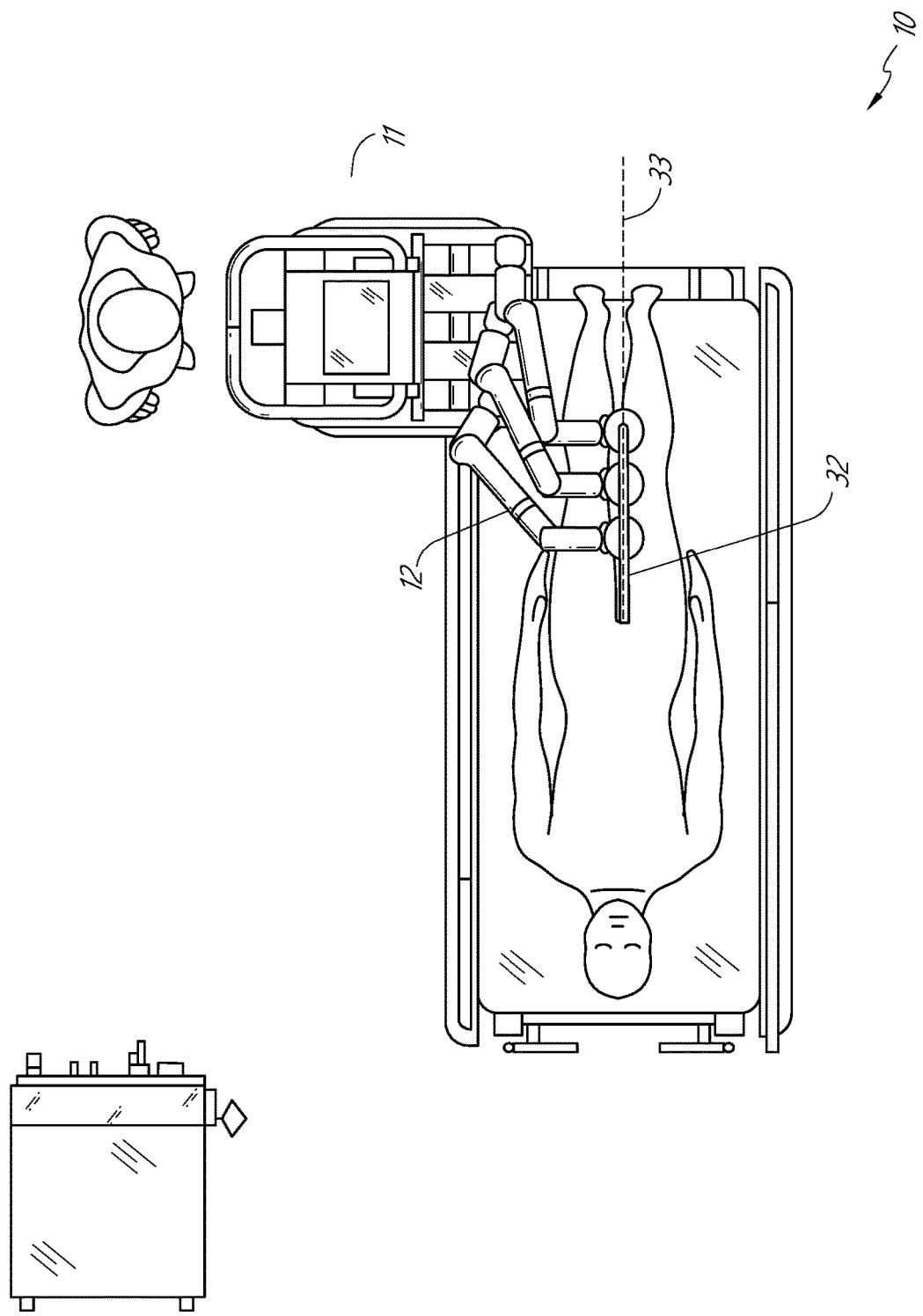
FIG. 3 illustrates an embodiment of the robotic system of FIG. 1 arranged for ureteroscopy.

FIG. 3 illustrates an embodiment of a robotically enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
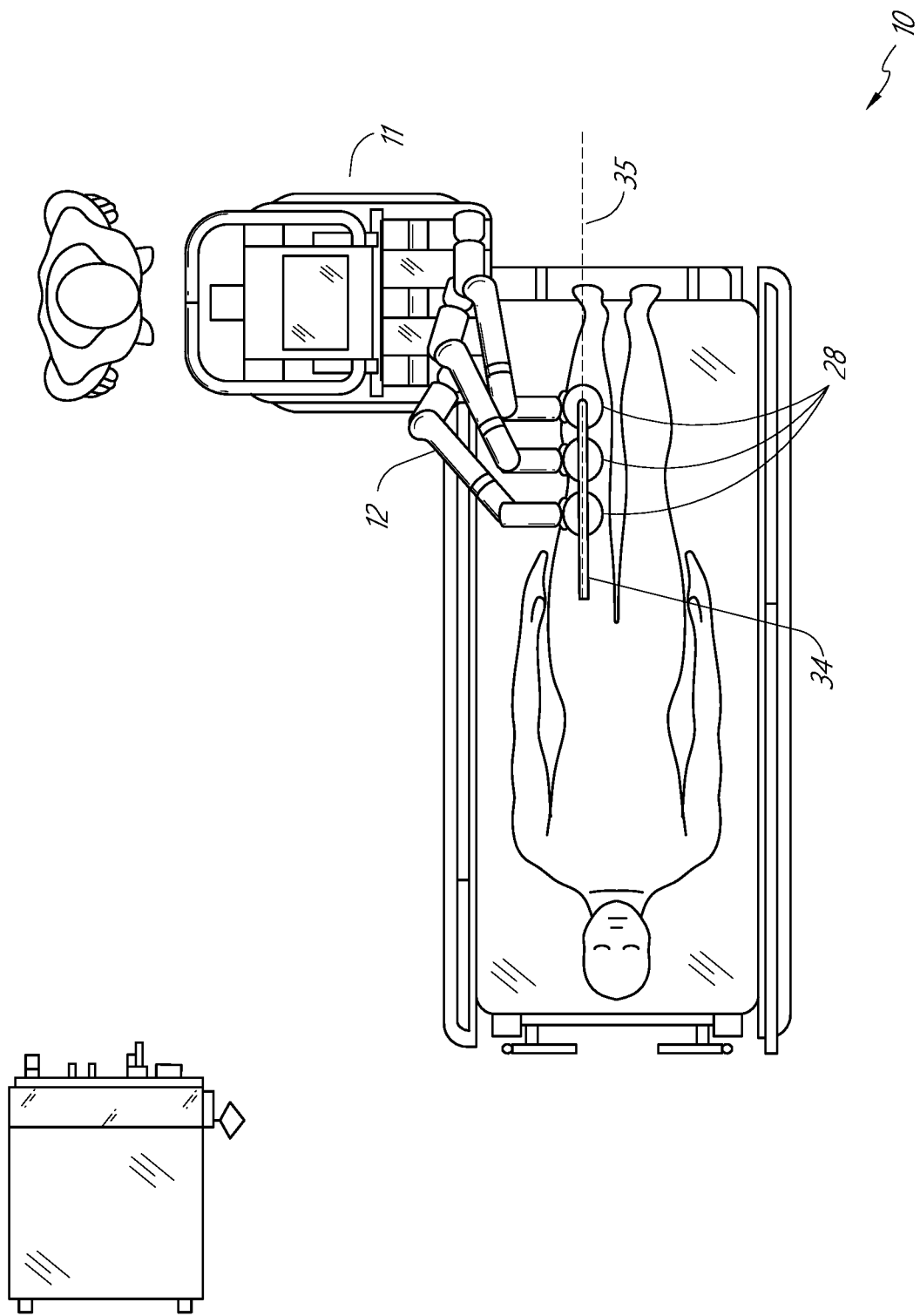
FIG. 4 illustrates an embodiment of the robotic system of FIG. 1 arranged for a vascular procedure.

FIG. 4 illustrates an embodiment of a robotically enabled system similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Alternatively, the cart may be positioned around the patient's upper abdomen in order to reach alternative vascular access points, such as, for example, the carotid and brachial arteries near the shoulder and wrist.

B. Robotic System—Table.

Figure 5:
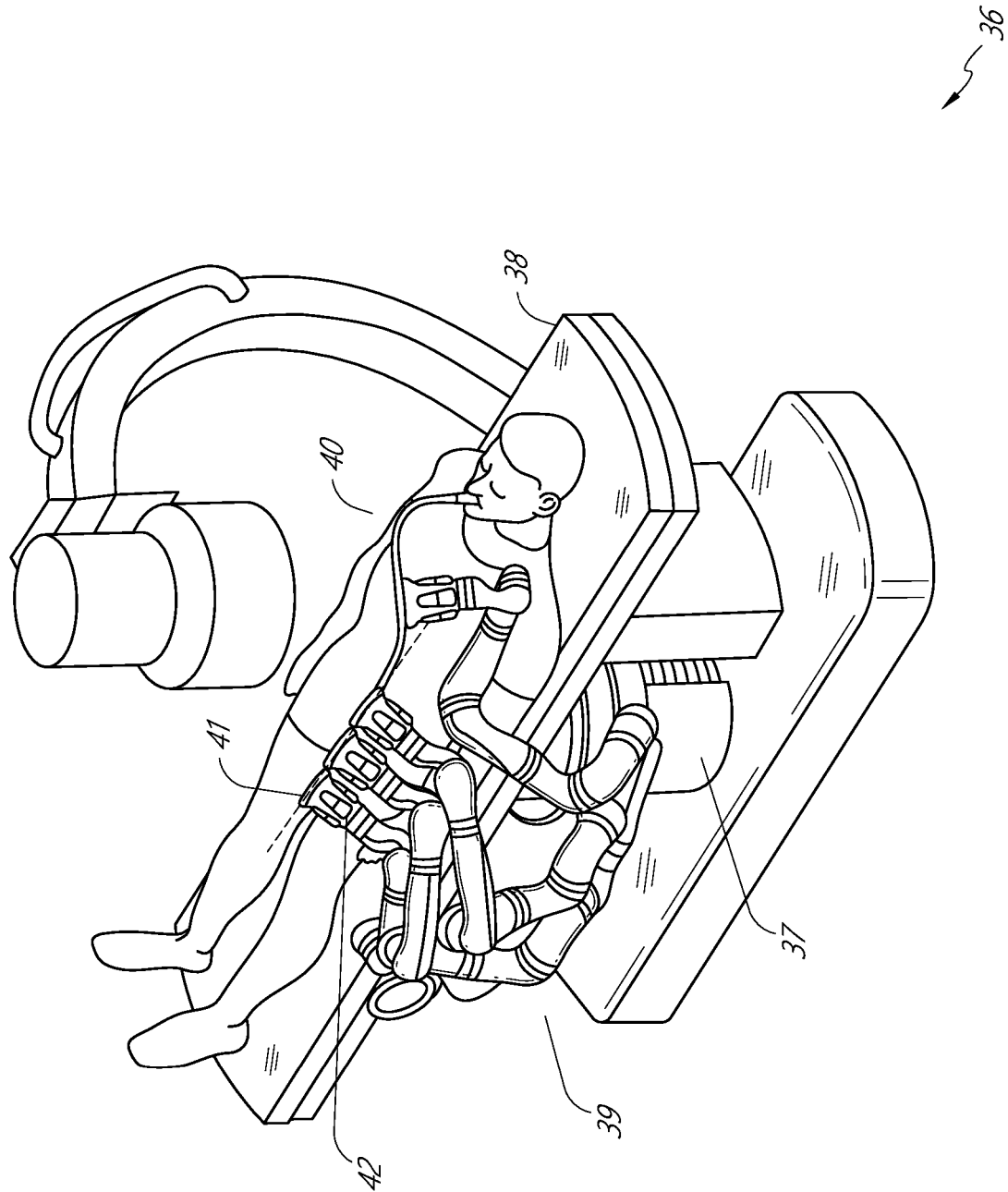
FIG. 5 illustrates an embodiment of a table-based robotic system arranged for a bronchoscopy procedure.

Embodiments of the robotically enabled medical system may also incorporate the patient's table. Incorporation of the table reduces the amount of capital equipment within the operating room by removing the cart, which allows greater access to the patient. FIG. 5 illustrates an embodiment of such a robotically enabled system arranged for a bronchoscopy procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around table 38.

Figure 6:
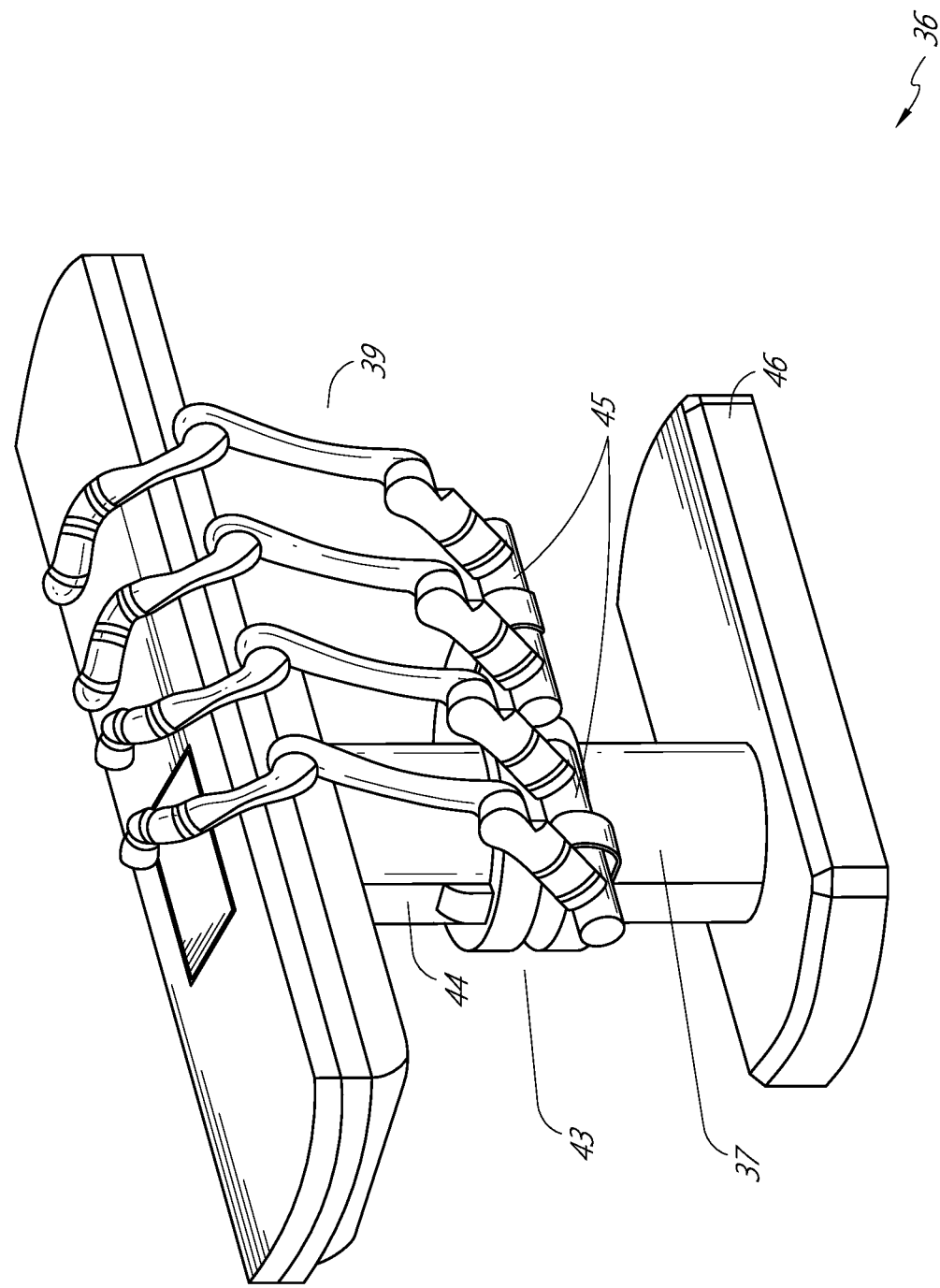
FIG. 6 provides an alternative view of the robotic system of FIG. 5.

FIG. 6 provides an alternative view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In embodiments with multiple carriages, the carriages may be individually positioned on the column and may translate and/or rotate independent of the other carriages. While carriages 43 need not surround the column 37 or even be circular, the ring-shape as shown facilitates rotation of the carriages 43 around the column 37 while maintaining structural balance. Rotation and translation of the carriages 43 allows the system to align the medical instruments, such as endoscopes and laparoscopes, into different access points on the patient. In other embodiments (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
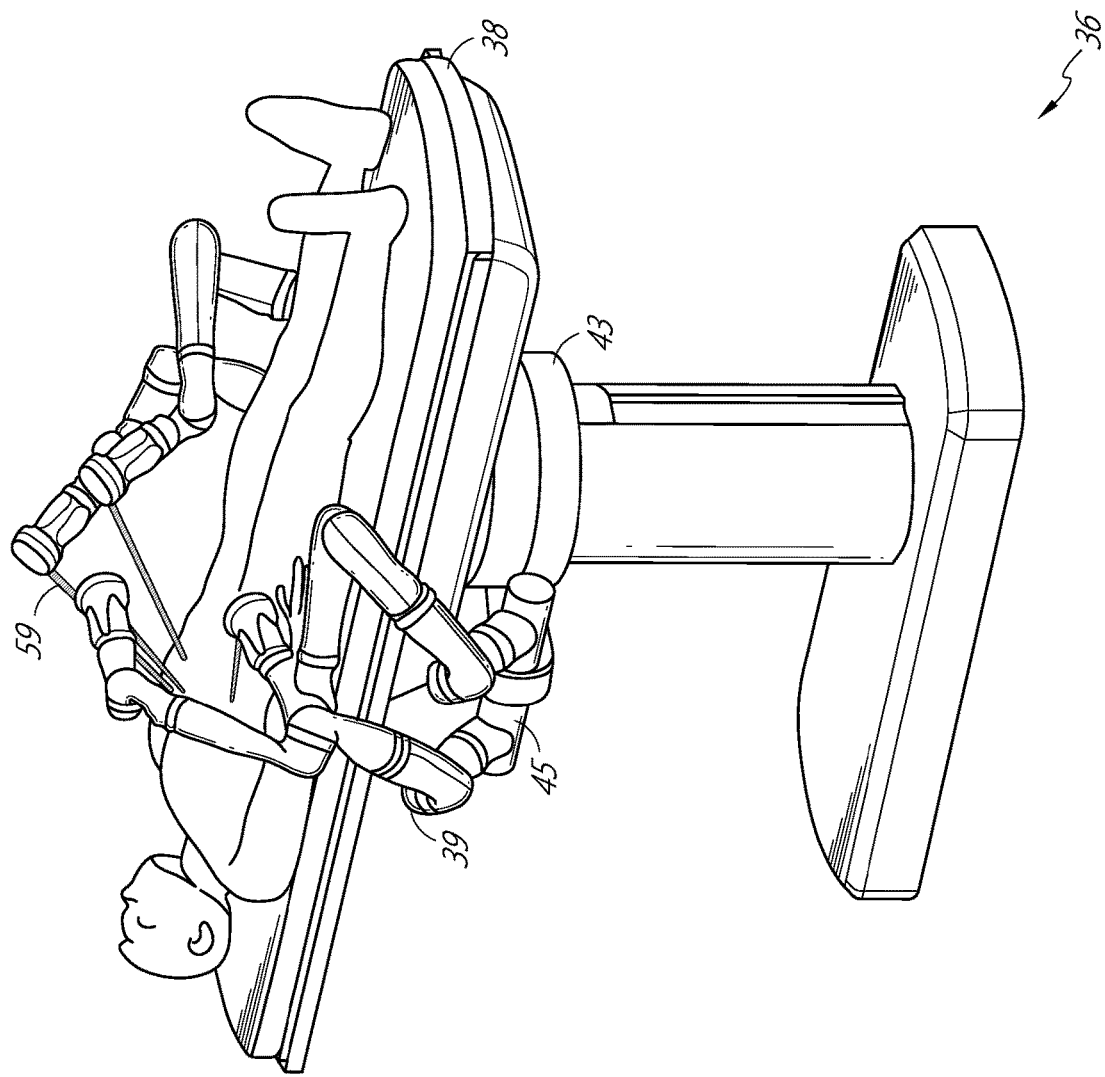
FIG. 9 illustrates an embodiment of a table-based robotic system configured for a laparoscopic procedure.

The arms 39 may be mounted on the carriages through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of table 38 (as shown in FIG. 6), on opposite sides of table 38 (as shown in FIG. 9), or on adjacent sides of the table 38 (not shown).

The column 37 structurally provides support for the table 38, and a path for vertical translation of the carriages. Internally, the column 37 may be equipped with lead screws for guiding vertical translation of the carriages, and motors to mechanize the translation of said carriages based the lead screws. The column 37 may also convey power and control signals to the carriage 43 and robotic arms 39 mounted thereon.

The table base 46 serves a similar function as the cart base 15 in cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

Continuing with FIG. 6, the system 36 may also include a tower (not shown) that divides the functionality of system 36 between table and tower to reduce the form factor and bulk of the table. As in earlier disclosed embodiments, the tower may provide a variety of support functionalities to table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base for potential stowage of the robotic arms. The tower may also include a master controller or console that provides both a user interface for user input, such as keyboard and/or pendant, as well as a display screen (or touchscreen) for pre-operative and intra-operative information, such as real-time imaging, navigation, and tracking information. In some embodiments, the tower may also contain holders for gas tanks to be used for insufflation.

Figure 7:
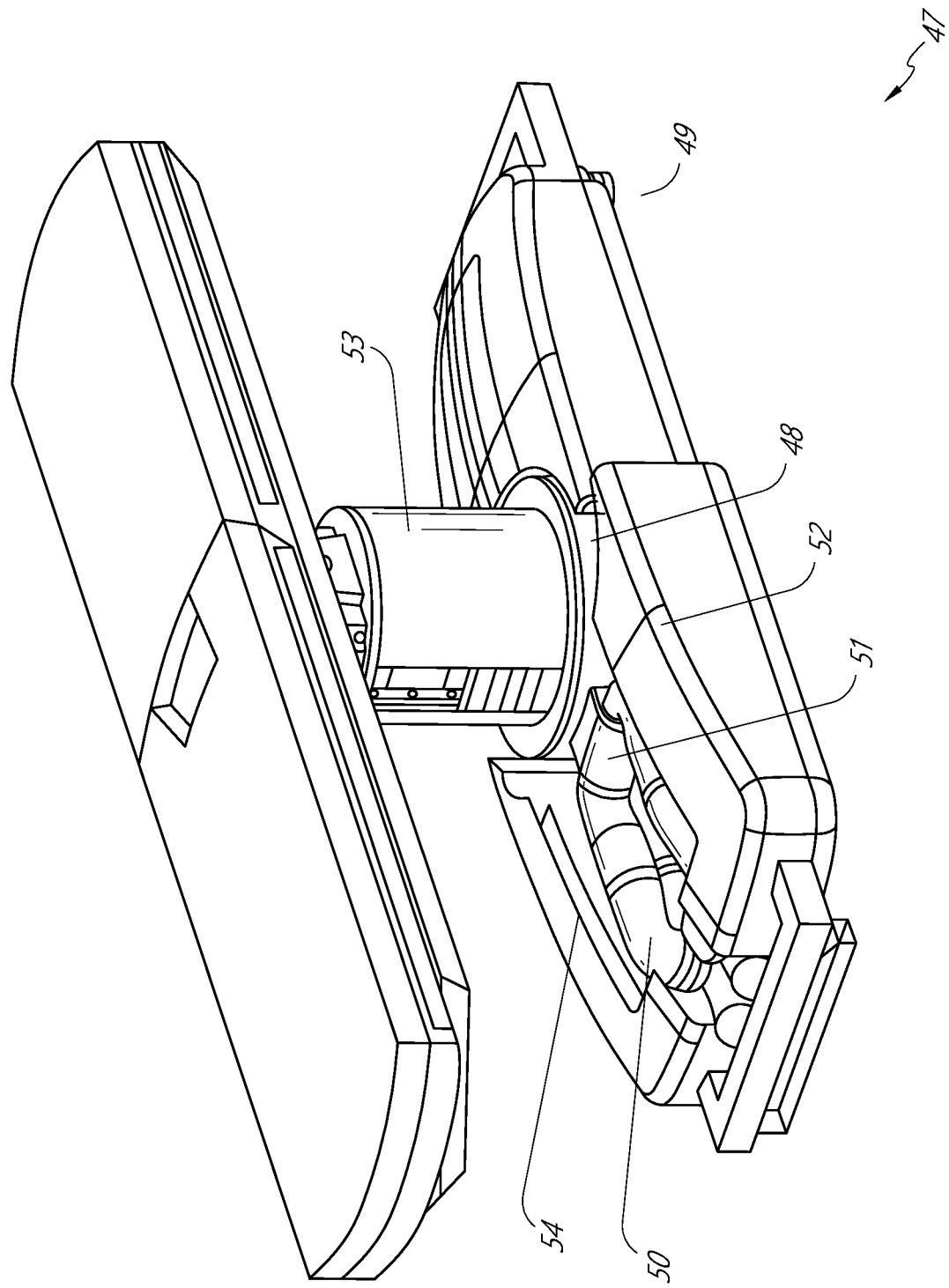
FIG. 7 illustrates an example system configured to stow robotic arm(s).

In some embodiments, a table base may stow and store the robotic arms when not in use. FIG. 7 illustrates a system 47 that stows robotic arms in an embodiment of the table-based system. In system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and arms 50 around column 53, and closed to stow to protect them when not in use. The base covers 52 may be sealed with a membrane 54 along the edges of its opening to prevent dirt and fluid ingress when closed.

Figure 8:
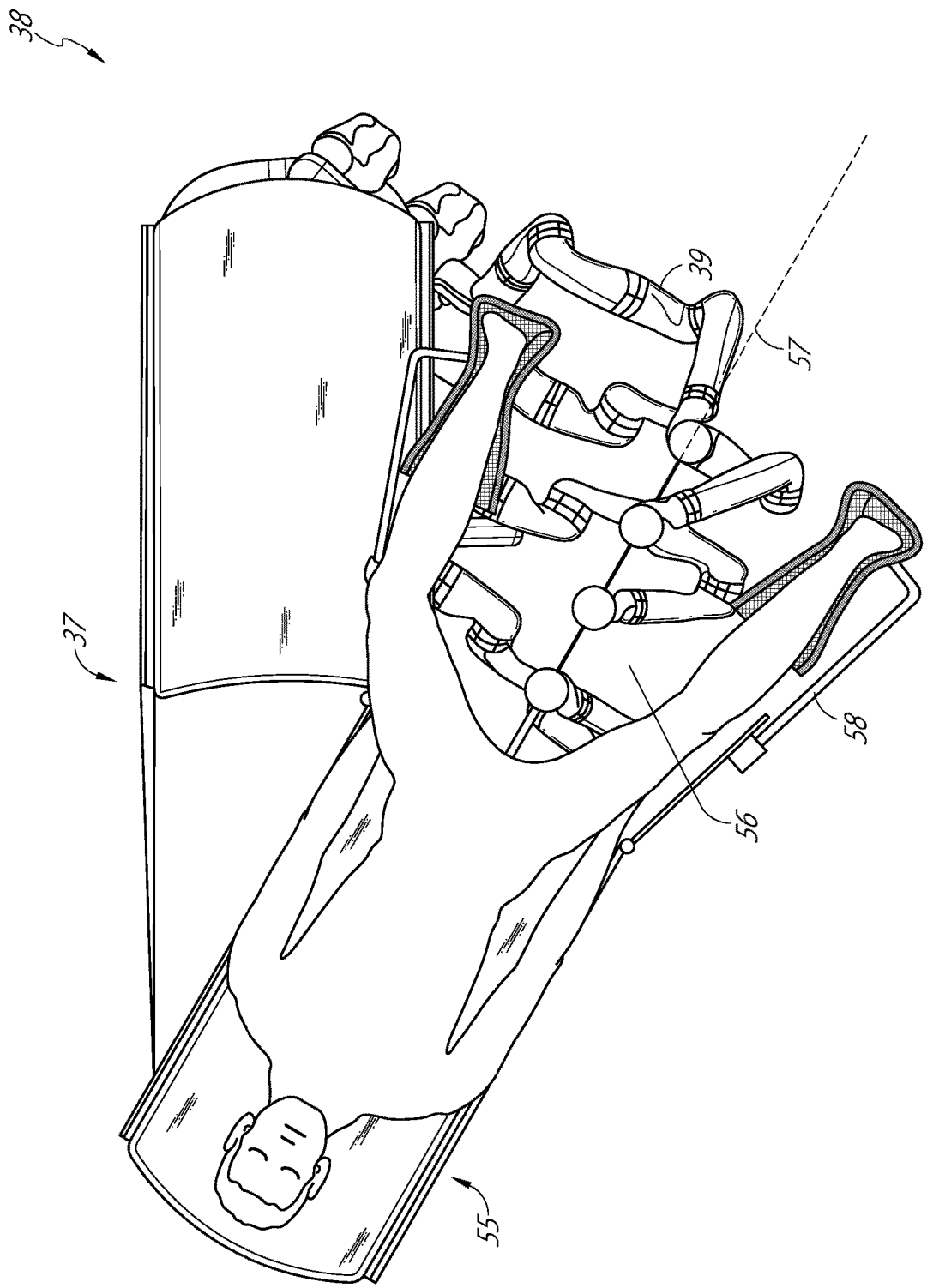
FIG. 8 illustrates an embodiment of a table-based robotic system configured for a ureteroscopy procedure.

FIG. 8 illustrates an embodiment of a robotically enabled table-based system configured for a ureteroscopy procedure. In a ureteroscopy, the table 38 may include a swivel portion 55 for positioning a patient off-angle from the column 37 and table base 46. The swivel portion 55 may rotate or pivot around a pivot point (e.g., located below the patient's head) in order to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage 35 (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some embodiments, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope. FIG. 9 illustrates an embodiment of a robotically enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
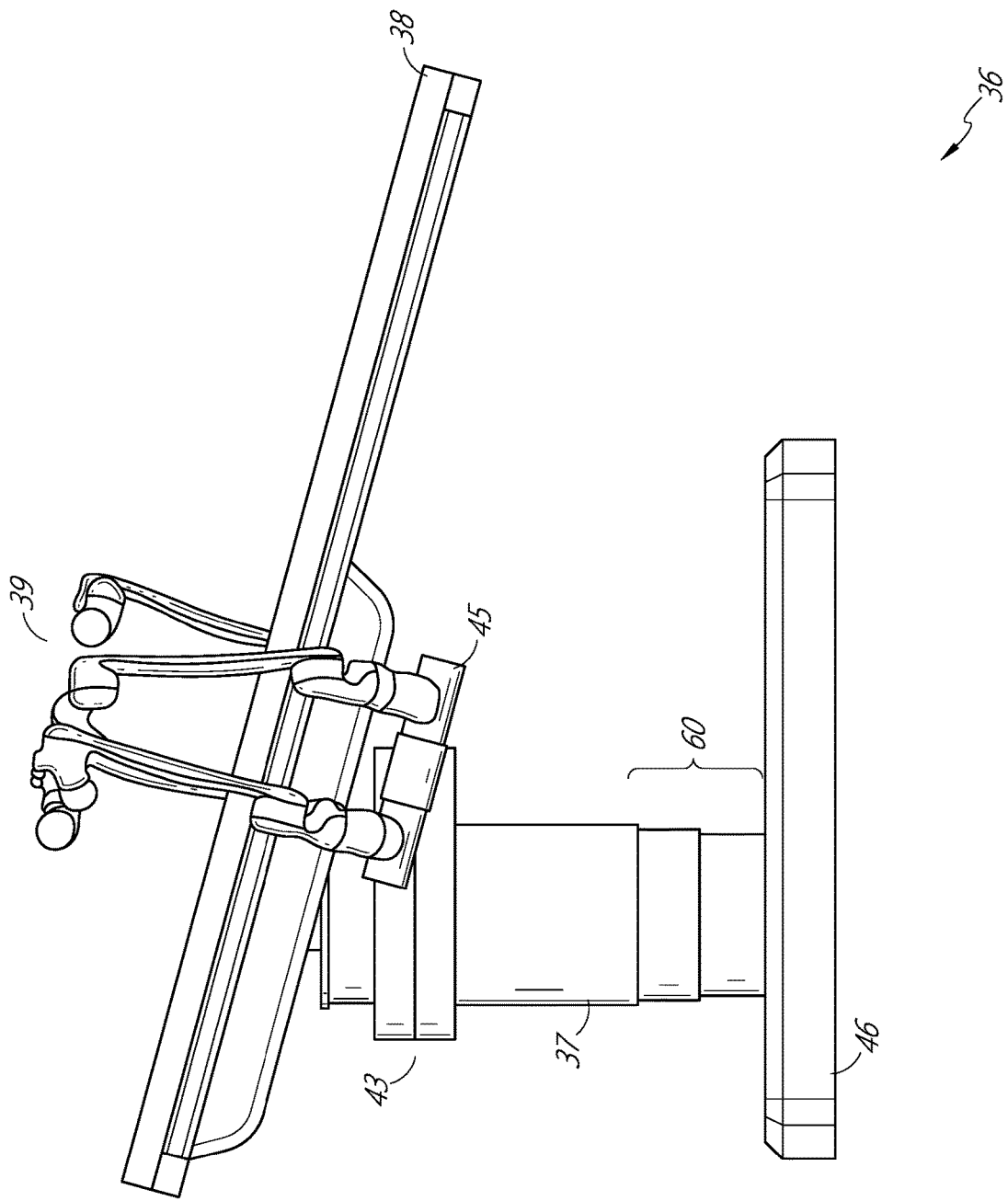
FIG. 10 illustrates an embodiment of the table-based robotic system of FIGS. 5-9 with pitch or tilt adjustment.

To accommodate laparoscopic procedures, the robotically enabled table system may also tilt the platform to a desired angle. FIG. 10 illustrates an embodiment of the robotically enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the arms 39 maintain the same planar relationship with table 38. To accommodate steeper angles, the column 37 may also include telescoping portions 60 that allow vertical extension of column 37 to keep the table 38 from touching the floor or colliding with base 46.

Figure 11:
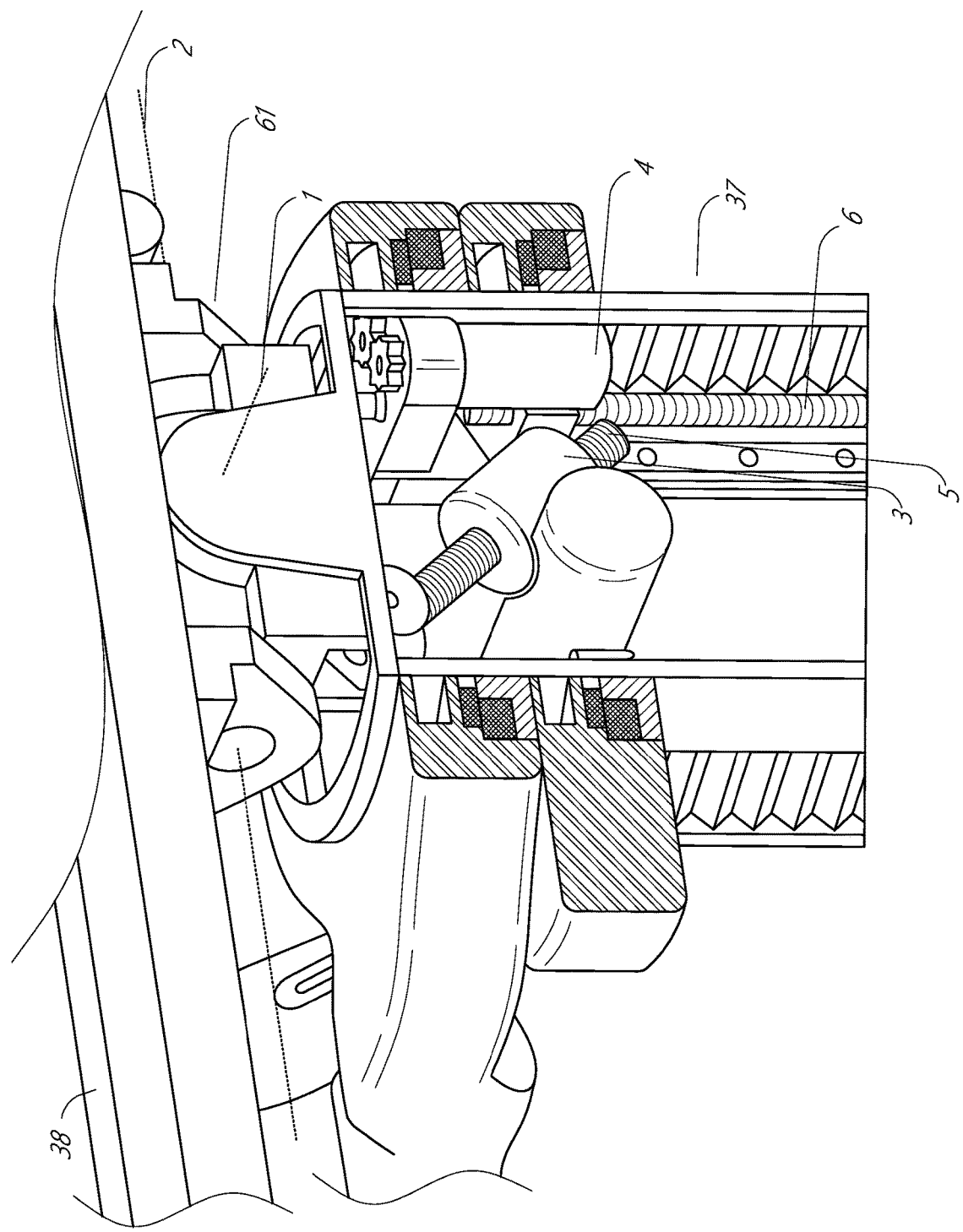
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some embodiments, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's lower abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
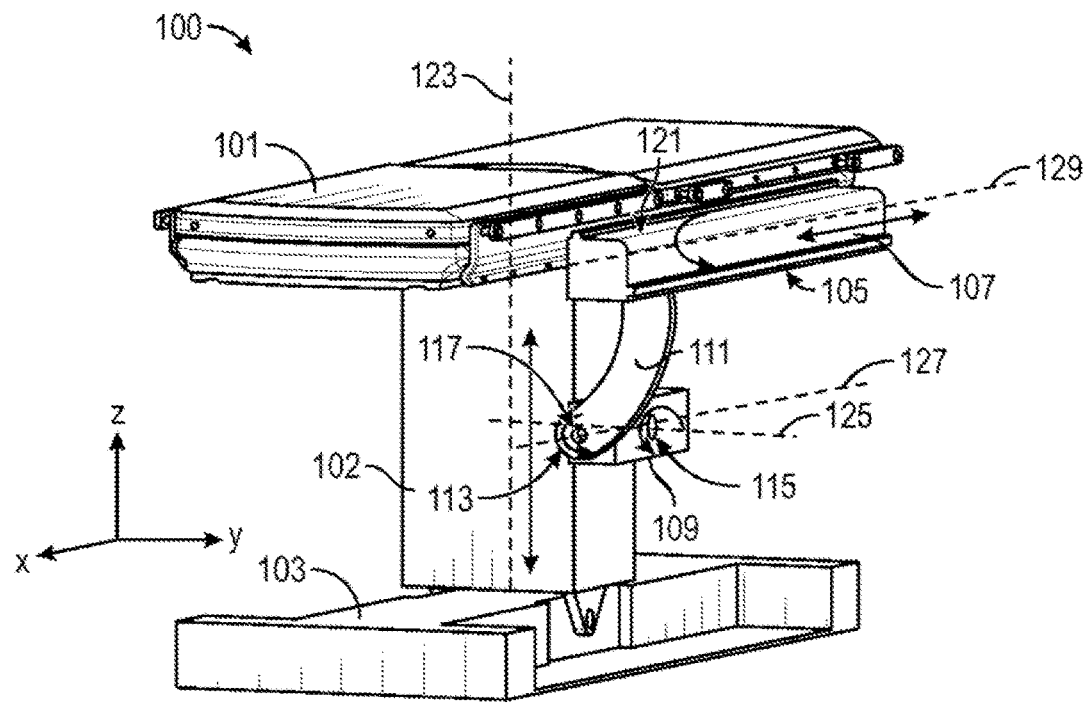
FIG. 12 illustrates an alternative embodiment of a table-based robotic system.
Figure 13:
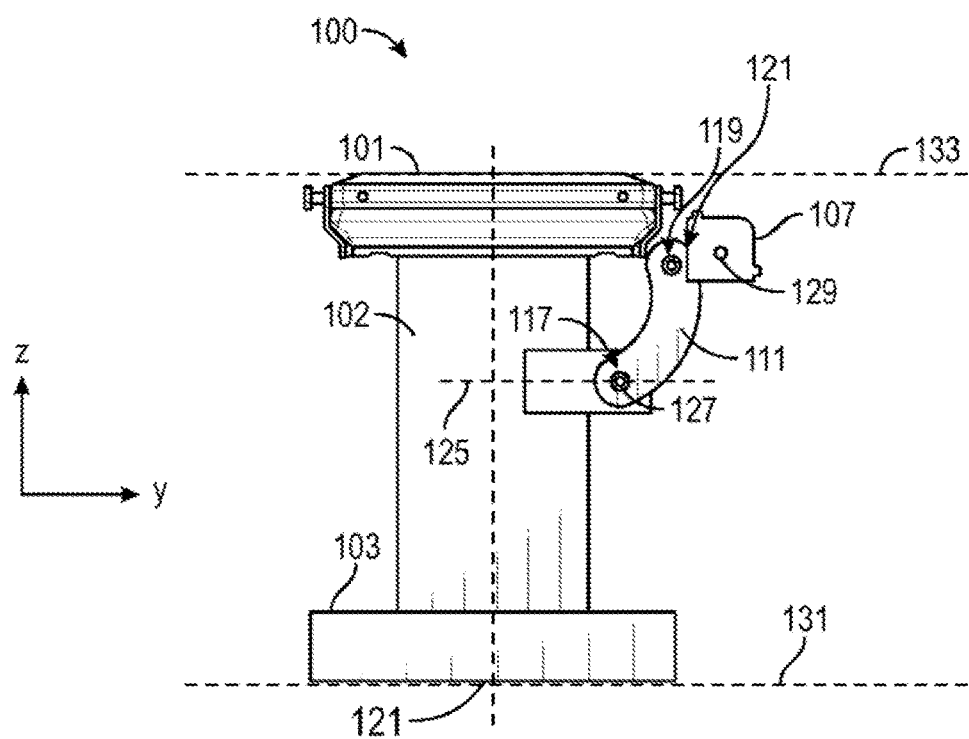
FIG. 13 illustrates an end view of the table-based robotic system of FIG. 12.

FIGS. 12 and 13 illustrate isometric and end views of an alternative embodiment of a table-based surgical robotics system 100. The surgical robotics system 100 includes one or more adjustable arm supports 105 that can be configured to support one or more robotic arms (see, for example, FIG. 14) relative to a table 101. In the illustrated embodiment, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other embodiments, the adjustable arm support 105 can be elevated from the stowed position to a position above an upper surface of the table 101.

The adjustable arm support 105 can provide several degrees of freedom, including lift, lateral translation, tilt, etc. In the illustrated embodiment of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105. A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other embodiments, the arm support 105 can be mounted to the table 101 or base 103. The adjustable arm support 105 can include a carriage 109, a bar or rail connector 111 and a bar or rail 107. In some embodiments, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom ("Z-lift") to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
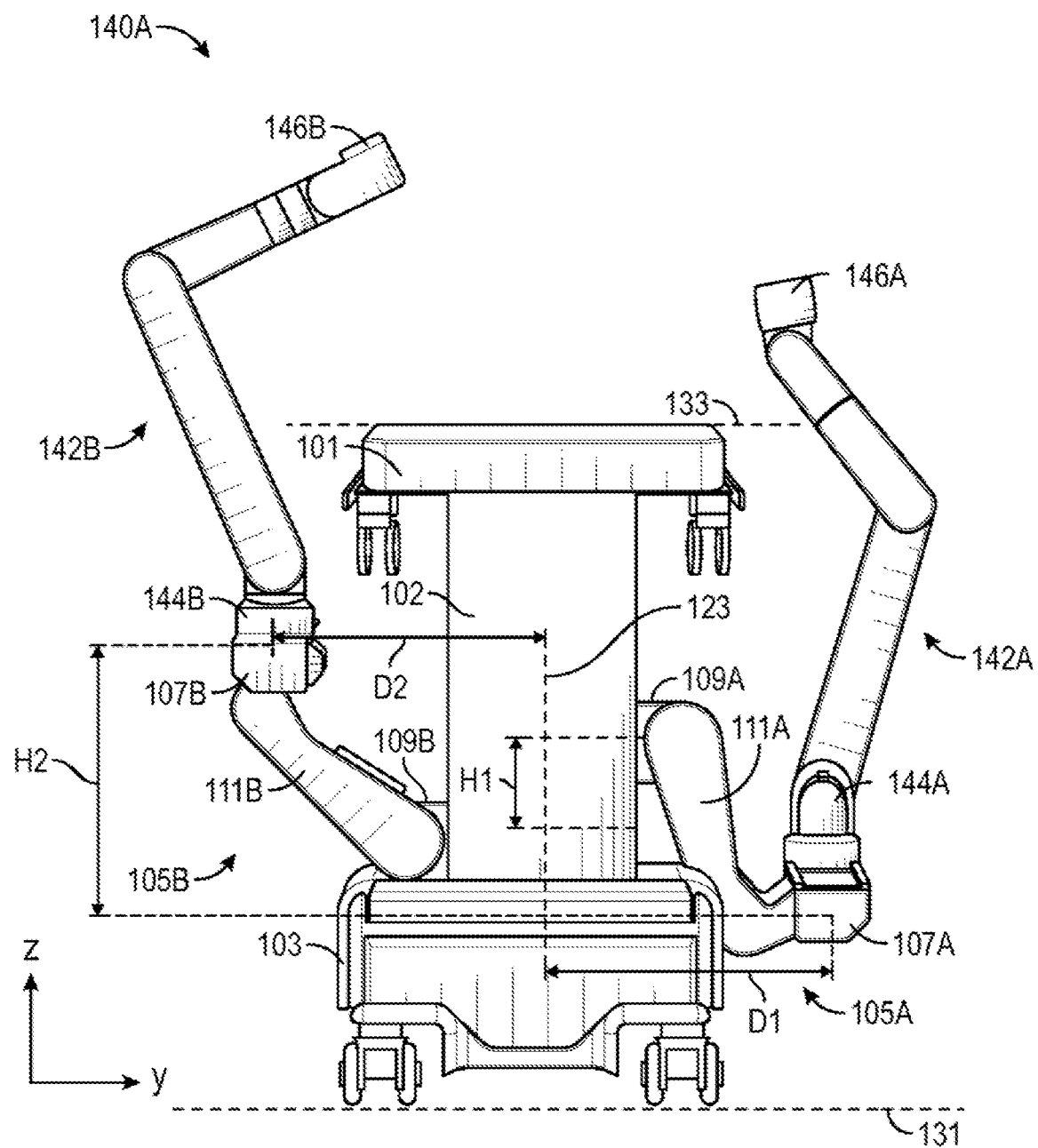
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some embodiments, one or more of the robotic arms 142A, 142B comprises an arm with seven or more degrees of freedom. In some embodiments, one or more of the robotic arms 142A, 142B can include eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and base 144A, 144B (1-degree of freedom including translation). In some embodiments, the insertion degree of freedom can be provided by the robotic arm 142A, 142B, while in other embodiments, the instrument itself provides insertion via an instrument-based insertion architecture.

C. Instrument Driver & Interface.

The end effectors of the system's robotic arms comprise (i) an instrument driver (alternatively referred to as "instrument drive mechanism" or "instrument device manipulator") that incorporate electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff. In contrast, the instrument drivers need not be changed or sterilized, and may be draped for protection.

Figure 15:
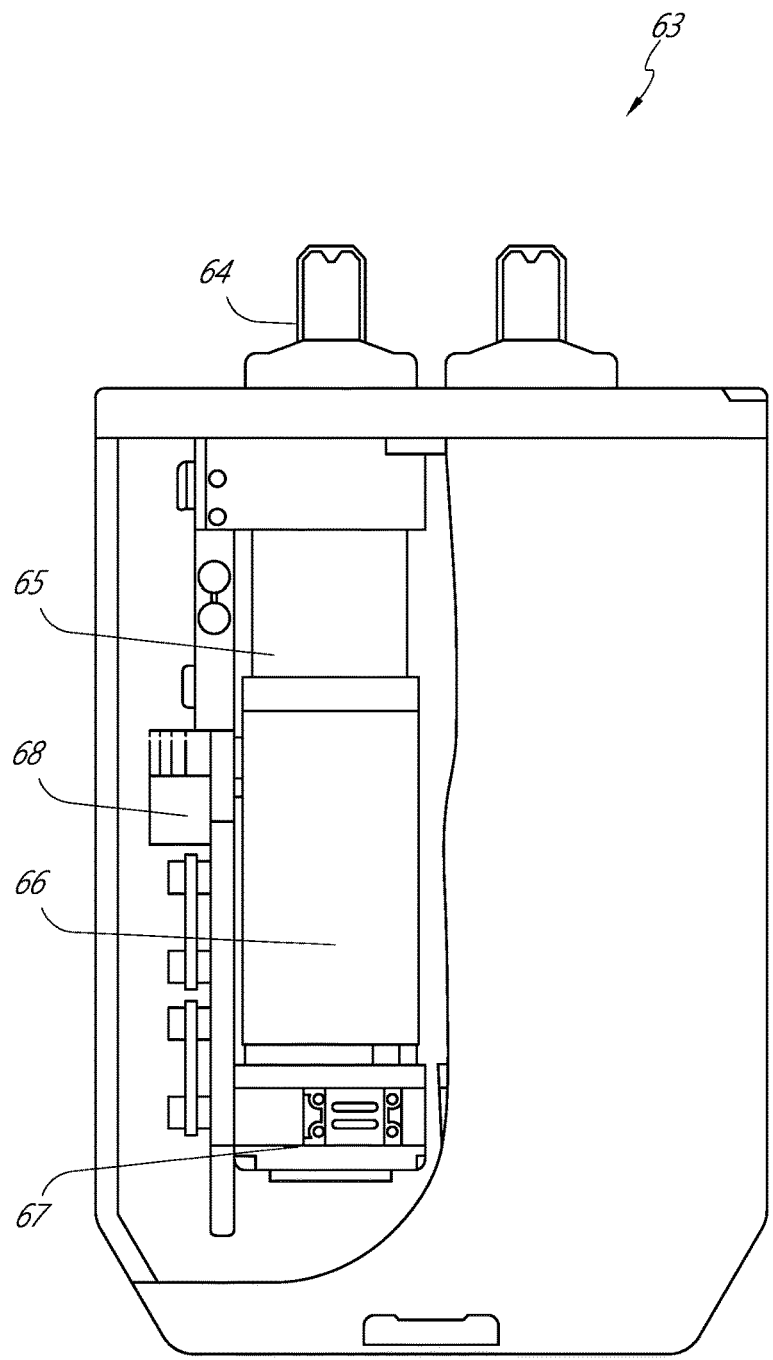
FIG. 15 illustrates an exemplary instrument driver.

FIG. 15 illustrates an example instrument driver. Positioned at the distal end of a robotic arm, instrument driver 62 comprises of one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuitry 68 for receiving control signals and actuating the drive unit. Each drive unit 63 being independent controlled and motorized, the instrument driver 62 may provide multiple (four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired torque.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise of a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument.

Figure 16:
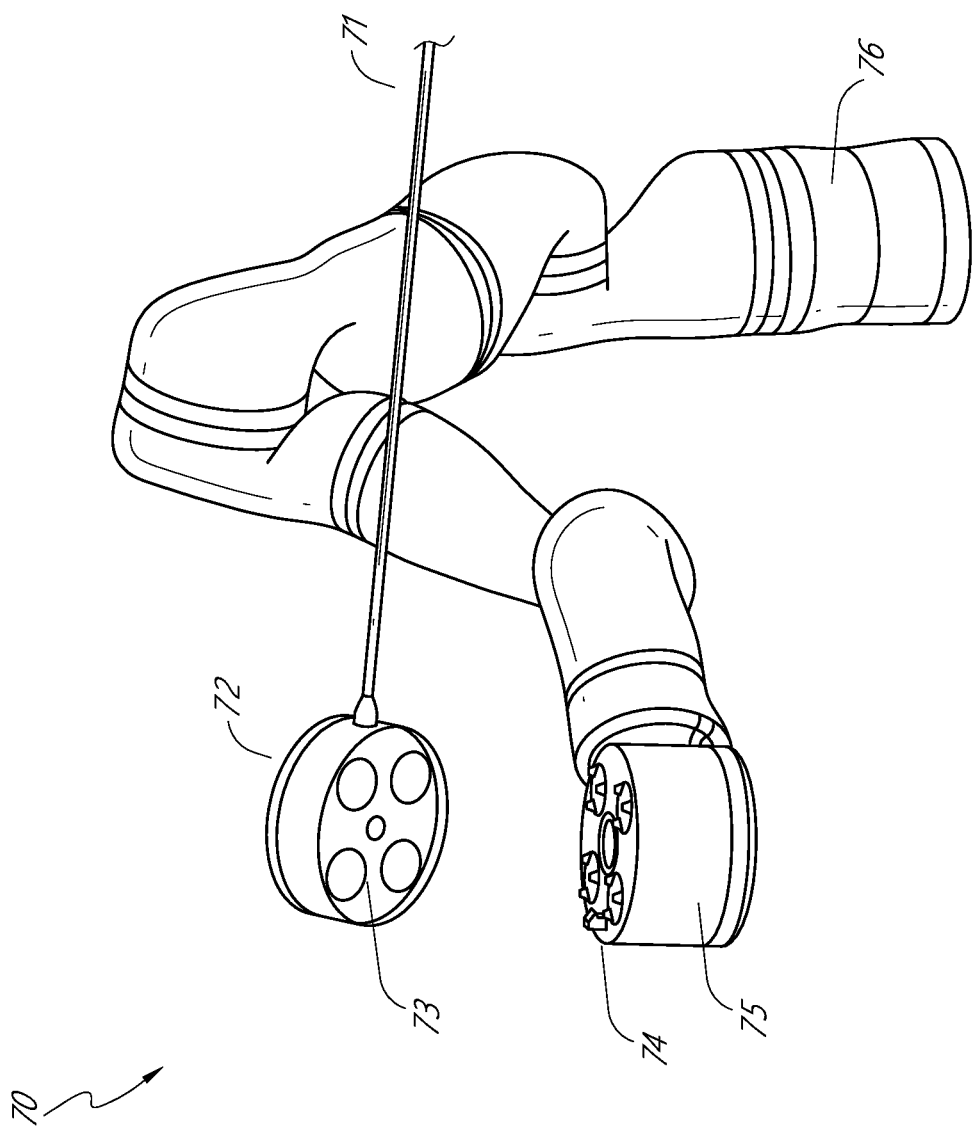
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of instrument base 72 may share axes of rotation with the drive outputs 74 in the instrument driver 75 to allow the transfer of torque from drive outputs 74 to drive inputs 73. In some embodiments, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions. When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some embodiments, during a surgical procedure, the tendon may cause a joint to rotate about an axis, thereby causing the end effector to move in one direction or another. Alternatively, the tendon may be connected to one or more jaws of a grasper at distal end of the elongated shaft 71, where tension from the tendon cause the grasper to close.

In endoscopy, the tendons may be coupled to a bending or articulating section positioned along the elongated shaft 71 (e.g., at the distal end) via adhesive, control ring, or other mechanical fixation. When fixedly attached to the distal end of a bending section, torque exerted on drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing there between may be altered or engineered for specific purposes, wherein tighter spiraling exhibits lesser shaft compression under load forces, while lower amounts of spiraling results in greater shaft compression under load forces, but also exhibits limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft may comprise of a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include of an optical camera. The shaft 71 may also accommodate optical fibers to carry light from proximally located light sources, such as light emitting diodes, to the distal end of the shaft.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space.

Relatedly, the distal tip may also include ports for light sources for illuminating the anatomical space when using the camera.

In the example of FIG. 16, the drive shaft axes, and thus the drive input axes, are orthogonal to the axis of the elongated shaft. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft during an endoscopic procedure.

Figure 17:
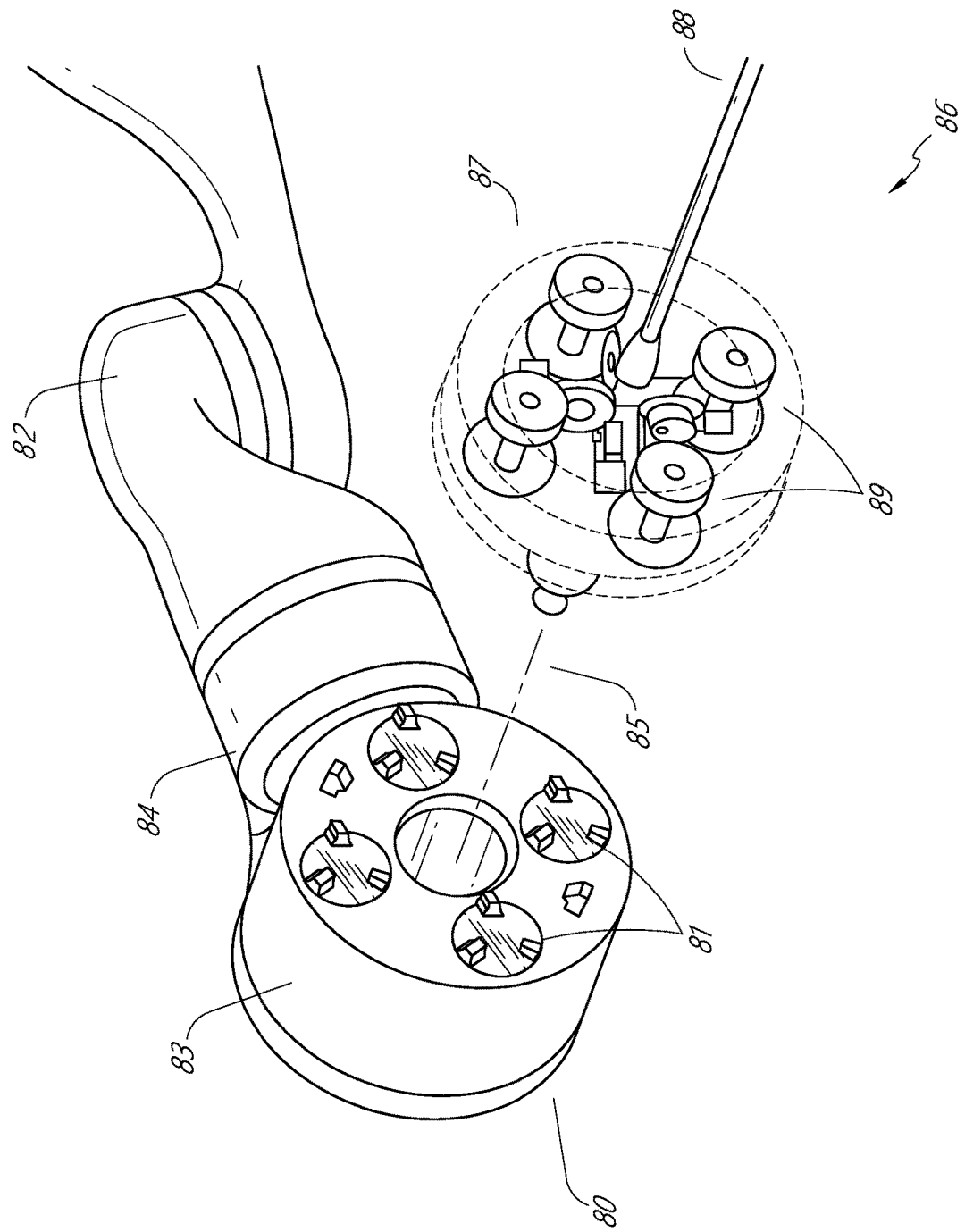
FIG. 17 illustrates an alternative design for an instrument driver and instrument where the axes of the drive units are parallel to the axis of the elongated shaft of the instrument.

FIG. 17 illustrates an alternative design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver. Power and controls signals may be communicated from the non-rotational portion 84 of the instrument driver 80 to the rotational assembly 83 through electrical contacts and may be maintained through rotation by a brushed slip ring connection (not shown). In other embodiments, the rotational assembly 83 may be responsive to a separate drive unit that is integrated into the non-rotatable portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed embodiments, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed embodiments, instrument shaft 88 extends from the center of instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
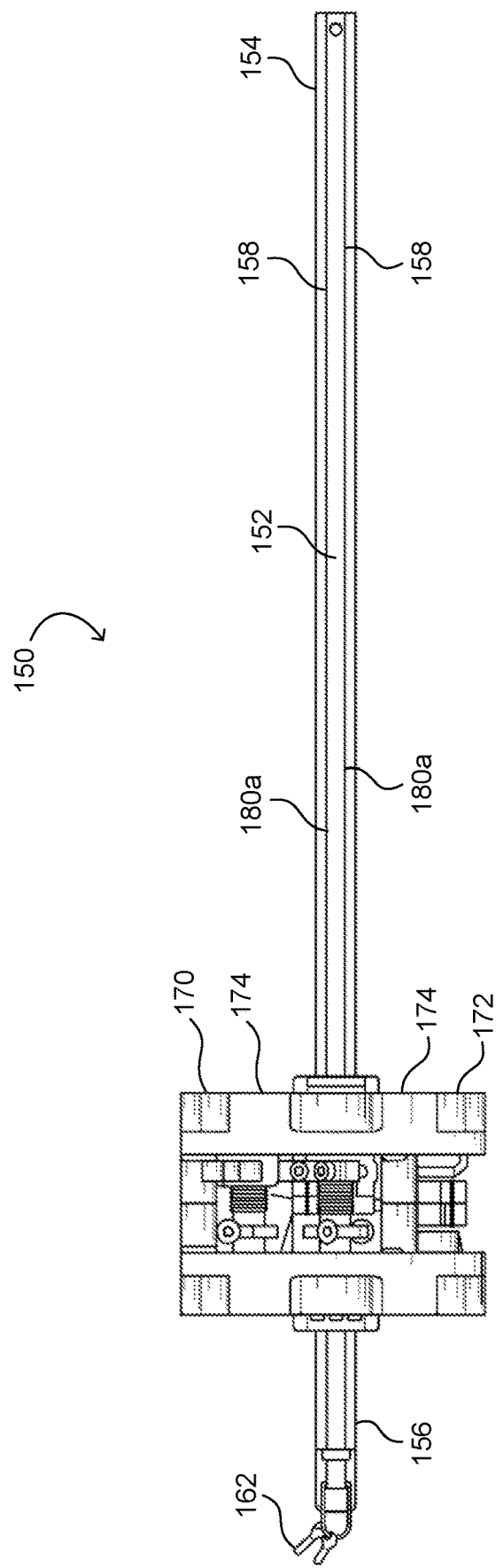
FIG. 18 illustrates an instrument having an instrument-based insertion architecture.

FIG. 18 illustrates an instrument having an instrument-based insertion architecture in accordance with some embodiments. The instrument 150 can be coupled to any of the instrument drivers discussed above. The instrument 150 comprises an elongated shaft 152, an end effector 162 connected to the shaft 152, and a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wires or cables 180 therethrough. One or more cables 180 thus run along an outer surface of the elongated shaft 152. In other embodiments, cables 180 can also run through the elongated shaft 152. Manipulation of the one or more cables 180 (e.g., via an instrument driver) results in actuation of the end effector 162.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some embodiments, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other embodiments, a robotic arm can be largely responsible for instrument insertion.

E. Controller.

Any of the robotic systems described herein can include an input device or controller for manipulating an instrument attached to a robotic arm. In some embodiments, the controller can be coupled (e.g., communicatively, electronically, electrically, wirelessly and/or mechanically) with an instrument such that manipulation of the controller causes a corresponding manipulation of the instrument e.g., via master slave control.

Figure 19:
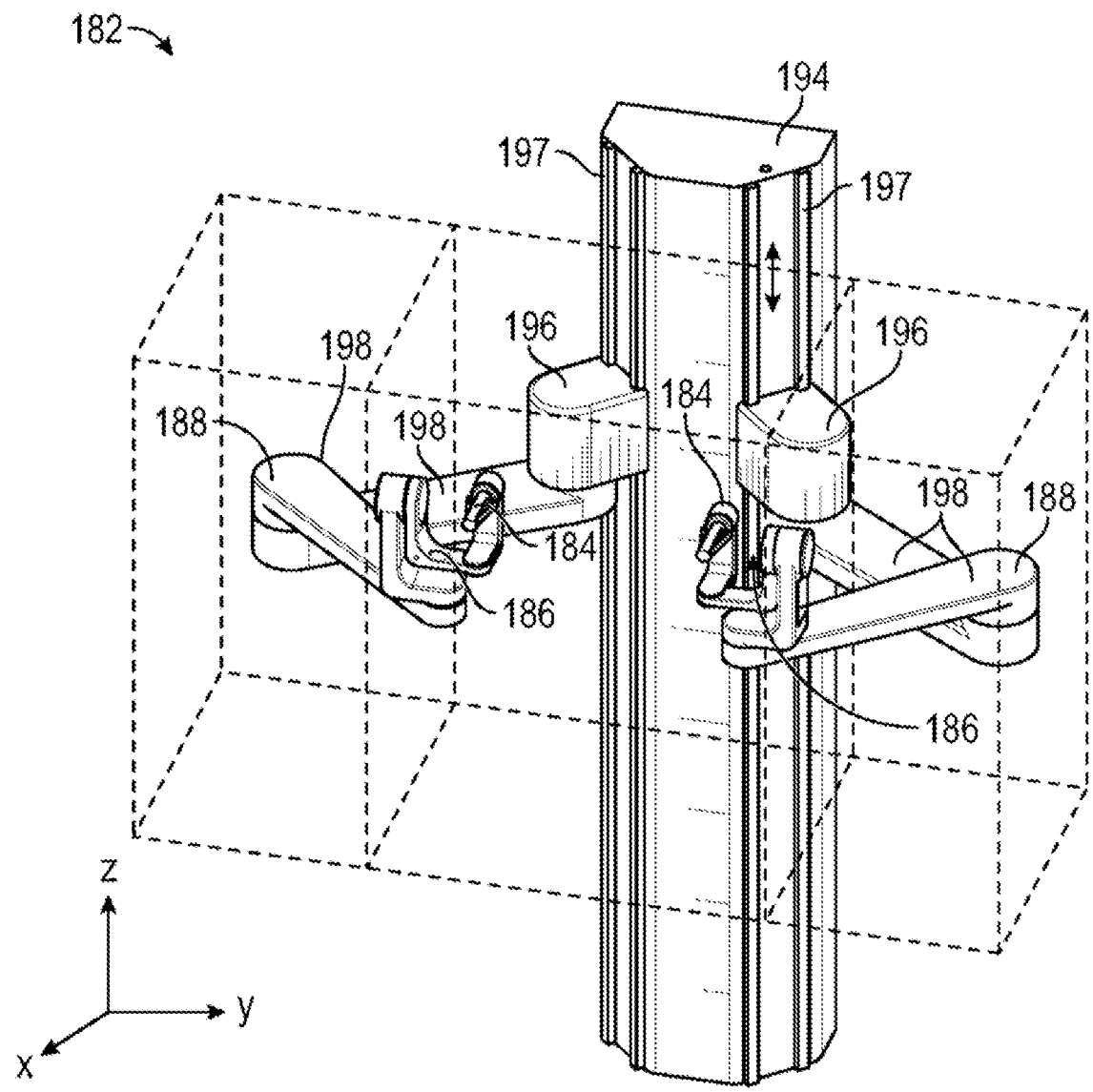
FIG. 19 illustrates an exemplary controller.

FIG. 19 is a perspective view of an embodiment of a controller 182. In the present embodiment, the controller 182 comprises a hybrid controller that can have both impedance and admittance control. In other embodiments, the controller 182 can utilize just impedance or passive control. In other embodiments, the controller 182 can utilize just admittance control. By being a hybrid controller, the controller 182 advantageously can have a lower perceived inertia while in use.

In the illustrated embodiment, the controller 182 is configured to allow manipulation of two medical instruments and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some embodiments, one or more load cells are positioned in the controller. For example, in some embodiments, a load cell (not shown) is positioned in the body of each of the gimbals 186. By providing a load cell, portions of the controller 182 are capable of operating under admittance control, thereby advantageously reducing the perceived inertia of the controller while in use. In some embodiments, the positioning platform 188 is configured for admittance control, while the gimbal 186 is configured for impedance control. In other embodiments, the gimbal 186 is configured for admittance control, while the positioning platform 188 is configured for impedance control. Accordingly, for some embodiments, the translational or positional degrees of freedom of the positioning platform 188 can rely on admittance control, while the rotational degrees of freedom of the gimbal 186 rely on impedance control.

F. Navigation and Control.

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by this disclosure can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as pre-operative mapping, computer vision, real-time EM tracking, and robot command data may be used individually or in combination to achieve a radiation-free operating environment. In other cases, where radiation-based imaging modalities are still used, the pre-operative mapping, computer vision, real-time EM tracking, and robot command data may be used individually or in combination to improve upon the information obtained solely through radiation-based imaging modalities.

Figure 20:
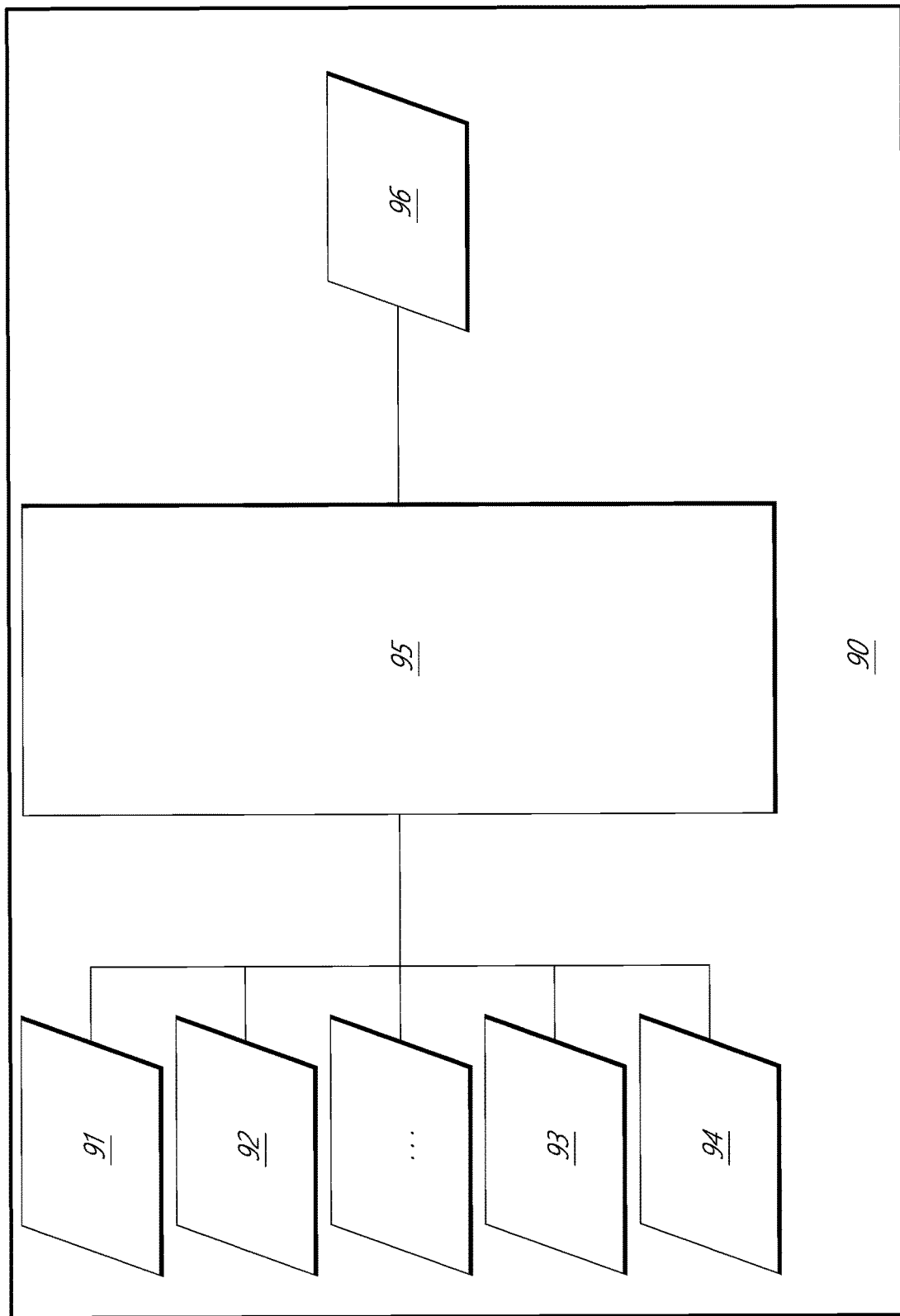
FIG. 20 depicts a block diagram illustrating a localization system that estimates a location of one or more elements of the robotic systems of FIGS. 1-10, such as the location of the instrument of FIGS. 16-18, in accordance with an example embodiment.

FIG. 20 is a block diagram illustrating a localization system 90 that estimates a location of one or more elements of the robotic system, such as the location of the instrument, in accordance with an example embodiment. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Pre-operative mapping may be accomplished through the use of the collection of low dose CT scans. Pre-operative CT scans are reconstructed into three-dimensional images, which are visualized, e.g., as "slices" of a cutaway view of the patient's internal anatomy. When analyzed in the aggregate, image-based models for anatomical cavities, spaces and structures of the patient's anatomy, such as a patient lung network, may be generated. Techniques such as center-line geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, the contents of which are herein incorporated in its entirety. Network topological models may also be derived from the CT-images and are particularly appropriate for bronchoscopy.

In some embodiments, the instrument may be equipped with a camera to provide vision data 92. The localization module 95 may process the vision data to enable one or more vision-based location tracking. For example, the preoperative model data may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intra-operatively, this library may be referenced by the robotic system in order to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising of one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter) may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intra-operatively "registered" to the patient anatomy (e.g., the preoperative model) in order to determine the geometric transformation that aligns a single location in the coordinate system with a position in the pre-operative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command and kinematics data 94 may also be used by the localization module 95 to provide localization data 96 for the robotic system. Device pitch and yaw resulting from articulation commands may be determined during pre-operative calibration. Intra-operatively, these calibration measurements may be used in combination with known insertion depth information to estimate the position of the instrument. Alternatively, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command and kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

2. Port Placement Assistance

This application discloses robotic medical systems that provide port placement assistance or guidance to a physician (or, e.g., an operator, a user, etc.) before incisions are made in a patient.

As disclosed herein, a robotic medical system provides port placement assistance after the robotic arms and adjustable arm supports have been moved to an initial docking phase (e.g., the robotic medical system is transitioned into the initial docking phase, including a pre-docking step), and prior to actual docking of the robotic arms. During port placement assistance, the robotic medical system determines a user-selected location for placing a port on a patient, compares the user-selected location with a recommended port location that is based on a procedure model, and provides a notification to a physician in accordance with the comparison.

According to some embodiments of the present disclosure, port placement assistance can be triggered by user selection of a port placement assistance mode via a user interface on a tower viewer or a physician console. In some embodiments, the robotic medical system automatically activates a port placement assistance mode upon the system detecting that a measurement tip for port placement has been attached to one or more of the robotic arms.

A. Robotic System.

Figure 21:
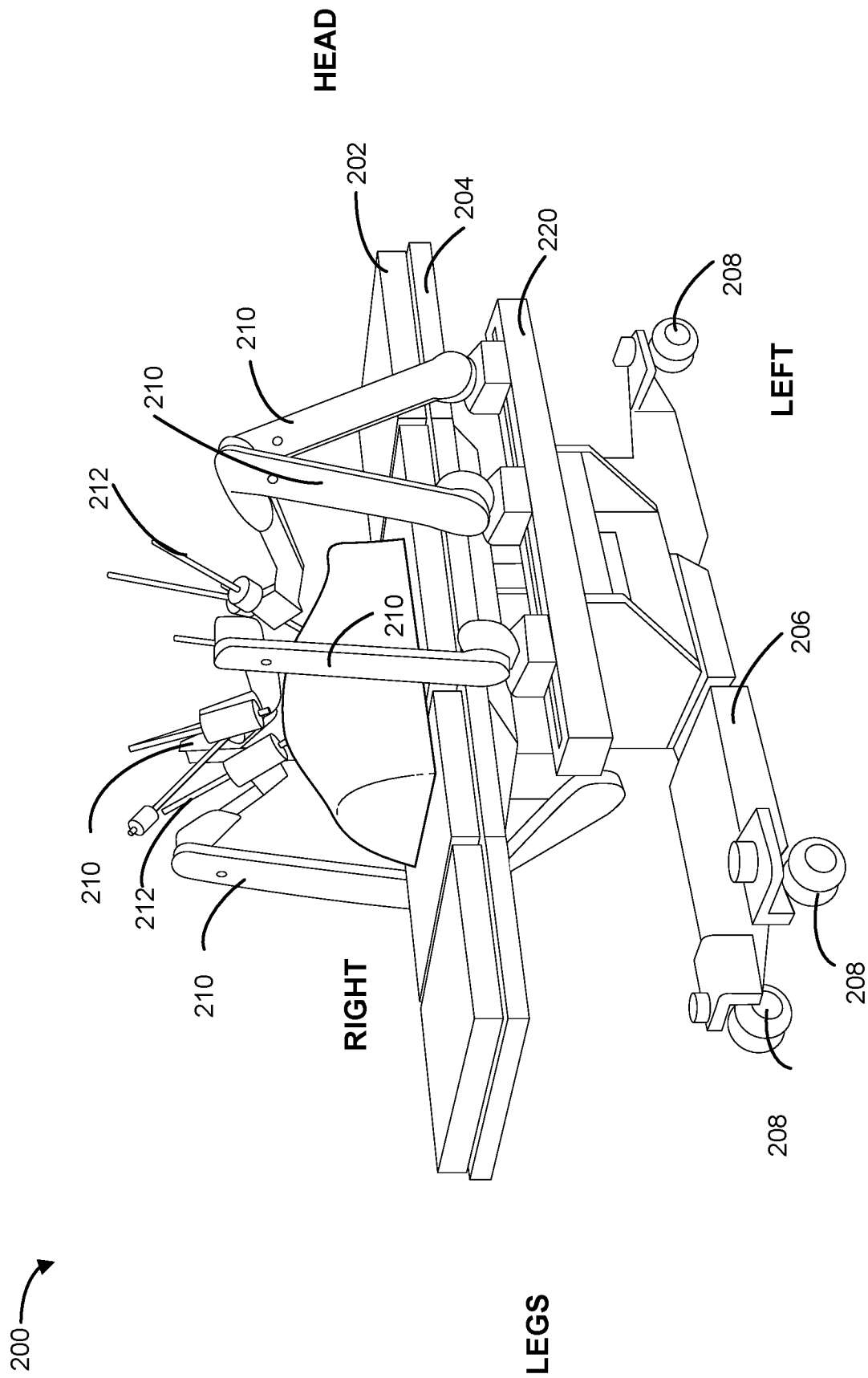
FIG. 21 illustrates an exemplary robotic system according to some embodiments.

FIG. 21 illustrates an exemplary robotic medical system 200 according to some embodiments. In some embodiments, the robotic medical system 200 is a robotic surgery system. In the example of FIG. 21, the robotic medical system 200 comprises a patient support platform 202 (e.g., a patient platform, a table, a bed, etc.). The two ends along the length of the patient support platform 202 are respectively referred to as "head" and "leg". The two sides of the patient support platform 202 are respectively referred to as "left" and "right." The patient support platform 202 includes a support 204 (e.g., a rigid frame) for the patient support platform 202.

The robotic medical system 200 also comprises a base 206 for supporting the robotic medical system 200. The base 206 includes wheels 208 that allow the robotic medical system 200 to be easily movable or repositionable in a physical environment. In some embodiments, the wheels 208 are omitted from the robotic medical system 200 or are retractable, and the base 206 can rest directly on the ground or floor. In some embodiments, the wheels 208 are replaced with feet.

The robotic medical system 200 includes one or more robotic arms 210. The robotic arms 210 can be configured to perform robotic medical procedures as described above with reference to FIGS. 1-20. Although FIG. 21 shows five robotic arms 210, it should be appreciated that the robotic medical system 200 may include any number of robotic arms, including less than five or six or more.

The robotic medical system 200 also includes one or more bars 220 (e.g., adjustable arm support or an adjustable bar) that support the robotic arms 210. Each of the robotic arms 210 is supported on, and movably coupled to, a bar 220, by a respective base joint of the robotic arm. In some embodiments, and as described in FIG. 12, bar 220 can provide several degrees of freedom, including lift, lateral translation, tilt, etc. In some embodiments, each of the robotic arms 210 and/or the adjustable arm supports 220 is also referred to as a respective kinematic chain.

FIG. 21 shows three robotic arms 210 supported by the bar 220 that is in the field of view of the figure. The two remaining robotic arms are supported by another bar that is located across the other length of the patient support platform 202.

In some embodiments, the adjustable arm supports 220 can be configured to provide a base position for one or more of the robotic arms 210 for a robotic medical procedure. A robotic arm 210 can be positioned relative to the patient support platform 202 by translating the robotic arm 210 along a length of its underlying bar 220 and/or by adjusting a position and/or orientation of the robotic arm 210 via one or more joints and/or links (see, e.g., FIG. 23). In some embodiments, the bar pose can be changed via manual manipulation, teleoperation, and/or power assisted motion.

In some embodiments, the adjustable arm support 220 can be translated along a length of the patient support platform 202. In some embodiments, translation of the bar 220 along a length of the patient support platform 202 causes one or more of the robotic arms 210 supported by the bar 220 to be simultaneously translated with the bar or relative to the bar. In some embodiments, the bar 220 can be translated while keeping one or more of the robotic arms stationary with respect to the base 206 of the robotic medical system 200.

In the example of FIG. 21, the adjustable arm support 220 is located along a length of the patient support platform 202. In some embodiments, the adjustable arm support 220 may extend across a partial or full length of the patient support platform 202, and/or across a partial or full width of the patient support platform 202.

During a robotic medical procedure, one or more of the robotic arms 210 can also be configured to hold instruments 212 (e.g., robotically controlled medical instruments or tools, such as an endoscope and/or any other instruments (e.g., sensors, illumination instrument, cutting instrument, etc.) that may be used during surgery), and/or be coupled to one or more accessories, including one or more cannulas, in accordance with some embodiments.

Figure 22:
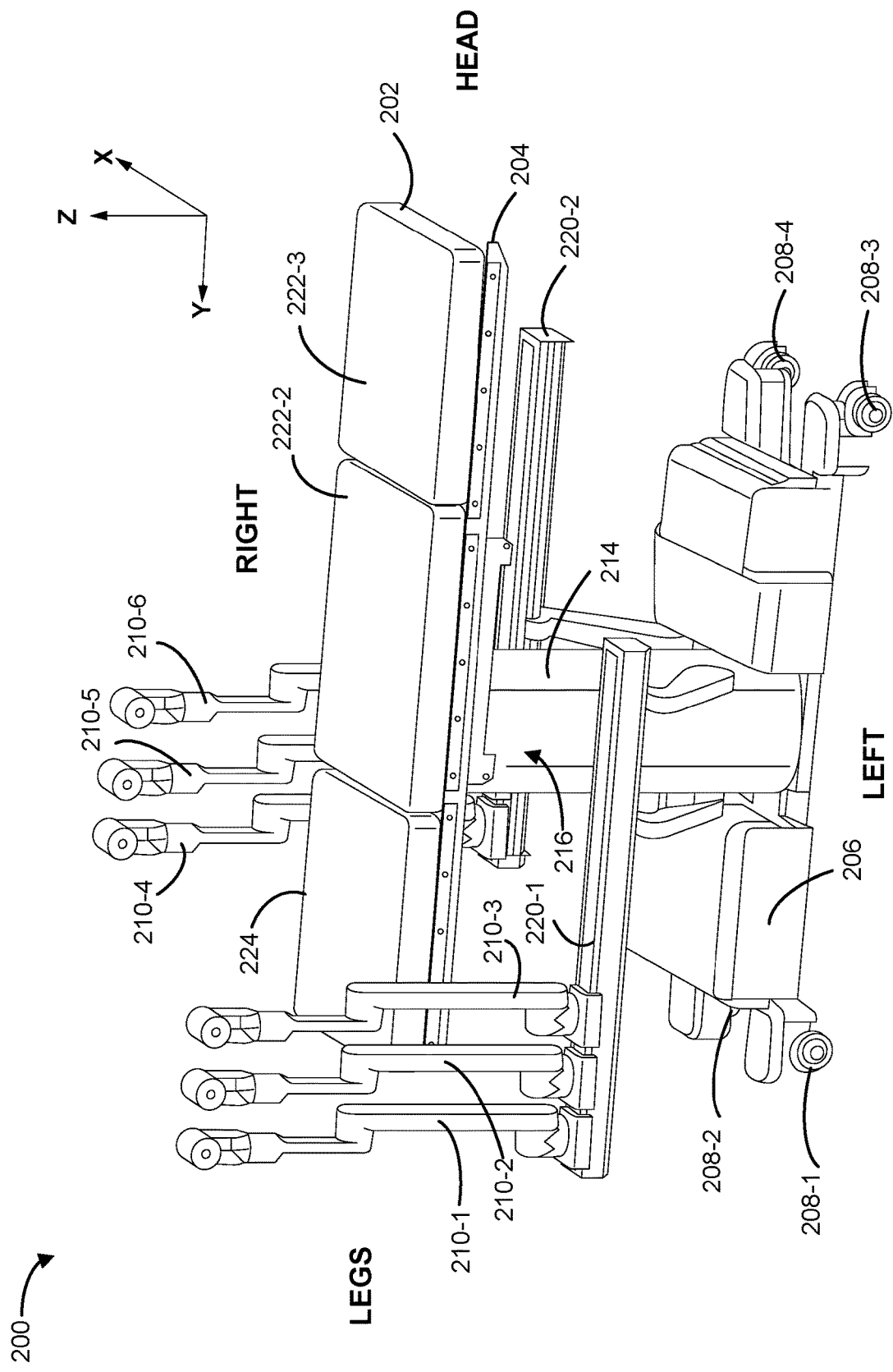
FIG. 22 illustrates another view of an exemplary robotic system according to some embodiments.

FIG. 22 illustrates another view of the exemplary robotic medical system 200 in FIG. 21 according to some embodiments. In this example, the robotic medical system 200 includes six robotic arms 210-1, 210-2, 210-3, 210-4, 210-5, and 210-6. The patient platform 202 is supported by a column 214 that extends between the base 206 and the patient platform 202. In some embodiments, the patient platform 202 comprises a tilt mechanism 216. The tilt mechanism 216 can be positioned between the column 214 and the patient platform 202 to allow the patient platform 202 to pivot, rotate, or tilt relative to the column 214. The tilt mechanism 216 can be configured to allow for lateral and/or longitudinal tilt of the patient platform 202. In some embodiments, the tilt mechanism 216 allows for simultaneous lateral and longitudinal tilt of the patient platform 202.

FIG. 22 shows the patient platform 202 in an untilted state or position. In some embodiments, the untilted state or position is a default position of the patient platform 202. In some embodiments, the default position of the patient platform 202 is a substantially horizontal position as shown in FIG. 22. As illustrated, in the untilted state, the patient platform 202 can be positioned horizontally or parallel to a surface that supports the robotic medical system 200 (e.g., the ground or floor). In some embodiments, the term "untilted" refers to a state in which the angle between the default position and the current position is less than a threshold angle (e.g., less than 5 degrees, or less than an angle that would cause the patient to shift on the patient platform, etc.). In some embodiments, the term "untilted" refers to a state in which the patient platform is substantially perpendicular to the direction of gravity, irrespective of the angle formed by the surface that supports the robotic medical system 200 relative to gravity.

With continued reference to FIG. 22, in the illustrated example of the robotic medical system 200, the patient platform 202 comprises a support 204. In some embodiments, the support 204 includes a rigid support structure or frame, and can support one or more surfaces, pads, or cushions 222. An upper surface of the patient platform 202 can include a support surface 224. During a medical procedure, a patient can be placed on the support surface 224.

FIG. 22 shows the robotic arms 210 and the adjustable arm supports 220 in an exemplary deployed configuration in which the robotic arms 210 reach above the patient platform 202. In some embodiments, due to the configuration of the robotic medical system 200, which enables stowage of different components beneath the patient platform 202, the robotic arms 210 and the arm supports 220 can occupy a space underneath the patient platform 202. Thus, in some embodiments, the tilt mechanism 216 has a low-profile and/or low volume in order to increase the space available for storage below.

FIG. 22 also illustrates an example, x, y, and z coordinate system that may be used to describe certain features of the embodiments disclosed herein. It will be appreciated that this coordinate system is provided for purposes of example and explanation only and that other coordinate systems may be used. In the illustrated example, the x-direction or x-axis extends in a lateral direction across the patient platform 202 when the patient platform 202 is in an untilted state. In some configurations, the x-direction extends across the patient platform 202 from one lateral side (e.g., the right side) to the other lateral side (e.g., the left side) when the patient platform 202 is in an untilted state. The y-direction or y-axis extends in a longitudinal direction along the patient platform 202 when the patient platform 202 is in an untilted state. That is, the y-direction extends along the patient platform 202 from one longitudinal end (e.g., the head end) to the other longitudinal end (e.g., the legs end) when the patient platform 202 is in an untilted state. In an untilted state, the patient platform 202 can lie in or be parallel to the x-y plane, which can be parallel to the floor or ground. In the illustrated example, the z-direction or z-axis extends along the column 214 in a vertical direction. In some embodiments, the tilt mechanism 216 is configured to laterally tilt the patient platform 202 by rotating the patient platform 202 about a lateral tilt axis that is parallel to the y-axis. The tilt mechanism 216 can further be configured to longitudinally tilt the patient platform 202 by rotating the patient platform 202 about a longitudinal tilt axis that is parallel to the x-axis.

Figure 23:
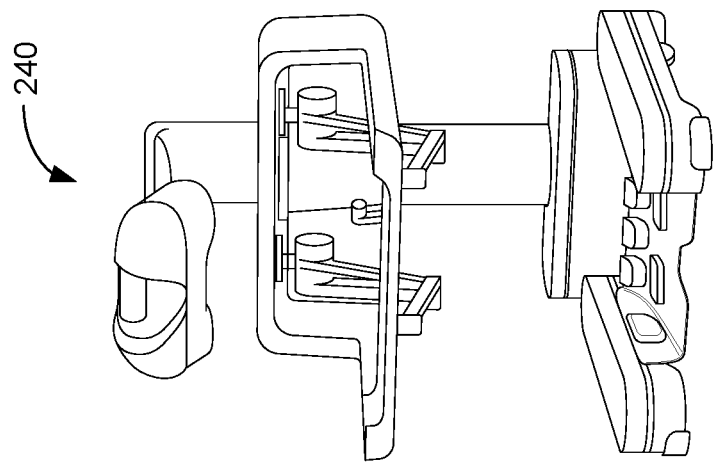
FIG. 23 illustrates components of a robotic medical system in accordance with some embodiments.
Figure 23:
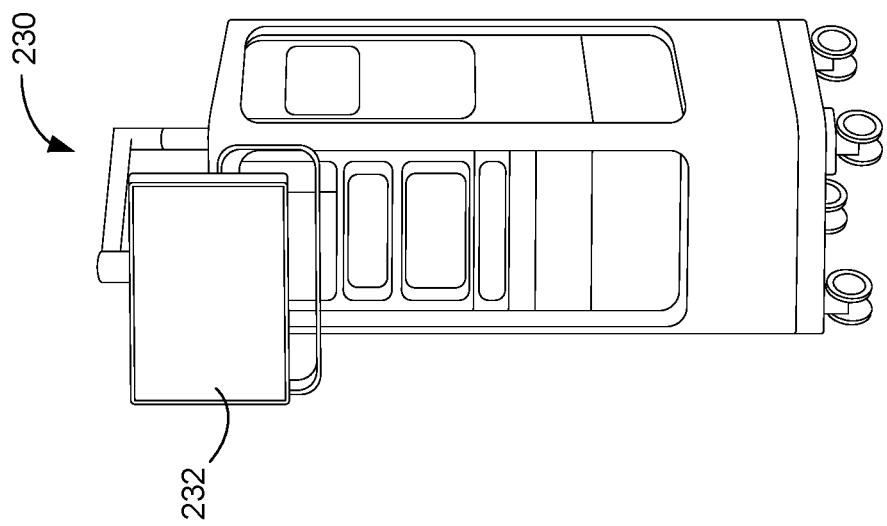

In some embodiments, the robotic medical system 200 includes components such as a tower 230 (e.g., tower viewer) and a physician console 240, as illustrated in FIG. 23. The tower 230 may correspond to the tower 30 described above, and may provide support for controls, electronics, fluidics, optics, sensors, and/or power for the patient support platform 202 and the physician console 240. In some embodiments, the tower 230 includes a display device 232. The display device 232 can include a user interface for displaying a surgical view obtained by one or more cameras of the robotic medical system and/or one or more notifications to an operator of the robotic medical system 200. In some embodiments, the physician console 240 can include a display device having a user interface used by the physician operator for operating the patient support platform 202. The physician console 240 can provide both robotic controls and pre-operative and real-time information of a medical procedure to a physician operator.

B. Robotic Arm.

Figure 24C:
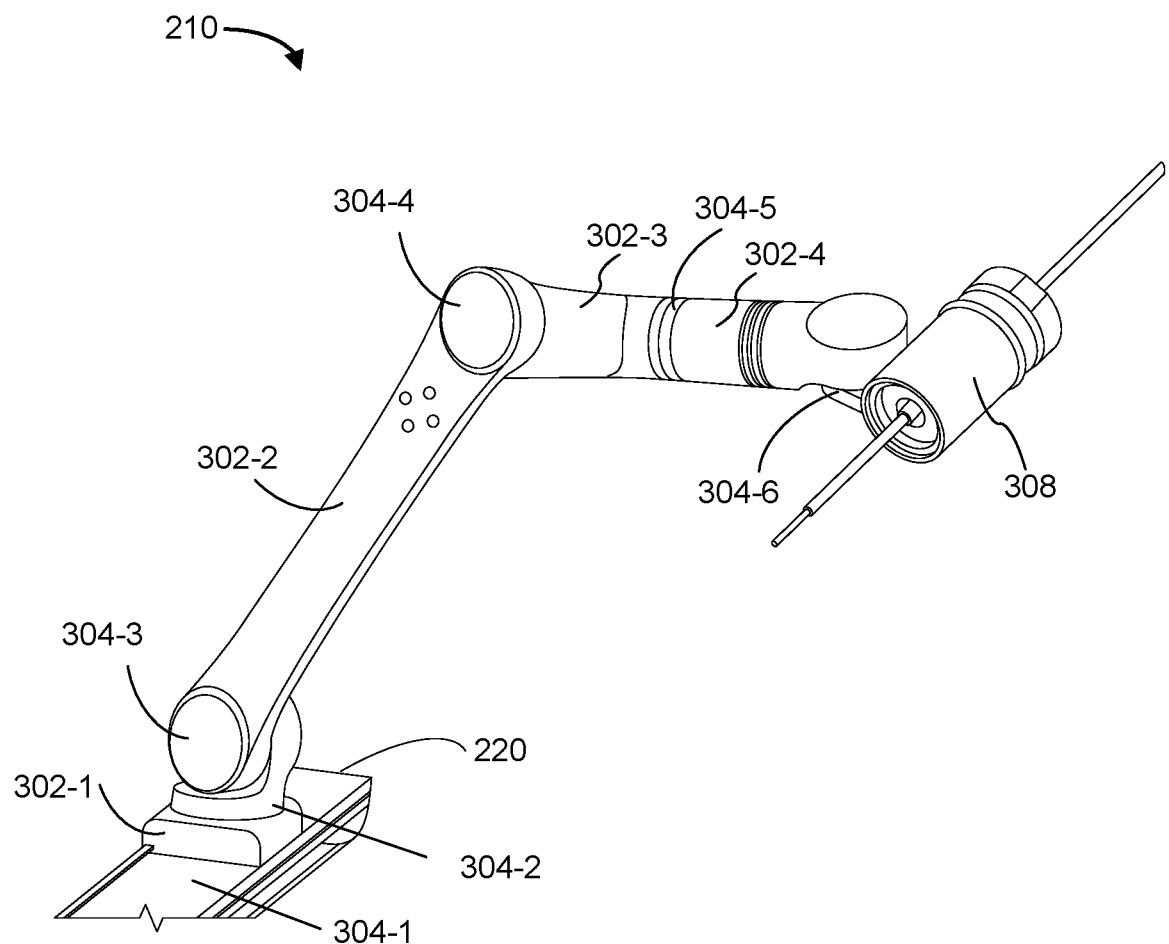

FIGS. 24A to 24C illustrate different views of an exemplary robotic arm 210 according to some embodiments.

FIG. 24A illustrates that the robotic arm 210 includes a plurality of links 302 (e.g., linkages). The links 302 are connected by one or more joints 304. Each of the joints 304 includes one or more degrees of freedom (DoFs).

In FIG. 24A, the joints 304 include a first joint 304-1 (e.g., a base joint or an AO joint) that is located at or near a base 306 of the robotic arm 210. In some embodiments, the base joint 304-1 comprises a prismatic joint that allows the robotic arm 210 to translate along the bar 220 (e.g., along the y-axis). The joints 304 also include a second joint 304-2. In some embodiments, the second joint 304-2 rotates with respect to the base joint 304-1. The joints 304 also include a third joint 304-3 that is connected to one end of link 302-2. In some embodiments, the joint 304-3 includes multiple DoFs and facilitates both tilt and rotation of the link 302-2 tilt with respect to the joint 304-3.

FIG. 24A also shows a fourth joint 304-4 that is connected to the other end of the link 302-2. In some embodiments, the joint 304-4 comprises an elbow joint that connects the link 302-2 and the link 302-3. The joints 304 further comprise a pair of joints 304-5 (e.g., a wrist roll joint) and 304-6 (e.g., a wrist pitch joint), which is located on a distal portion of the robotic arm 210.

A proximal end of the robotic arm 210 may be connected to a base 306 and a distal end of the robotic arm 210 may be connected to an advanced device manipulator (ADM) 308 (e.g., a tool driver, an instrument driver, or a robotic end effector, etc.). The ADM 308 may be configured to control the positioning and manipulation of a medical instrument 212 (e.g., a tool, a scope, etc.).

The robotic arm 210 can also include a cannula sensor 310 for detecting presence or proximity of a cannula to the robotic arm 210. In some embodiments, the robotic arm 210 is placed in a docked state (e.g., docked position) when the cannula sensor 310 detects presence of a cannula (e.g., via one or more processors of the robotic medical system 200). In some embodiments, when the robotic arm 210 is in a docked position, the robotic arm 210 can execute null space motion to maintain a position and/or orientation of the cannula, as discussed in further detail below. Conversely, when no cannula is detected by the cannula sensor 310, the robotic arm 210 is placed in an undocked state (e.g., undocked position).

In some embodiments, and as illustrated in FIG. 24A, the robotic arm 210 includes an input or button 312 (e.g., a donut-shaped button, or other types of controls, etc.) that can be used to place the robotic arm 210 in an admittance mode (e.g., by depressing the button 312). The admittance mode is also referred to as an admittance scheme or admittance control. In the admittance mode, the robotic medical system 210 measures forces and/or torques (e.g., imparted on the robotic arm 210) and outputs corresponding velocities and/or positions. In some embodiments, the robotic arm 210 can be manually manipulated by a user (e.g., during a set-up procedure, or in between procedures, etc.) in the admittance mode. In some instances, by using admittance control, the operator need not overcome all of the inertia in the robotic medical system 200 to move the robotic arm 210. For example, under admittance control, when the operator imparts a force on the arm, the robotic medical system 200 can measure the force and assist the operator in moving the robotic arm 210 by driving one or more motors associated with the robotic arm 210, thereby resulting in desired velocities and/or positions of the robotic arm 210.

In some embodiments, the links 302 may be detachably coupled to the medical tool 212 (e.g., to facilitate ease of mounting and dismounting of the medical tool 212 from the robotic arm 210). The joints 304 provide the robotic arm 210 with a plurality of degrees of freedom (DoFs) that facilitate control of the medical tool 212 via the ADM 308. In an embodiment as shown in FIG. 23 including multiple robotic arms, each robotic arm can hold its own respective medical tool and pivot the medical tool about a remote center of motion.

FIG. 24B illustrates a front view of the robotic arm 210. FIG. 24C illustrates a perspective view of the robotic arm 210. In some embodiments, the robotic arm 210 includes a second input or button 314 (e.g., a push button) that is distinct from the button 312 in FIG. 24A, for placing the robotic arm 210 in an impedance mode (e.g., by a single press or continuous press and hold of the button 314). In this example, the button 314 is located between the joint 304-5 and the joint 304-6. The impedance mode is also referred to as impedance scheme or impedance control. In the impedance mode, the robotic medical system 200 measures displacements (e.g., changes in position and velocity) and outputs forces and/or torques to facilitate manual movement of the robotic arm. In some embodiments, the robotic arm 210 can be manually manipulated by a user (e.g., during a set-up procedure) in the impedance mode. In some embodiments, under the impedance mode, the operator's movement of one part of a robotic arm 210 may cause motion in one or more joints and/or links throughout the robotic arm 210.

In some embodiments, for admittance control, a force sensor or load cell can measure the force that the operator is applying to the robotic arm 210 and move the robotic arm 210 in a way that feels light. Admittance control may feel lighter than impedance control because, under admittance control, one can hide the perceived inertia of the robotic arm 210 because motors in the controller can help to accelerate the mass. In contrast, with impedance control, the user is responsible for most if not all mass acceleration, in accordance with some embodiments.

In some circumstances, depending on the position of the robotic arm 210 relative to the operator, it may be inconvenient to reach the button 312 and/or the button 314 to activate a manual manipulating mode (e.g., the admittance mode and/or the impedance mode). Accordingly, under these circumstances, it may be convenient for the operator to trigger the manual manipulation mode other than by buttons.

In some embodiments, the robotic arm 210 includes a single button (e.g., the button 312 or 314) that can be used to place the robotic arm 210 in the admittance mode and/or the impedance mode (e.g., by using different presses, such as a long press, a short press, press and hold etc.). In some embodiments, the robotic arm 210 can be placed in impedance mode by a user pushing on arm linkages (e.g., the links 302) and/or joints (e.g., the joints 304) and overcoming a force threshold. In some embodiments, the admittance mode and the impedance mode are common in that they both allow the user to grab the robotic arm 210 and command motion by directly interfacing with it.

During a medical procedure, it can be desirable to have the ADM 308 of the robotic arm 210 and/or a remote center of motion (RCM) of the tool 212 coupled thereto kept in a static pose (e.g., position and/or orientation). An RCM may refer to a point in space where a cannula or other access port through which a medical tool 212 is inserted is constrained in motion. In some embodiments, the medical tool 212 includes an end effector that is inserted through an incision or natural orifice of a patient while maintaining the RCM. In some embodiments, the medical tool 212 includes an end effector that is in a retracted state during a setup process of the robotic medical system 200.

In some circumstances, the robotic medical system 200 can be configured to move one or more links 302 of the robotic arm 210 within a "null space" to avoid collisions with nearby objects (e.g., other robotic arms), while the ADM 308 of the robotic arm 210 and/or the RCM are maintained in their respective poses (e.g., positions and/or orientations). The null space can be viewed as the set of joint states through which a robotic arm 210 can move that does not result in movement of the ADM 308 and/or RCM, thereby maintaining the position and/or the orientation of the medical tool 212 (e.g., within a patient). In some embodiments, a robotic arm 210 can have multiple positions and/or configurations available for each pose of the ADM 308.

For a robotic arm 210 to move an instrument to a desired pose in space, in certain embodiments, the robotic arm 210 may have at least six DoFs—three DoFs for translation (e.g., X, Y, and Z positions) and three DoFs for rotation (e.g., yaw, pitch, and roll). In some embodiments, each joint 304 may provide the robotic arm 210 with a single DoF, and thus, the robotic arm 210 may have at least six joints to achieve freedom of motion to position the ADM 308 at any pose in space. To further maintain the ADM 308 of the robotic arm 210 and/or the remote center or motion in a desired pose, the robotic arm 210 may further have at least one additional "redundant joint." Thus, in certain embodiments, the system may include a robotic arm 210 having at least seven joints 304, providing the robotic arm 210 with at least seven DoFs. In some embodiments, the robotic arm 210 may include a subset of joints 304 each having more than one degree of freedom thereby achieving the additional DoFs for null space motion. However, depending on the embodiment, the robotic arm 210 may have a greater or fewer number of DoFs.

Furthermore, as described with respect to FIG. 12, the bar 220 (e.g., adjustable arm support) can provide several degrees of freedom, including lift, lateral translation, tilt, etc. Thus, depending on the embodiment, a robotic medical system 200 can have many more robotically controlled degrees of freedom beyond just those in the robotic arms 210 to provide for null space movement and collision avoidance. In a respective embodiment of these embodiments, the end effectors of one or more robotic arms (and any tools or instruments coupled thereto) and a remote center along the axis of the tool can advantageously maintain in pose and/or position within a patient.

A robotic arm 210 having at least one redundant DoF has at least one more DoF than the minimum number of DoFs for performing a given task. For example, a robotic arm 210 can have at least seven DoFs, where one of the joints 304 of the robotic arm 210 can be considered a redundant joint, in accordance with some embodiments. The one or more redundant joints can allow the robotic arm 210 to move in a null space to both maintain the pose of the ADM 308 and a position of an RCM and avoid collision(s) with other robotic arms or objects.

In some embodiments, the robotic medical system 200 can be configured to perform collision avoidance to avoid collision(s), e.g., between adjacent robotic arms 210, by taking advantage of the movement of one or more redundant joints in a null space. For example, when a robotic arm 210 collides with or approaches (e.g., within a defined distance of) another robotic arm 210, one or more processors of the robotic medical system 200 can be configured to detect the collision or impending collision (e.g., via kinematics). Accordingly, the robotic medical system 200 can control one or both of the robotic arms 210 to adjust their respective joints within the null space to avoid the collision or impending collision. In an embodiment including at least a pair of robotic arms, a base of one of the robotic arms and its end effector can stay in its pose, while links or joints therebetween move in a null space to avoid collisions with an adjacent robotic arm.

C. Setup Workflows.

Figure 25:
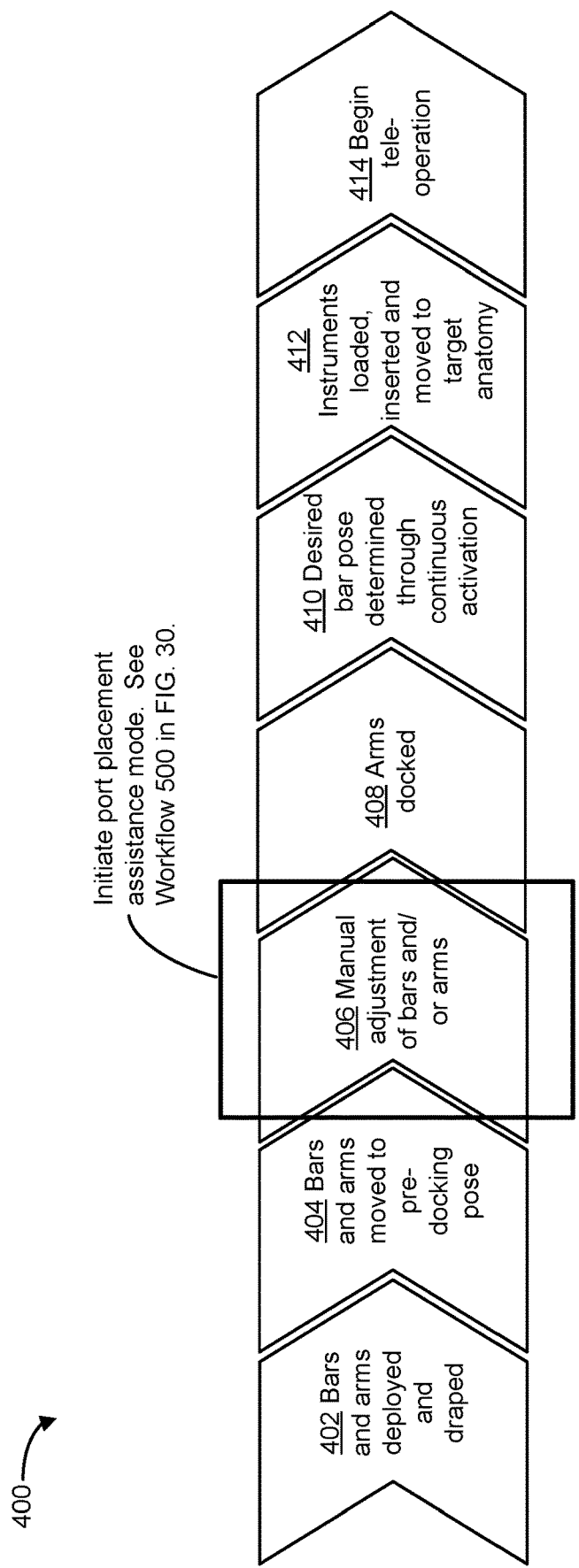
FIG. 25 illustrates a procedural setup workflow for a robotic medical system in accordance with some embodiments.

FIG. 25 illustrates a procedural setup workflow 400 for a robotic medical system 200 in accordance with some embodiments.

Figure 26:
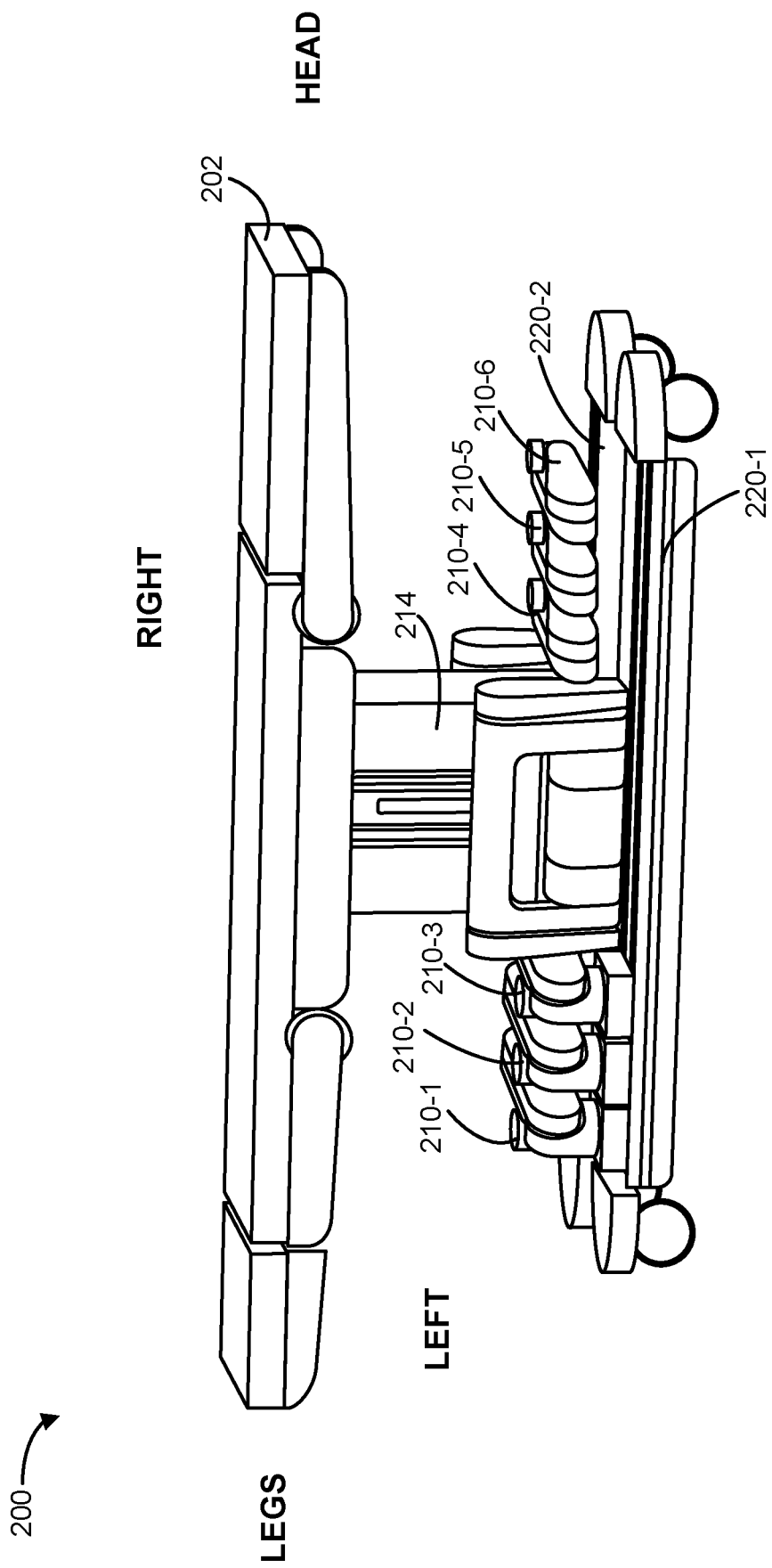
FIG. 26 illustrates a robotic medical system in a stowed state in accordance with some embodiments.
Figure 27A:
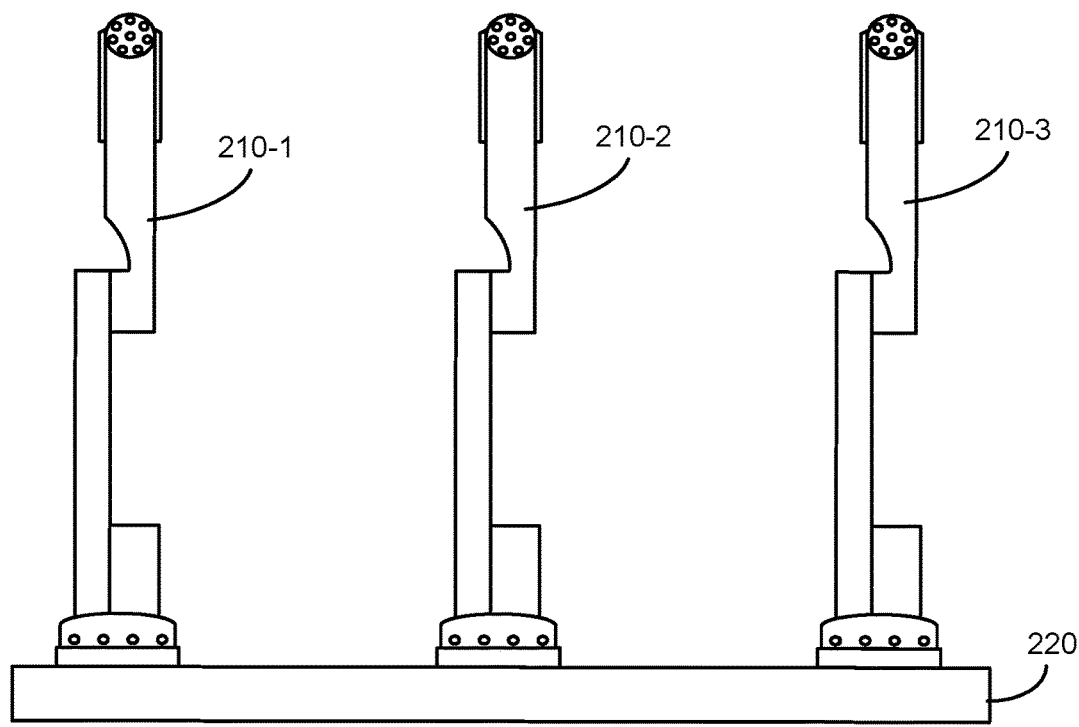
FIGS. 27A and 27B illustrate respectively, a robotic medical system in an initial deployed state, and arms and a bar of the robotic medical system covered by drapes, in accordance with some embodiments.
Figure 27B:
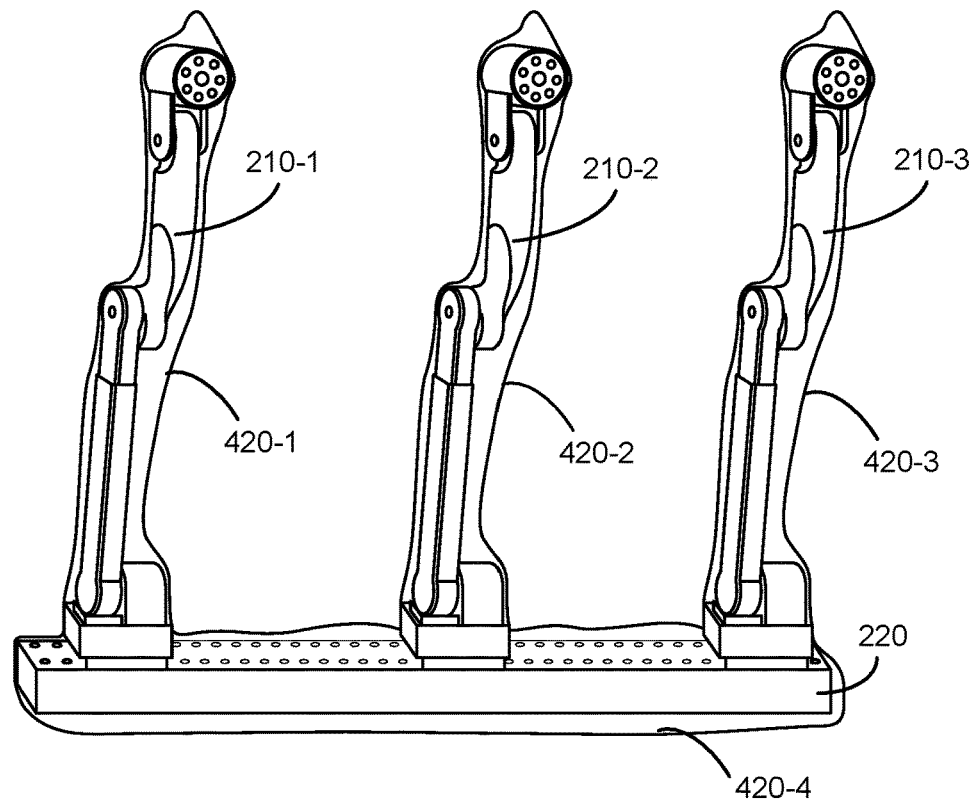

The workflow 400 includes, in step 402, deploying the bars 220 and the robotic arms 210 from a stowed state to a deployed state. For example, FIG. 26 illustrates a robotic medical system 200 in a stowed state in accordance with some embodiments. In FIG. 26, the robotic arms 210 and the bars 220 are stowed beneath the table 202 of the robotic medical system 200. FIG. 27A illustrates three robotic arms 210 and their underlying bar 220 in an initial deployed state, in accordance with some embodiments. In some embodiments, the robotic arms 210 and the bar 220 can be draped while they are in the initial deployed state. FIG. 27B depicts the robotic arms 210 and the bar 220 covered by drapes 420 (e.g., surgical drapes, surgical covering, etc.), to isolate the robotic arms 210 and the bar 220 from a patient's body during surgery, in accordance with some embodiments.

With continued reference to FIG. 25, the workflow 400 includes, in step 404, moving the robotic arms 210 and the bars 220 to a pre-docking pose after they have been draped. In some embodiments, the robotic medical system 200 (e.g., via one or more processors) causes robotic movement of the robotic arms 210 and/or bars 220 to the pre-docking pose. In some embodiments, the robotic system 200 causes robotic movement of the arms 210 and/or bars 220 to the pre-docking pose in accordance with a recommended pose that corresponds to a surgical procedure to be performed on a patient via the robotic medical system 200 (e.g., the pre-docking pose corresponding to the recommended pose selected based on a surgical procedure to be performed on the patient via the robotic medical system 200).

In some embodiments, the robotic movement of the bars 220 and/or arms 210 to a particular pre-docking pose is initiated in response to user (e.g., a surgeon assistant, patient side staff, surgeon, etc.) selection of a particular procedure on a user interface located on a tower viewer 230, a physician console 240, or a bed pendant of the robotic medical system 200. For example, in some embodiments, different surgical procedures have different bar and arm setups (e.g., different pre-docking setups, each of the setups having a corresponding bar-and-arm-pose configuration) that facilitates the subsequent docking of the robotic arms in step 410 (e.g., placing the robotic arms 210 and the bars 220 in a certain configuration reduces subsequent adjustment of the positions of the robotic arms 210 and the bars 220 for docking). The user interface can include one or more interface elements that identify the surgical procedures. User selection of a procedure via a corresponding interface element causes the robotic system to automatically execute movement (e.g., robotic movement) to move the robotic arms 220 and the bars 210 to a particular pre-docking pose corresponding to the selected procedure.

Figure 28:
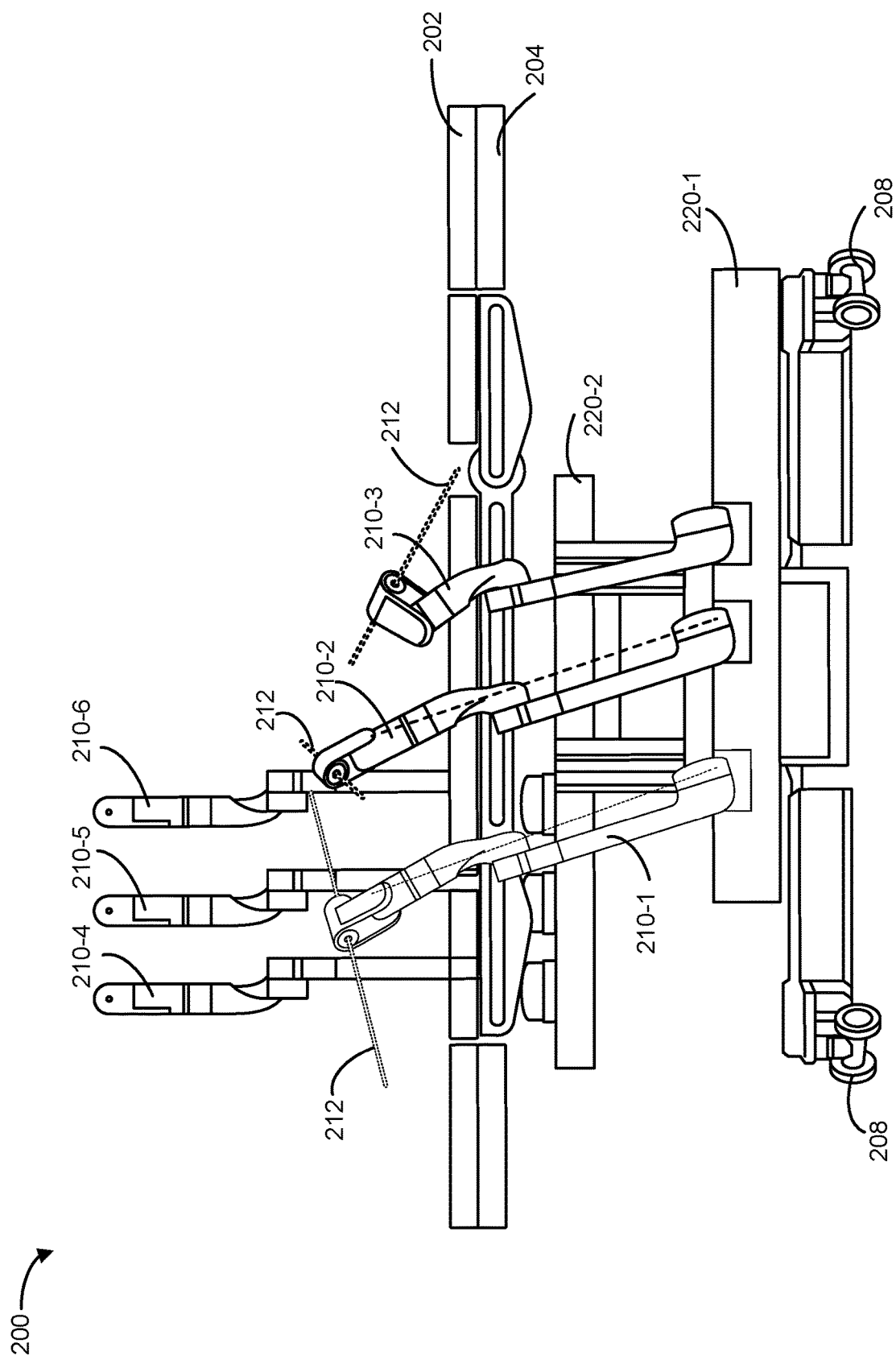
FIG. 28 illustrates a medical robotic system that includes one set of robotic arms in a pre-docking pose and another set of robotic arms that are being robotically moved to a pre-docking pose, in accordance with some embodiments.

FIG. 28 illustrates a robotic medical system 200 that includes one set of robotic arms (e.g., robotic arms 210-4, 210-5, and 210-6) in the background that are in an initial deployed state (e.g., whereby they can be draped), in accordance with some embodiments. FIG. 28 also shows another set of robotic arms (e.g., robotic arms 210-1, 210-2, and 210-3) in the foreground that are being robotically moved to a pre-docking pose from the initial deployed state, in accordance with some embodiments. After the foreground robotic arms (e.g., robotic arms 210-1, 210-2, and 210-3) have been moved to the pre-docking pose, they may be docked and loaded with instruments 212. In some embodiments, adjustments of the robotic arms described herein are, optionally, performed before loading of the instruments. The view of the patient as well as the respective ports/cannulas within the patient have been excluded from FIG. 28 so as not to obscure the visibility of the robotic arms 210.

With continued reference to FIG. 25, in some embodiments, the workflow 400 includes, in step 406, manual adjustment (e.g., manual movement) of the bars 220 and/or arms 210. Examples of manual adjustment include manual adjustment of a robotic arm (e.g., robotic arm jogging) and manual adjustment of a bar (e.g., bar pose jogging). In some embodiments, manual robotic arm jogging can be performed via admittance control (e.g., by activating admittance mode in the robotic arm as described with respect to FIG. 24A). For example, in some embodiments, manual robotic arm jogging can be performed by pressing an input control or button, such as the button 312 in FIG. 24A. In some embodiments, manual bar jogging can be performed via a user actuating a tower (e.g., tower 230 or tower 30) or a bed pendant.

In some embodiments, step 406 may include establishing boundary conditions for safety reasons. The boundary conditions can be unique to a particular surgery. The boundary conditions can also be based on an accessory that is utilized for the procedure, and/or based on patient information, such as patient fixation (e.g., how a patient is fixed to or positioned on the bed 202) or patient size.

In some embodiments, the sequence in which step 404 and step 406 are executed is interchangeable. For example, in some embodiments, step 404 can be executed before step 406. In some embodiments, step 404 can be executed after step 406. In some embodiments, step 404 and step 406 can be executed as an iterative loop in which the steps of robotic movements (step 404) and manual movements (step 406) are iterated successively. In some embodiments, the step 404 and the step 406 collectively form a single pre-docking setup step, in which the bars 220 and the robotic arms 210 can be moved robotically as well as manually, and the order of execution of the robotic and manual movements may change based on various factors (e.g., type of a procedure, difference between recommended positions and current positions of distal ends of robotic arms, etc.).

In some embodiments, after the robotic arms 210 and the bars 220 have been moved to the pre-docking pose (e.g., in step 404), and prior to the docking of the robotic arms (in step 408), the robotic medical system 200 can provide port placement guidance or assistance to a physician before incisions are made in a patient (e.g., incisions are made in a patient after the robotic arms 210 have been placed in a docked state in step 408). Further details of the port placement assistance mode are discussed with reference to FIG. 30 below.

With continued reference to FIG. 25, in some embodiments, the workflow 400 includes, in step 408, placing the robotic arms 210 in a docked state. In some embodiments, the robotic arms 210 are docked to one or more cannulas whereby they can be subsequently coupled to one or more corresponding instruments 212 (e.g., robotically-controlled medical instruments or tools, such as an endoscope, a laparoscope, and/or any another instruments that may be used during surgery) in step 412. In some embodiments, the robotic arms 210 are individually docked via admittance docking. For example, a user will handle the robotic arm 210 (e.g., via the button 312 in FIG. 24A) using one hand and handle a cannula using the other hand. The user will then bring the robotic arm 210 to the cannula, thereby placing the robotic arm 210 in a docked state.

Figure 29:
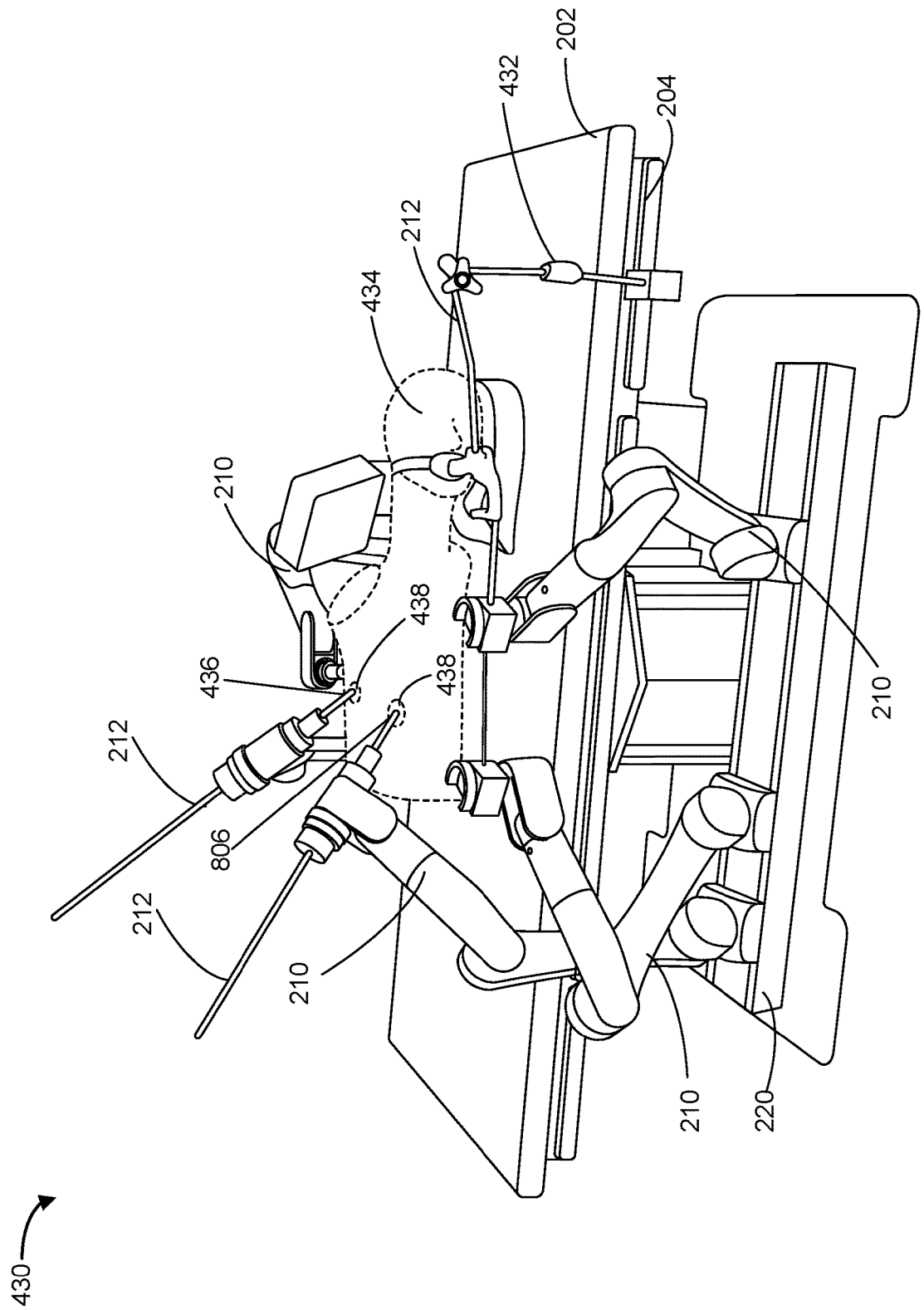
FIG. 29 depicts a robotic medical system in which robotic arms are docked to cannulas, in accordance with some embodiments.

FIG. 29 illustrates an exemplary setup 430 for a surgery that is performed using a robotic medical system 200, in accordance with some embodiments. The setup 430 includes an accessory 432 that is connected to a support 204 (e.g., a rigid frame, or a bed rail) of the robotic system. Using FIG. 29 as an example, in some embodiments, a user can establish a boundary condition by taking into consideration the accessory 432 and establishing (e.g., ascertaining, determining, etc.) how close the bar 220 can be brought to the table-top 202 in view of the accessory 432.

In the example of FIG. 29, the robotic arms 210 are docked to cannulas. In some embodiments, with the robotic arms 210 docked to the corresponding cannulas, the robotic medical system 200 determines a remote center of motion (RCM) 436 and/or a port of entry 438 (e.g., port) with respect to each of the robotic arms 210. In other words, placing the robotic arms 210 in a docked state facilitates the determination of the respective RCM 436 and/or port of entry 438. As used herein, an RCM 436 may refer to a point in space where a cannula or other access port through which a medical tool/instrument is inserted is constrained in motion, or a pivot point along an axis of the instrument. In some embodiments, the RCM 436 refers to a point of intersection of a cannula and the patient's body. In some embodiments, the RCM 436 has a corresponding port of entry 438 that is located on the body of a patient 434. The port of entry 438 is an entry point on the patient 434 for the robotic arm 210 (e.g., robotic manipulator). In some embodiments, the port of entry 438 (or, e.g., port, port location, entry point, port region, port area, port position, etc.) refers to the position on the patient's body through which the medical tool/instrument is inserted and constrained in motion. In some embodiments, the port of entry 438 corresponds to an incision point (or an incision region) that is made through the skin of the patient 434 to facilitate a medical operation or procedure. In some embodiments, a physician may make one or more incisions (e.g., one or more ports of entry) on a patient to facilitate a medical operation or procedure after the robotic arms have been placed in a docked state. In some embodiments, the port of entry 438 corresponds to a natural orifice, such as a mouth of the patient 434 (e.g., for a bronchoscopy procedure). In some embodiments, when a port of entry 438 is known to (e.g., established or determined by) the robotic medical system 200, the robotic medical system 200 can further infer other information, such as patient size, clinical techniques, etc.

FIG. 25 also illustrates that, in some embodiments, the workflow 400 includes, in step 410, determining a desired bar and/or arm pose through continuous activation. In some embodiments, after the bars 220 and/or the robotic arms 210 have been moved to their desired poses according to step 410, the instruments can then be loaded, inserted, and moved to a target anatomy of the patient, as illustrated in step 412. In other embodiments, step 412 (e.g., instrument loading) can be performed before step 410 (e.g., adjustment to desired poses). In step 414, the surgeon can begin teleoperation.

Figure 30:
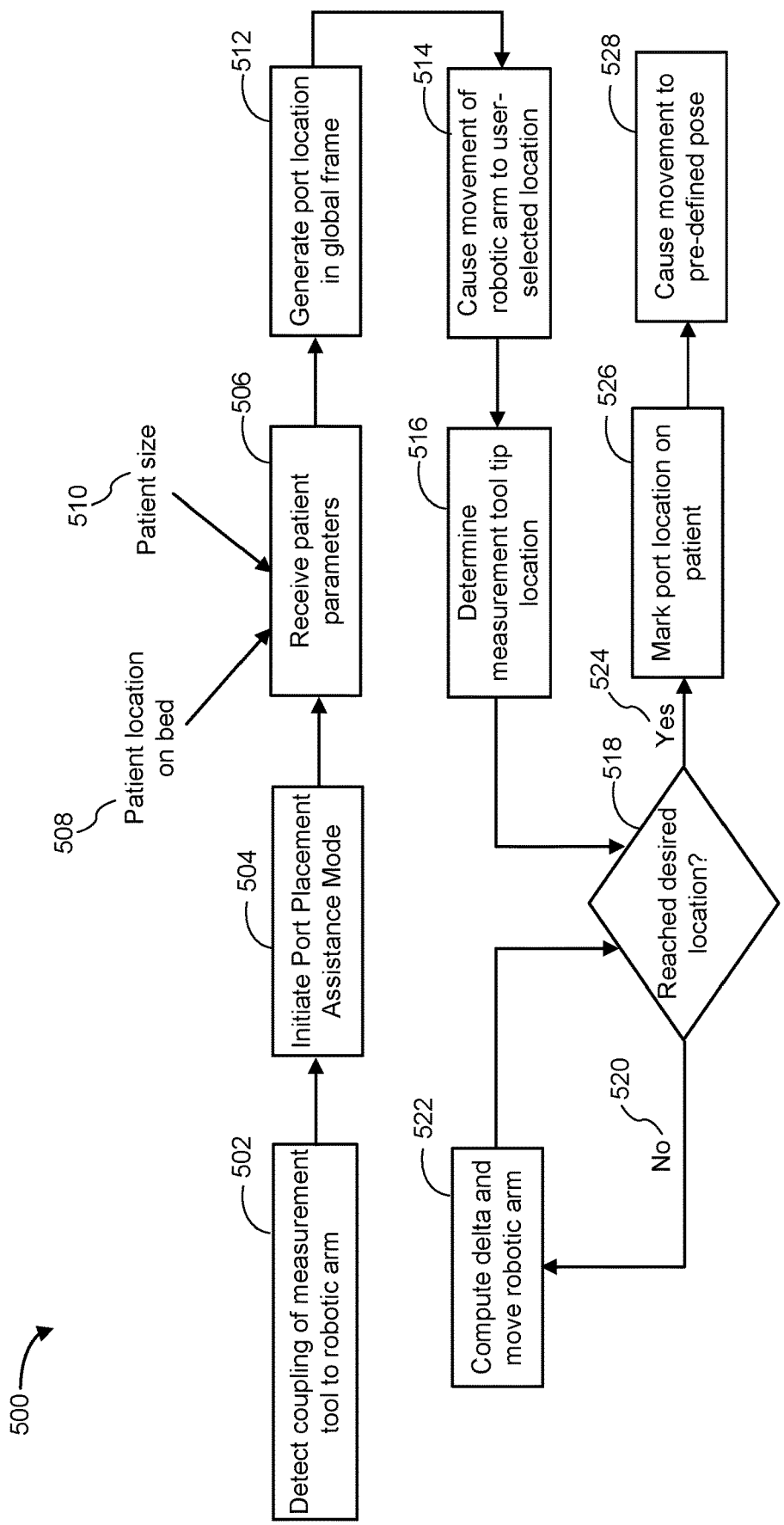
FIG. 30 illustrates a workflow for a port placement assistance mode executed by a robotic medical system in accordance with some embodiments.

As explained above, the robotic medical system 200 can provide port placement guidance or assistance to a physician before incisions are made in a patient (e.g., incisions are made in a patient after the robotic arms 210 have been placed in a docked state in step 408). FIG. 30 illustrates a workflow 500 for a port placement assistance mode that is executed by one or more processors 380 of a robotic medical system (e.g., robotic medical system 200), in accordance with some embodiments.

In some embodiments, the robotic medical system 200 executes the workflow 500, shown in FIG. 30, after the system reaches a pre-docking pose for a selected procedure (e.g., step 404 in FIG. 25). As discussed in FIG. 25, in the pre-docking pose, the robotic arms 210 may have been deployed and are placed in an initial pose that corresponds to a surgical procedure to be performed on the patient. In the pre-docking pose, a surgeon has not made incisions to a patient.

Figure 31A:
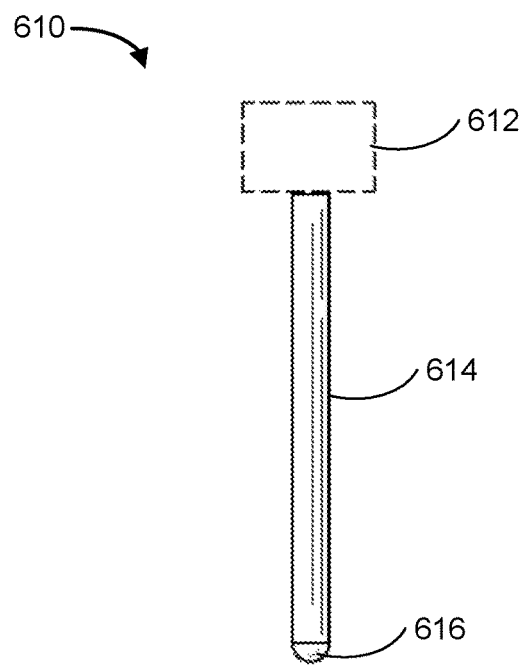
FIGS. 31A to 31D illustrate exemplary embodiments of a measurement tool.

In some embodiments, to facilitate port placement assistance, one or more robotic arms 210 are coupled to one or more measurement tools. In some embodiments, the measurement tool comprises a stylus tool that includes a measurement tip, such as the measurement tool 610 as shown in FIG. 31A. In some embodiments, the measurement tool can be a cannula that also serves as a measuring tool during port placement assistance mode. In some embodiments, the measurement tool comprises a contact tool. For example, the measurement tool can include a measurement tip that physically contacts an external surface of the patient. In some embodiments, the known dimension (e.g., length) of the measurement tool (e.g., for physical contact type) is used for determining the user-selected location. In some embodiments, the measurement tool comprises a non-contact tool capable of locating a surface on a patient without a physical contact. For example, the measurement tool can be a laser or a sensor that is coupled to a distal end of a robotic arm (e.g., placed on an end effector of a robotic arm). In some embodiments, the tool's measurement output (for non-contact type) is used for determining the user-selected location. In some embodiments, the measurement tool is an accessory that is detachably coupled (e.g., removably coupled) to a robotic arm. In some embodiments, the measurement tool is integrated with (e.g., forms a part of) a robotic arm.

FIG. 31A illustrates a measurement tool 610 in accordance with some embodiments. The measurement tool 610 includes a coupler 612 for coupling (e.g., removably coupling) the measurement tool to a robotic arm 210. In the example of FIG. 31A, the measurement tool 610 includes a fixed length 614 and a measurement tip 616. In some embodiments, the measurement tip 616 comprises a soft and/or blunt tip.

Figure 31B:
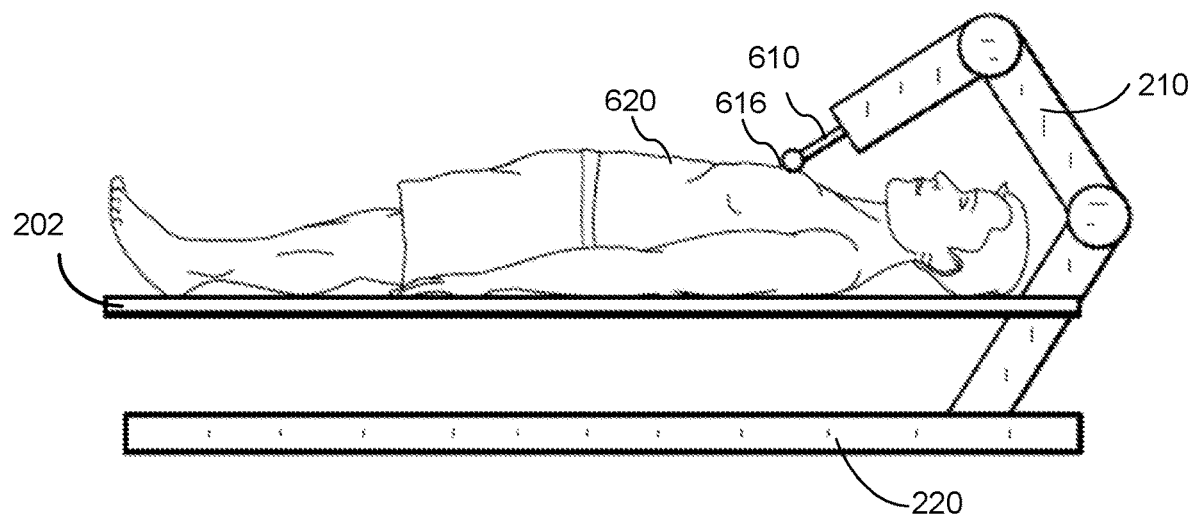

FIG. 31B illustrates contact between a measurement tool 610 (e.g., via the measurement tip 616) and an exterior surface (e.g., the skin) of a patient 620, in accordance with some embodiments. In this example, the patient 620 is supported by a patient support platform 202 of the robotic medical system 200. The measurement tool is coupled to a robotic arm 210 that is supported by an adjustable arm support (e.g., bar) 220. In some embodiments, the robotic medical system 200 has complete information regarding the precise location of a patient on a patient support platform, patient characteristics (e.g., patient profile, size, shape, etc.), and locations of accessories (e.g., accessory 432) that may be mounted on the robotic medical system 200. In some embodiments, when the robotic medical system 200 does not have complete information on the precise location of a patient on a patient support platform, patient characteristics (e.g., patient profile, size, shape, etc.), and/or locations of accessories (e.g., accessory 432) that may be mounted on the robotic medical system 200, the robotic medical system 200 can infer information such as patient size, patient location on the bed, etc. by detecting (e.g., determining) the location of the measurement tip 616 (and therefore the surface of the patient), and use the inferred information to guide its port placement recommendation. In some embodiments, the robotic medical system 200 utilizes a predefined model for determining the patient size, patient location on the bed, etc. based on the location(s) of the measurement tip 616. For example, the locations of the measurement tip 616 corresponding to two anatomical positions of the patient can be used to determine the patient size (e.g., based on the distance between the two anatomical positions) and the patient location on the bed (e.g., based on the mid-point between the two anatomical positions).

In some embodiments, the measurement tool 610 can be moved to different external locations of the patient (e.g., via movement of the robotic arm 210). In some embodiments, the measurement tool 610 is configured to retract prior to movement of the robotic arm 210 (and corresponding movement of the measurement tool), so that it does not contact the patient during movement.

Figure 31C:
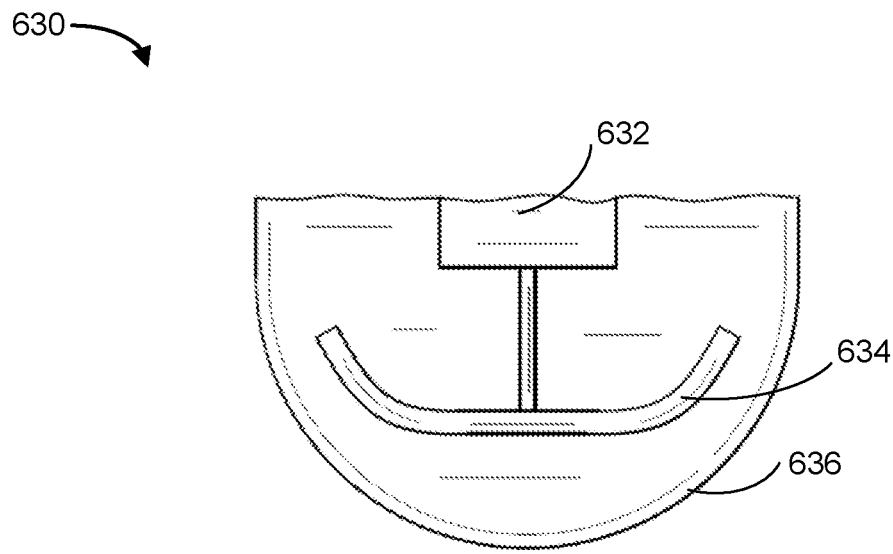

FIG. 31C illustrates a partial view of a measurement tool 630 according to some embodiments. In this example, the measurement tool 630 includes a measurement tip 636 (e.g., a soft tip, tip 616, etc.), a load cell 632 for measuring force(s) on a patient surface or a robotic arm, and a loading tray 634 that interacts with a patient (e.g., the loading tray 634 delivers force to the load cell 632 when the measurement tip 636 is brought into contact with the patient surface).

Figure 31D:
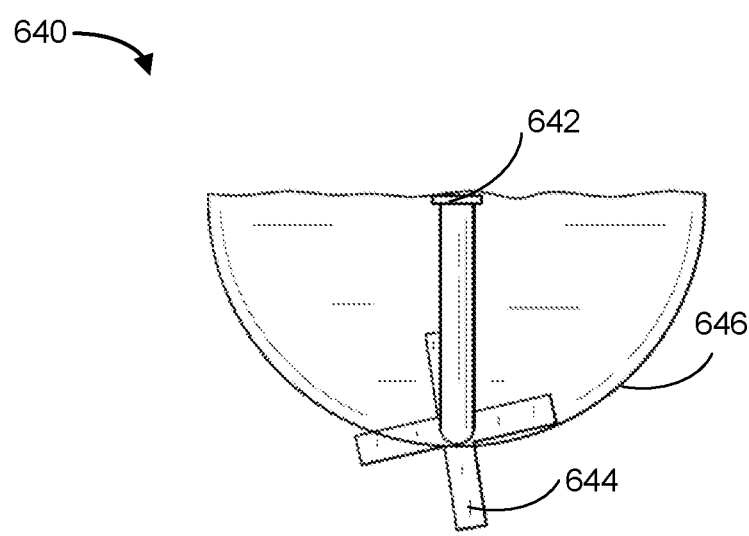
Figure 32A:
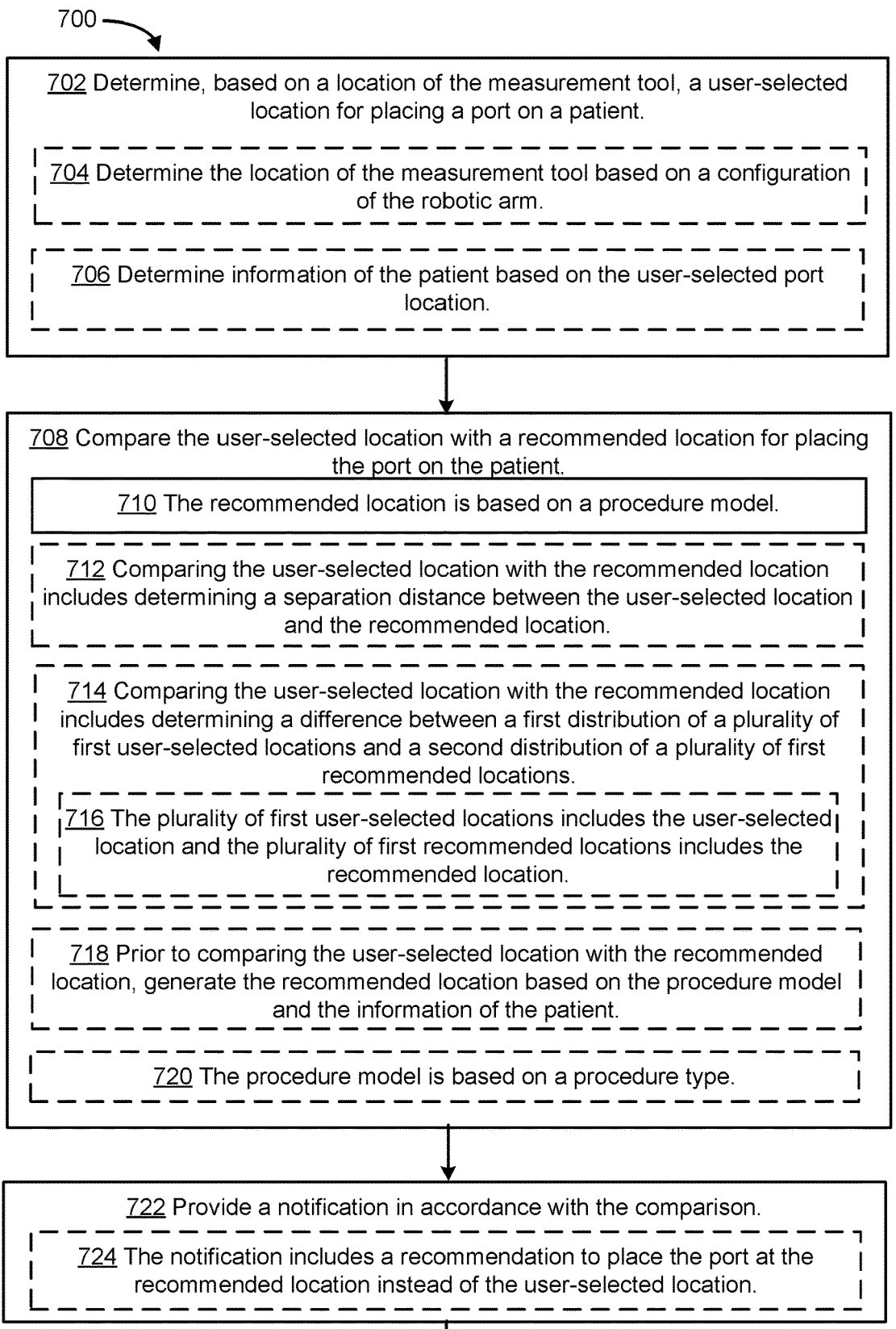
FIG. 32A to 32D illustrate a flow diagram for a method performed by one or more processors of a robotic medical system, in accordance with some embodiments.
Figure 32B:
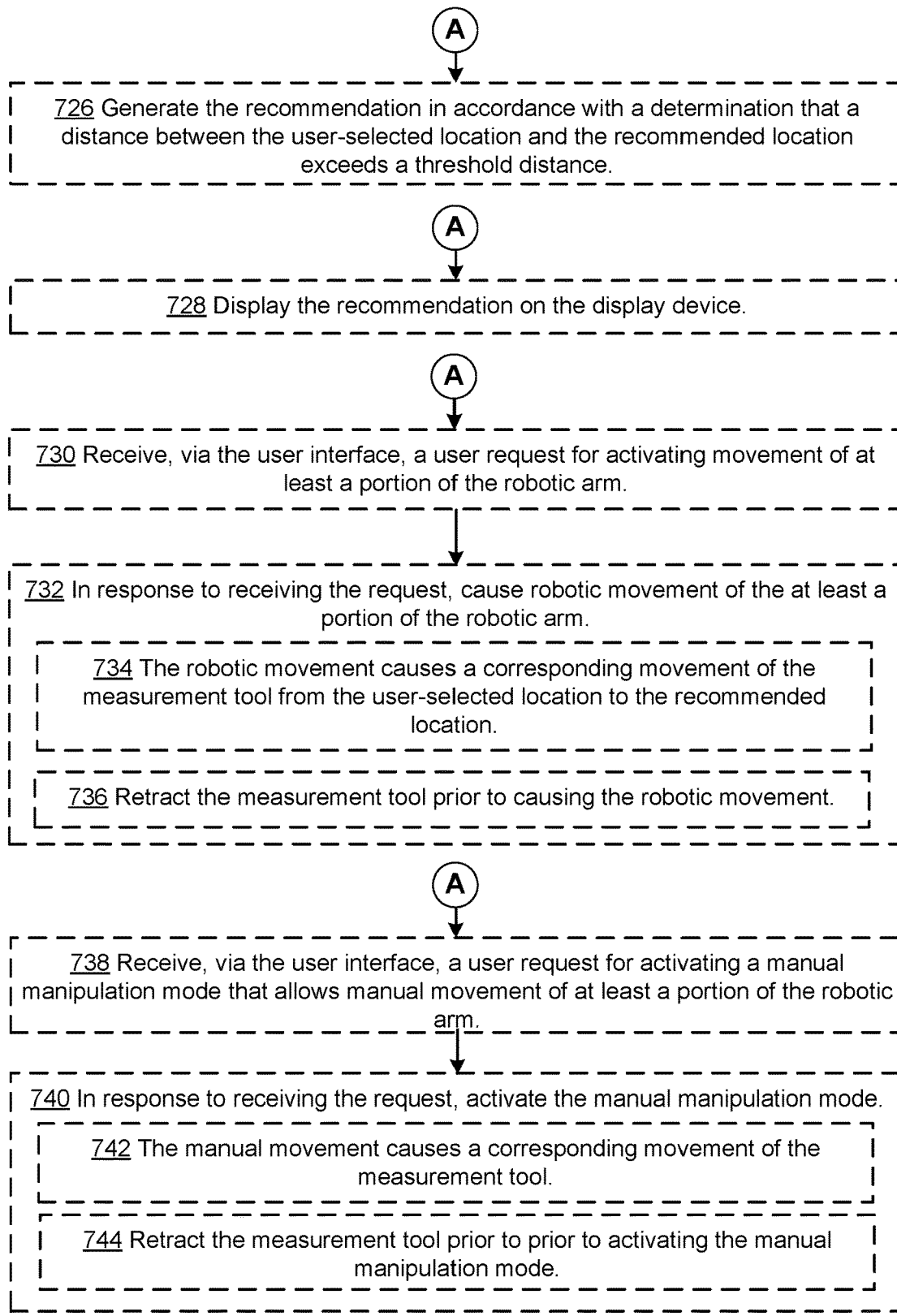
Figure 32C:
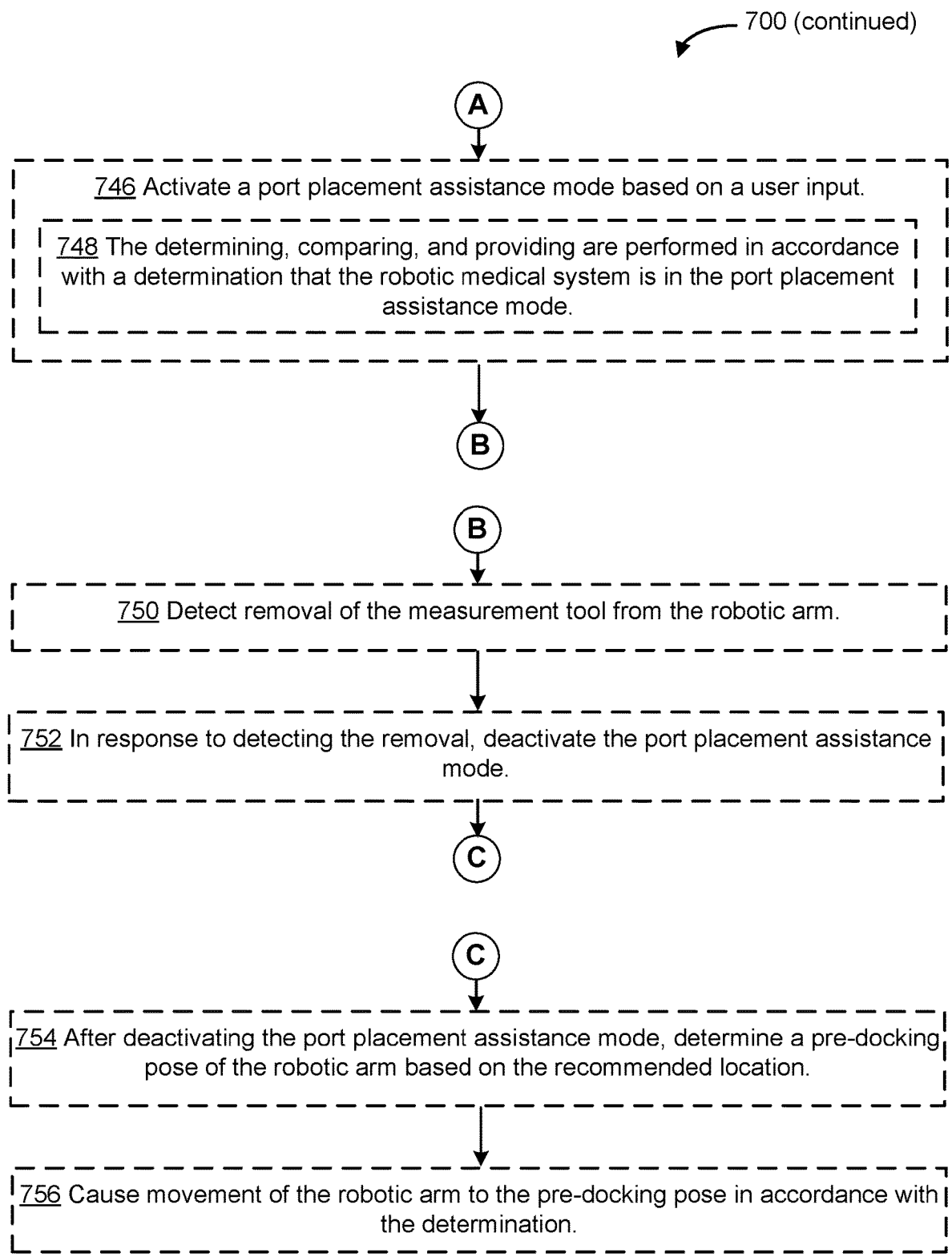
Figure 32D:
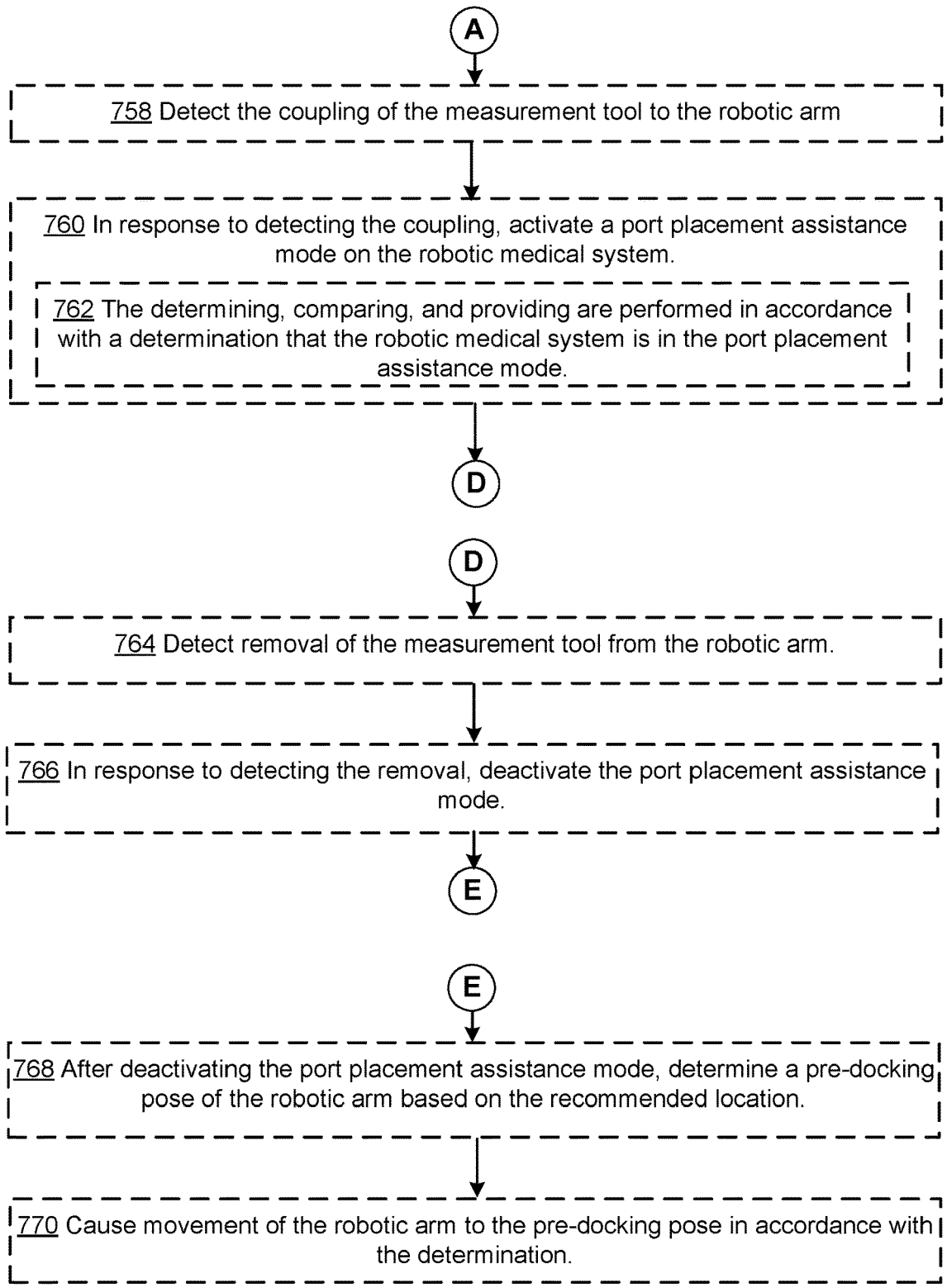
Figure 33A:
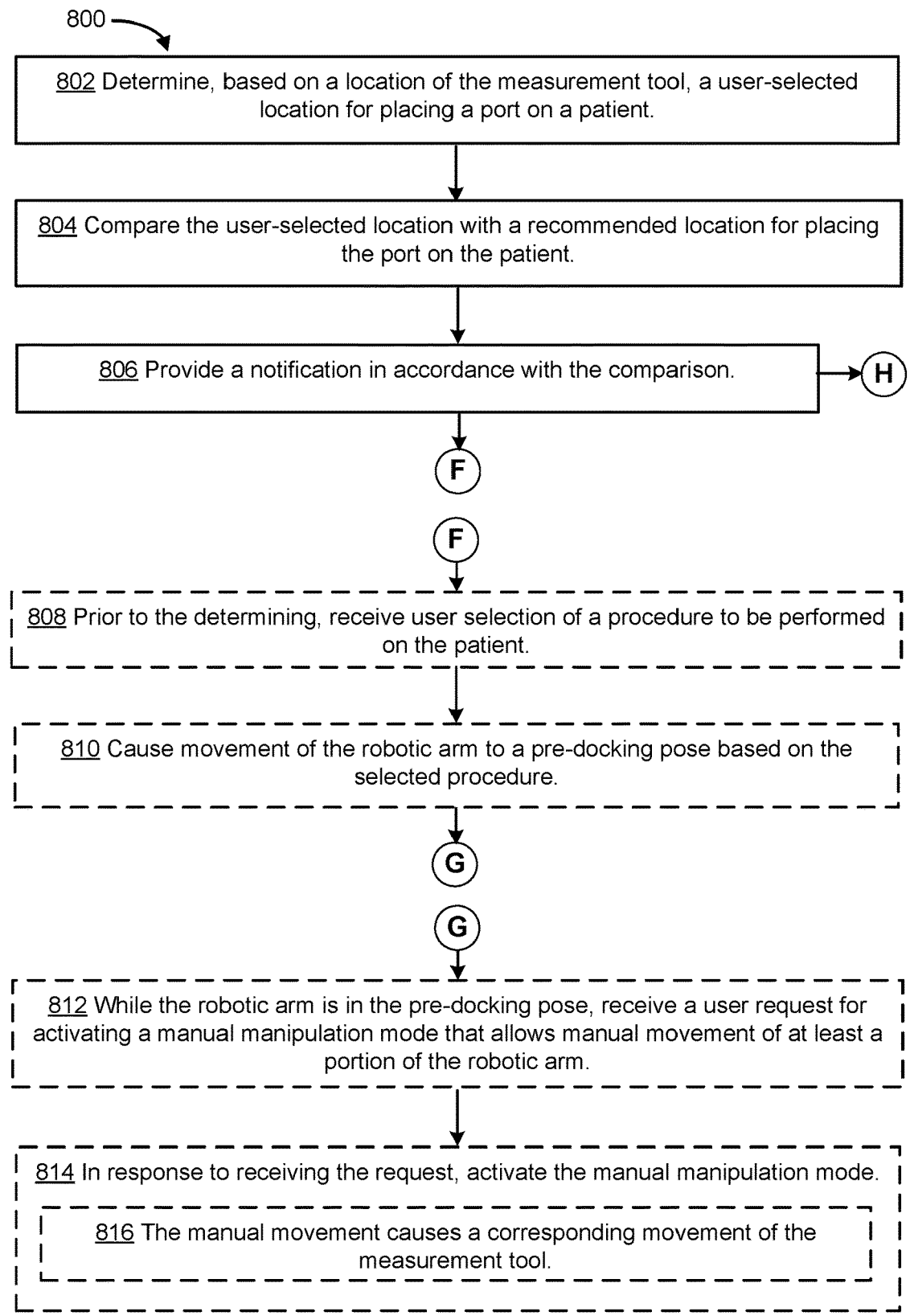
FIG. 33A to 33D illustrate a flow diagram for a method performed by one or more processors of a robotic medical system, in accordance with some embodiments.
Figure 33B:
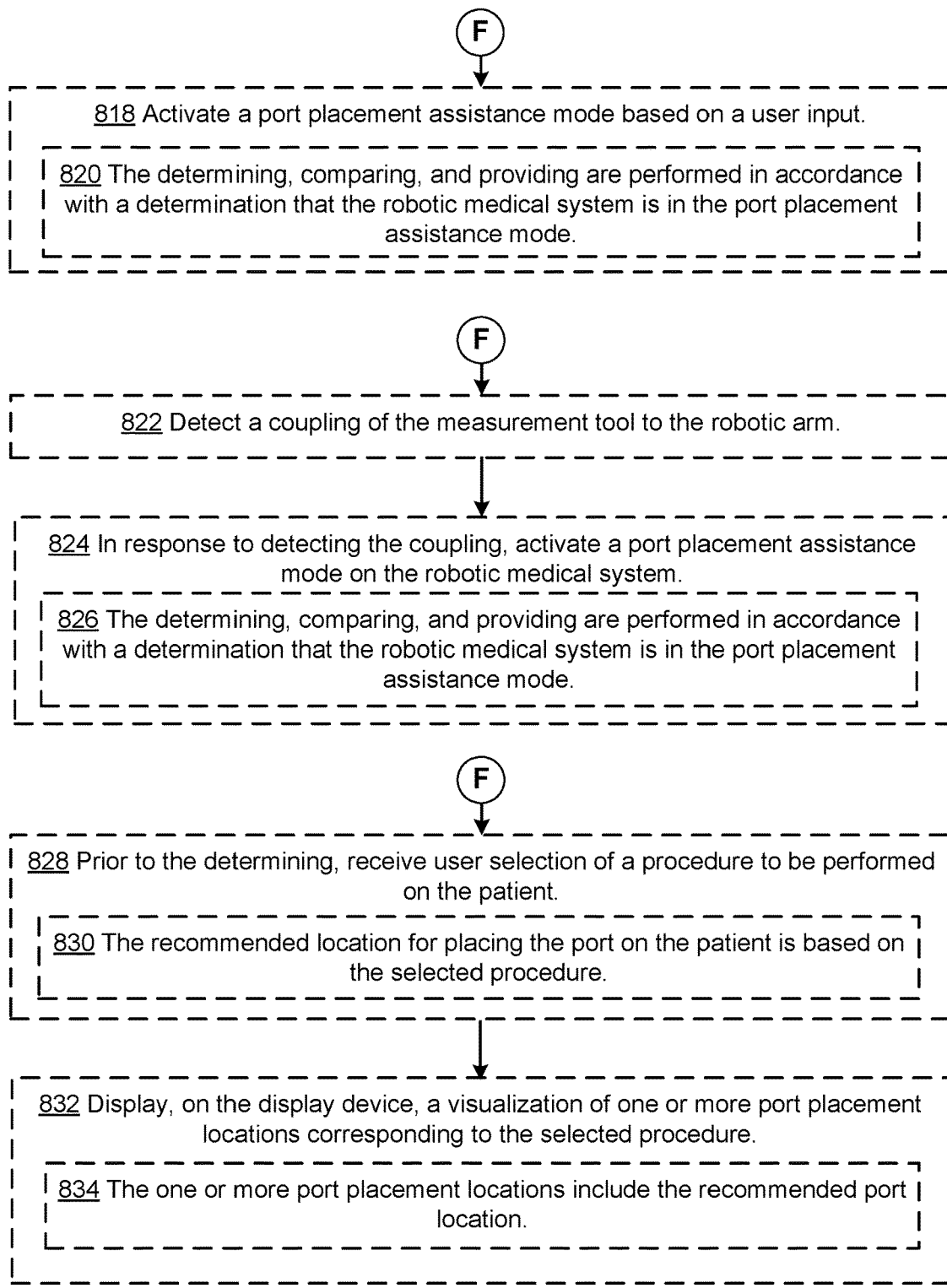
Figure 33C:
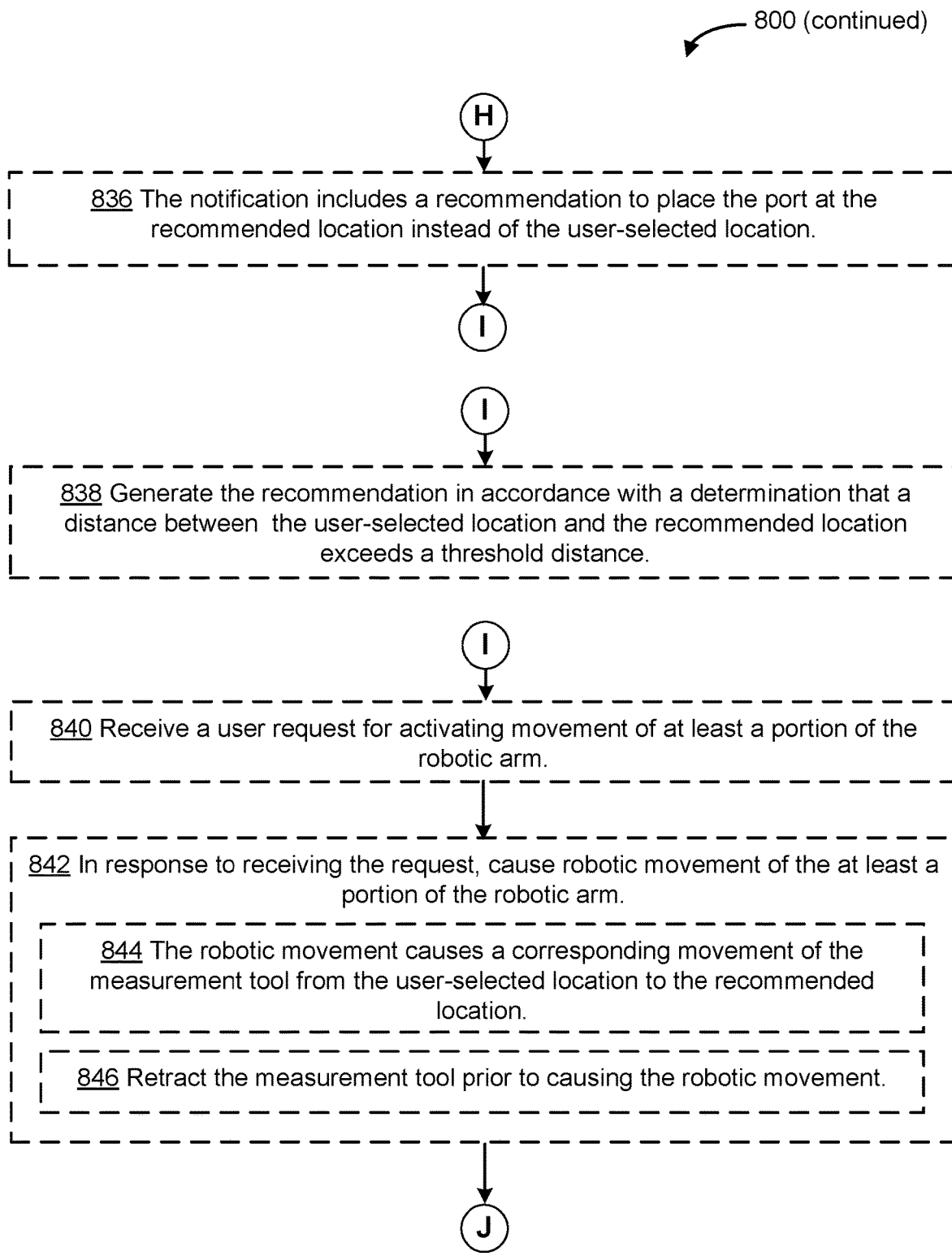
Figure 33D:
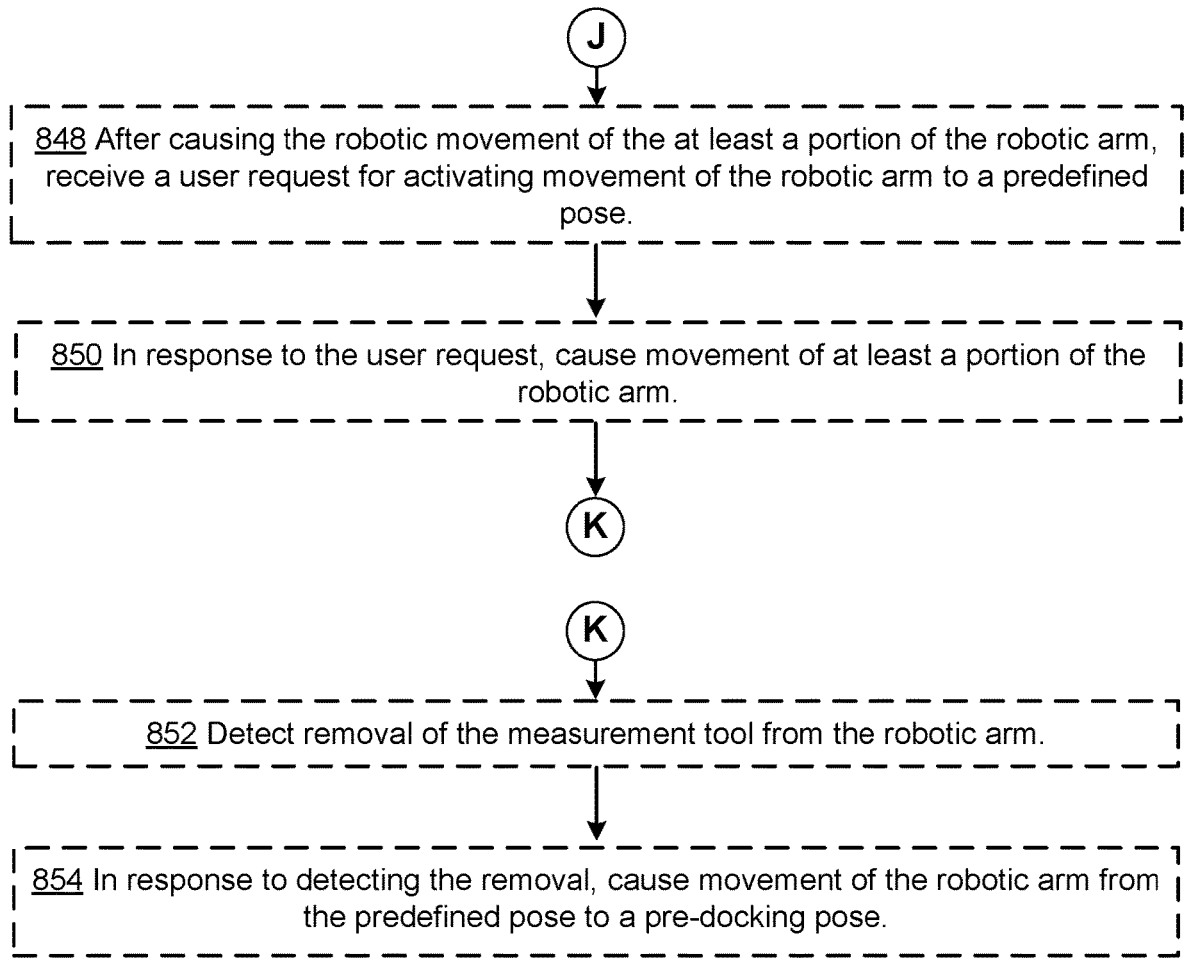

FIG. 31D illustrates a partial view of a measurement tool 640 according to some embodiments. In the example of FIG. 31D, the measurement tool 640 includes a measurement tip 646 (e.g., a soft tip, tip 616, tip 636, etc.), a marker assembly 642 for marking port location(s) on a patient, and a marker dye and pattern 644 that interacts with a patient (e.g., the marker dye and pattern 644 are used to leave a marking on the patient).

Referring back to the workflow 500 in FIG. 30, in some embodiments, the robotic medical system 200 initiates (504) (e.g., activates) the port placement assistance mode (e.g., port guidance mode). In some embodiments, the robotic medical system 200 initiates (504) (e.g., activates) the port placement assistance mode (e.g., port guidance mode) in accordance with a determination (502) (e.g., detection) that a measurement tool is coupled to a robotic arm. For example, an operator can install a measurement tool onto a cannula latch of a robotic arm. The measurement tool can include a unique identifier that is tracked via a RFID tag. After the measurement tool is latched to a robotic arm 210, the robotic medical system 200 (e.g., via the one or more processors 380) can identify the presence of the measurement tool on the robotic arm 210 as well as the tool type (e.g., contact, non-contact, etc.) to which it corresponds. In some embodiments, the robotic medical system automatically activates the port placement assistance mode in accordance with a determination that a measurement tool has been coupled to (e.g., installed on) a robotic arm.

In some embodiments, the robotic medical system 200 initiates (504) the port placement assistance mode based on a user input that is received via a display device 238 or a user interface located on the tower 230 or the physician console 240, or via a physical button that is located on the robotic medical system 200. For example, where a cannula or an integrated non-contact sensor is used as a measurement tool, the robotic medical system 200 may initiate the port placement assistance mode based on the user input.

In some embodiments, when a stylus is used as a measurement tool, the robotic medical system 200 can include a software mode that enables the robotic medical system 200 to initiate port placement assistance. For example, the robotic medical system 200 may determine that the stylus has been coupled to a robotic arm, and initiate the port placement assistance.

The robotic medical system 200 can determine one or more port locations based on a surgical procedure to be performed on the patient (e.g., the port locations may be procedure-specific, and may not have been customized for a particular patient). For example, the robotic medical system 200 may retrieve one or more port locations corresponding to a surgical procedure from database storing port locations for different surgical procedures. In some embodiments, the robotic medical system 200 displays a visualization of the port placement location(s) on a display device or a user interface.

The workflow 500 includes, in step 506, receiving patient parameters from a user. For example, a user can input parameters such as patient location on the bed (508), patient size (510), etc. In some embodiments, and as described earlier, the robotic medical system 200 can infer information such as patient location, patient size, etc., based on the location and position and/or orientation of the measurement tip on the patient's surface. For example, the robotic medical system 200 may determine a distance between two measured locations on the patient surface and scale the determined distance to calculate the patient size. In another example, the robotic medical system 200 may determine a mid-point between two measured locations on the patient surface and use the mid-point as a representative patient location. In yet another example, the robotic medical system 200 may use a first measured location on the patient surface as a representative patient location and a direction from the first measured location to a second measured location on the patient surface as an orientation of the patient.

In some embodiments, the robotic medical system 200 represents the port location(s) as coordinates in a coordinate system of the robotic medical system 200. This is illustrated as step 512 of the workflow 500. For example, the robotic medical system 200 can include a robot coordinate system, a coordinate frame, a system frame, etc., and respective positions of the patient support platform 202, the robotic arms 210, the adjustable arm supports 220, and/or instruments 212 can be represented as coordinates (e.g., x-, y-, and z-coordinates) on the coordinate system.

The workflow 500 includes, in step 514, causing movement of the robotic arm to a user-selected (e.g., user-intended) port location. For example, the user (e.g., physician or physician assistant) can manually move the robotic arm (coupled with the measurement tool) to the user-selected port location via admittance mode or impedance mode. The user-selected port location is a position on the patient's body where the physician intends an incision to be made. In some embodiments, the user-selected port location is determined (e.g., by a user) according to the visualization of the port placement location(s).

The robotic medical system 200 determines (516) (e.g., computes) the measurement tool tip location. In some embodiments, determining the measurement tool tip location includes determining translation and/or orientation information of the measurement tool tip. In some embodiments, the robotic medical system 200 can determine the measurement tool tip (e.g., measurement tool) location based on (i) a pose (position and orientation)/location of the measurement tool and/or (ii) a dimension or a measurement output of the tool (e.g., derived from kinematic calculations).

As illustrated in FIG. 31B, in some embodiments, the measurement tool tip location corresponds to the point of contact between the measurement tool and an exterior surface (e.g., the skin) of the patient. In some embodiments, the measurement tool tip corresponds to (e.g., coincides with, or is in proximate to) the user-selected port location.

In some embodiments, the workflow 500 includes, in step 518, determining whether the measurement tool (e.g., the robotic arm coupled thereto) has reached a desired (e.g., recommended) location.

For example, in some embodiments, the robotic medical system 200 compares (e.g., matches) (e.g., automatically or manually based on a user input) the measurement tool tip location (e.g., that is determined in step 516) with a recommended port location that is determined according to a procedure development model. In some embodiments, the procedural model is combined with statistical modeling and machine learning techniques.

With continued reference to FIG. 30, in some embodiments, in accordance with a determination that the user-selected location (e.g., the measurement tool tip location) deviates from the recommended location (step 520), the robotic medical system 200 can provide a recommendation to the user as to how to reconcile the difference. For example, the robotic medical system 200 can display the current measurement tip location, the recommended port location, and/or a visual comparison of the current tip location and the recommended port location.

In some embodiments, the robotic medical system 200 can provide one or more options to the user about whether to move the port location. For example, the one or more options can include an option for the user to move the robotic arm and its associated measurement tip to the recommended location manually, whereby the user moves the robotic arm and measurement tip closer to the recommended location or (ii) automatically, whereby the robotic medical system automatically causes movement (e.g., robotic movement) of the robotic arm and measurement tip to the recommended location. This is illustrated in step 522 of the workflow 500.

In some embodiments, prior to the movement of the robotic arm and measurement tip, the robotic medical system 200 retracts the measurement tool so as to avoid contact with the patient during the movement of the robotic arm. In some embodiments, the robotic medical system 200 can monitor the robotic arm for abnormal forces (e.g., unexpected contact) during the movement of the robotic arm. In some embodiments, the robotic medical system includes a plurality of robotic arms, each coupled to a respective measurement tool. The robotic arms can move simultaneously to their respective locations.

With continued reference to FIG. 30, in some embodiments, once the robotic arm (and its corresponding measurement tool) reaches the recommended port location (e.g., the desired location) in step 524, the location can be (e.g., visually) marked (526) on the patient (e.g., by a user or with the robotic arm) (e.g., using a writing tool, such as a marker, or a marker assembly 642 included with the measurement tool).

In some embodiments, the robotic medical system 200 can cause movement of the robotic arm to a pre-defined pose (in step 528) so that the surgeon can make incisions on the patient. For example, in the pre-defined pose, the measurement tool may be moved off the patient. The user (e.g., surgeon) can remove the measurement tool, place a cannula in the incisions, activate the system back to its pre-docking pose, and continue the docking workflow (e.g., continue with step 408 of FIG. 25).

D. Exemplary Processes for Port Placement Assistance.

FIGS. 32A to 32D illustrate a flowchart diagram for a method 700 performed by one or more processors (e.g., processors 380) of a robotic medical system (e.g., the robotic medical system 200 as illustrated in FIGS. 21, 22, 26, 28, and 29 or a robotic surgery platform, etc.), in accordance with some embodiments. The robotic medical system 200 comprises memory that stores instructions for execution by the one or more processors.

The robotic medical system includes a robotic arm (e.g., a robotic manipulator) (e.g., the robotic arm 210 in FIGS. 21, 22, 24A, 24B, 24C, 27A, 27B, 28, 29, and 31B). The robotic medical system includes a measurement tool (e.g., measurement tool 610, 630, or 640) coupled to the robotic arm. In some embodiments, the robotic arm is coupled to an instrument (e.g., a medical tool, a cannula, etc.) (e.g., for performing a medical procedure on a patient). In some embodiments, the robotic medical system includes an adjustable arm support (e.g., arm support or bar 220) to which the robotic arm is coupled.

The robotic medical system 200 determines (702) (e.g., detects), based on a location (e.g., a position, an orientation, and/or a pose) of the measurement tool (and/or a configuration of the robotic arm), a user-selected location (e.g., a user-selected port location) for placing a port on a patient (e.g., a patient of the robotic medical system, on a patient support platform).

In some embodiments, the robotic medical system 200 determines (704) the location of the measurement tool based on a configuration (or a pose) of the robotic arm (e.g., using one or more sensors 388).

In some embodiments, the robotic medical system 200 determines (706) information of the patient (e.g., patient fixation, patient size) based on the user-selected port location.

The robotic medical system 200 compares (708) the user-selected location with a recommended location for placing the port on the patient. The recommended location is (710) based on a procedure model.

In some embodiments, comparing the user-selected location with the recommended location includes determining (712) a separation distance (and/or a separation angle, etc.) between the user-selected location and the recommended location.

In some embodiments, comparing the user-selected location with the recommended location includes determining (714) a difference between a first distribution of a plurality of first user-selected locations and a second distribution of a plurality of first recommended locations. The plurality of first user-selected locations includes (716) the user-selected location and the plurality of first recommended locations includes the recommended location.

In some embodiments, prior to comparing the user-selected location with the recommended location, the robotic medical system 200 generates (718) the recommended location based on the procedure model and the information of the patient.

In some embodiments, the procedure model is (720) based on a procedure type. In some embodiments, the procedure model identifies one or more (e.g., predefined) port locations associated with a respective procedure type. In some embodiments, the procedure model is combined with machine learning or statistical modeling.

The robotic medical system provides (722) (e.g., generates and outputs) a notification (to a user of the robotic medical system) in accordance with the comparison.

In some embodiments, the notification includes (724) a recommendation to place (e.g., adjust) the port at the recommended location instead of the user-selected location.

In some embodiments, the robotic medical system 200 generates (726) the recommendation in accordance with a determination that a distance between the user-selected location and the recommended location exceeds a threshold distance.

In some embodiments, the robotic medical system includes a display device (e.g., display device 238, displays 381, etc.) (e.g., for displaying a user interface). The robotic medical system 200 displays (728) the recommendation (e.g., in the user interface) on the display device.

In some embodiments, the robotic medical system provides a user interface for moving the robotic arm. For example, the user interface can be an interface (e.g., a graphical user interface) that is displayed on the display device 238 or on the displays 381, or aa physical user interface. The robotic medical system 200 receives (730), via the user interface, a user request for activating movement (e.g., robotic movement, user-guided or user-supervised robotic movement) of at least a portion of the robotic arm. In response to receiving the request, the robotic medical system 200 causes (732) robotic movement of the at least a portion of the robotic arm. The robotic movement causes (734) a corresponding movement of the measurement tool from the user-selected location to the recommended location.

In some embodiments, the robotic medical system 200 retracts (736) the measurement tool prior to causing the robotic movement (e.g., so that the measurement tool does not contact the patient). For example, the robotic medical system 200 can retract the measurement tool by pulling back the end effector of the robotic arm.

In some embodiments, the robotic medical system provides a user interface (e.g., a graphical user interface displayed on the display device or a physical user interface) for moving the robotic arm. The robotic medical system 200 receives (738), via the user interface, a user request for activating a manual manipulation mode (e.g., admittance mode or impedance mode) that allows manual movement of at least a portion of the robotic arm. In response to receiving the request, the robotic medical system activates (740) the manual manipulation mode. The manual movement causes (742) a corresponding movement of the measurement tool (e.g., from the user-selected location to the recommended location). In some embodiments, the robotic medical system 200 retracts (744) the measurement tool prior to activating the manual manipulation mode.

In some embodiments, the robotic medical system activates (746) a port placement assistance mode based on a user input (e.g., that is received via a user interface). The determining, comparing, and providing are performed (748) in accordance with (in response to) a determination that the robotic medical system is in the port placement assistance mode.

In some embodiments, the robotic medical system 200 detects (750) removal of the measurement tool from the robotic arm (or replacement of the measurement tool with a surgical tool). In response to detecting the removal (or replacement), the robotic medical system 200 deactivates (752) the port placement assistance mode.

In some embodiments, after deactivating the port placement assistance mode, the robotic medical system 200 determines (754) a pre-docking pose of the robotic arm based on the recommended location. The robotic medical system 200 causes (756) movement of the robotic arm to the pre-docking pose in accordance with the determination.

In some embodiments, the robotic medical system 200 detects (758) the coupling of the measurement tool to the robotic arm. In response to detecting the coupling, the robotic medical system activates (760) a port placement assistance mode on the robotic medical system 200. The determining, comparing, and providing are performed (762) in accordance with (in response to) a determination that the robotic medical system is in the port placement assistance mode.

In some embodiments, the robotic medical system 200 detects (764) removal of the measurement tool from the robotic arm (or replacement of the measurement tool with a surgical tool. In response to detecting the removal (or the replacement), the robotic medical system 200 deactivates (766) the port placement assistance mode.

In some embodiments, after deactivating the port placement assistance mode, the robotic medical system 200 determines (768) a pre-docking pose of the robotic arm based on the recommended location. The robotic medical system 200 causes (770) movement of the robotic arm to the pre-docking pose in accordance with the determination.

FIGS. 33A to 33D illustrate a flowchart diagram for a method 800 performed by one or more processors (e.g., processors 380) of a robotic medical system (e.g., the robotic medical system 200 as illustrated in FIGS. 21, 22, 26, 28, and 29 or a robotic surgery platform, etc.), in accordance with some embodiments. The robotic medical system 200 comprises memory that stores instructions for execution by the one or more processors.

The robotic medical system includes a robotic arm (e.g., a robotic manipulator) (e.g., the robotic arm 210 in FIGS. 21, 22, 24A, 24B, 24C, 27A, 27B, 28, 29, and 31B). The robotic medical system includes a measurement tool (e.g., measurement tool 610, 630, or 640) coupled to the robotic arm. In some embodiments, the robotic arm is coupled to an instrument (e.g., a medical tool, a cannula, etc.) (e.g., for performing a medical procedure on a patient). In some embodiments, the robotic medical system includes an adjustable arm support (e.g., arm support or bar 220) to which the robotic arm is coupled.

The robotic medical system 200 determines (802), based on a location of the measurement tool, a user-selected location for placing a port on a patient.

The robotic medical system 200 compares (804) the user-selected location with a recommended location for placing the port on the patient. The recommended location is based on a procedure model.

The robotic medical system provides (806) a notification in accordance with the comparison.

In some embodiments, prior to the determining, the robotic medical system 200 receives (808) user selection of a procedure to be performed on the patient. The robotic medical system 200 causes (810) movement of the robotic arm to a pre-docking pose based on the selected procedure. In some embodiments, causing movement of the robotic arm to the pre-docking pose includes deploying the robotic arm and placing it in an initial position and/or orientation. In the pre-docking pose, port incisions have not been made on the patient.

In some embodiments, while the robotic arm is in the pre-docking pose, the robotic medical system 200 receives (812) a user request for activating a manual manipulation mode (e.g., admittance mode or impedance mode) that allows manual movement of at least a portion of the robotic arm (e.g., from the pre-docking pose to the user-selected port location). In response to receiving the request, the robotic medical system activates (814) the manual manipulation mode (e.g., thereby enabling user movement of the robotic arm from the pre-docking pose to the user-selected port location). The manual movement causes (816) a corresponding movement of the measurement tool (e.g., to the user-selected port location).

In some embodiments, the robotic medical system activates (818) a port placement assistance mode based on a user input. The determining, comparing, and providing are performed (820) in accordance with a determination that the robotic medical system is in the port placement assistance mode.

In some embodiments, the robotic medical system 200 detects (822) a coupling of the measurement tool to the robotic arm. In response to detecting the coupling, the robotic medical system (e.g., via the one or more processors 380) activates (824) a port placement assistance mode on the robotic medical system 200. The determining, comparing, and providing are performed (826) in accordance with a determination that the robotic medical system is in the port placement assistance mode.

In some embodiments, the robotic medical system includes a display device (e.g., display device 238, displays 381, etc.). Prior to the determining, the robotic medical system 200 receives (828) user selection of a procedure to be performed on the patient. The recommended location for placing the port on the patient is based on (830) the selected procedure. The robotic medical system 200 displays (832), on the display device (e.g., via a user interface), a visualization of one or more port placement locations corresponding to the selected procedure. The one or more port placement locations include (834) the recommended port location.

In some embodiments, the notification includes (836) a recommendation to place (e.g., adjust) the port at the recommended location instead of the user-selected location.

In some embodiments, the robotic medical system 200 generates (838) the recommendation in accordance with a determination that the user-selected location and the recommended location exceeds a threshold distance.

In some embodiments, the robotic medical system 200 receives (840) (e.g., via a display device or a user interface of the robotic medical system) a user request for activating movement (e.g., robotic movement, user-guided or user-supervised robotic movement) of at least a portion of the robotic arm (to move the robotic arm from the user-selected location to the recommended location). In response to receiving the request, the robotic medical system 200 causes (842) robotic movement of the at least a portion of the robotic arm. The robotic movement causes (844) a corresponding movement of the measurement tool from the user-selected location to the recommended location.

In some embodiments, the method 800 includes (visually) marking the recommended location (e.g., by a user or with the robotic arm) (e.g., using a writing tool, such as a marker, or using a marker assembly 642 included with the measurement tool) after movement of the robotic arm and measurement tool from the user-selected location to the recommended location.

In some embodiments, the method 800 includes detecting (e.g., using a load cell 632, one or more sensors 388, etc.) one or more forces applied on the robotic arm or the measurement tool during the robotic movement.

In some embodiments, the method 800 includes determining that the one or more forces applied on the robotic arm or the measurement tool exceed a predefined threshold.

In some embodiments, the robotic medical system includes two or more measurement tools. Each of the two or more measurement tools can be coupled to a respective robotic arm. The method 800 includes causing concurrent robotic movement of a plurality of robotic arms, including the robotic movement of the at least a portion of the robotic arm. In some embodiments, the concurrent robotic movement of the plurality of robotic arms causes concurrent movement of associated measurement tools to respective recommended locations, including the corresponding movement of the measurement tool to the recommended location.

In some embodiments, the robotic medical system 200 retracts (846) the measurement tool prior to causing the robotic movement.

In some embodiments, after causing the robotic movement of the at least a portion of the robotic arm, the robotic medical system 200 receives (848) a user request for activating movement of the robotic arm to a predefined pose (e.g., so that the surgeon can make incisions). In response to the user request, the robotic medical system 200 causes (850) movement of at least a portion of the robotic arm (e.g., from the recommended location to the predefined pose).

In some embodiments, the robotic medical system 200 detects (852) removal of the measurement tool from the robotic arm (or replacement of the measurement tool with a surgical tool). In response to detecting the removal (or replacement), the robotic medical system 200 causes (854) movement of the robotic arm from the predefined pose to a pre-docking pose.

In some embodiments, in response to the detecting the removal, the robotic medical system 200 deactivates the port placement assistance mode.

3. Implementing Systems and Terminology

Figure 34:
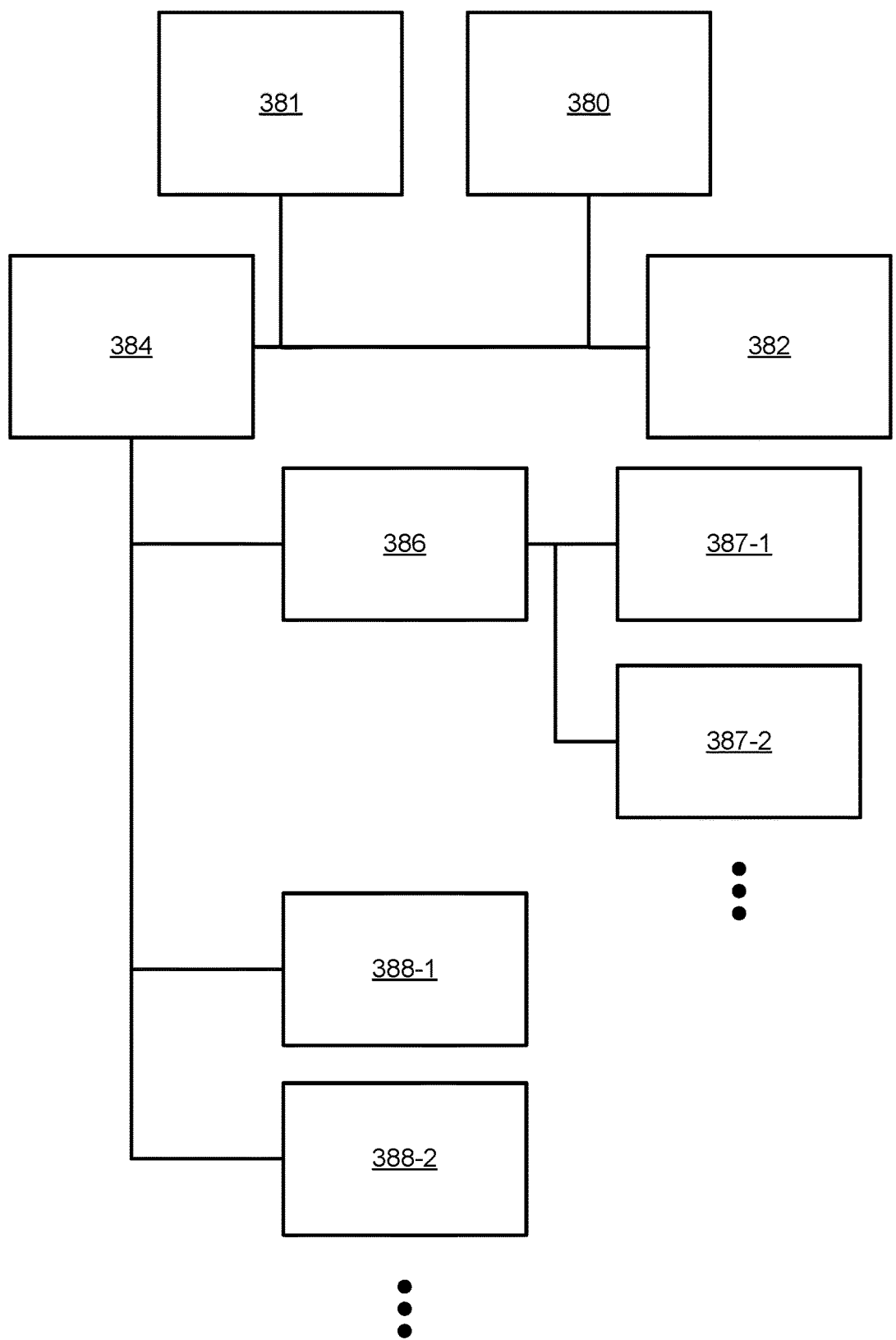
FIG. 34 is a schematic diagram illustrating electronic components of a robotic medical system in accordance with some embodiments.

FIG. 34 is a schematic diagram illustrating electronic components of a robotic medical system in accordance with some embodiments.

The robotic medical system includes one or more processors 380, which are in communication with a computer readable storage medium 382 (e.g., computer memory devices, such as random-access memory, read-only memory, static random-access memory, and non-volatile memory, and other storage devices, such as a hard drive, an optical disk, a magnetic tape recording, or any combination thereof) storing instructions for performing any methods described herein (e.g., operations described with respect to FIGS. 25, 26, 27A, 27B, 28, 29, 30, 31A to 31D, 32A to 32D, and 33A to 33D). The one or more processors 380 are also in communication with an input/output controller 384 (via a system bus or any suitable electrical circuit). The input/output controller 384 receives sensor data from one or more sensors 388-1, 388-2, etc., and relays the sensor data to the one or more processors 380. The input/output controller 384 also receives instructions and/or data from the one or more processors 380 and relays the instructions and/or data to one or more actuators, such as first motors 387-1 and 387-2, etc. In some embodiments, the input/output controller 384 is coupled to one or more actuator controllers 386 and provides instructions and/or data to at least a subset of the one or more actuator controllers 386, which, in turn, provide control signals to selected actuators. In some embodiments, the one or more actuator controller 386 are integrated with the input/output controller 384 and the input/output controller 384 provides control signals directly to the one or more actuators 387 (without a separate actuator controller). Although FIG. 34 shows that there is one actuator controller 386 (e.g., one actuator controller for the entire robotic medical platform, in some embodiments, additional actuator controllers may be used (e.g., one actuator controller for each actuator, etc.). In some embodiments, the one or more processors 380 are in communication with one or more displays 381 for displaying information (e.g., recommended port locations) as described herein.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The functions for transitioning to a port placement assistance mode described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the embodiments shown herein but is to be accorded the widest scope consistent with the principles and novel features disclosed herein.

What is claimed is:

1. A robotic medical system, comprising:
   a robotic arm;
   a measurement tool coupled to the robotic arm;
   a user interface for moving the robotic arm;
   one or more processors; and
   memory storing instructions that, when executed by the one or more processors, cause the one or more processors to:
   determine, based on a location of the measurement tool, a user-selected location for placing a port on a patient;
   compare the user-selected location with a recommended location for placing the port on the patient, wherein the recommended location is based on a procedure model;

provide a notification in accordance with the comparison;

receive, via the user interface, a user request for activating a manual manipulation mode that allows manual movement of at least a portion of the robotic arm; and in response to receiving the request, activate the manual manipulation mode, wherein the manual movement causes a corresponding movement of the measurement tool.

2. The robotic medical system of claim 1, wherein the notification includes a recommendation to place the port at the recommended location instead of the user-selected location.

3. The robotic medical system of claim 2, wherein:

the memory further includes instructions that, when executed by the one or more processors, cause the one or more processors to:

generate the recommendation in accordance with a determination that a distance between the user-selected location and the recommended location exceeds a threshold distance.

4. The robotic medical system of claim 2, further comprising:

a display device; and the memory further includes instructions that, when executed by the one or more processors, cause the one or more processors to:

display the recommendation on the display device.

5. The robotic medical system of claim 1, wherein:

the memory further includes instructions that, when executed by the one or more processors, cause the one or more processors to:

receive, via the user interface, a user request for activating movement of at least a portion of the robotic arm; and in response to receiving the request, cause robotic movement of the at least a portion of the robotic arm, wherein the robotic movement causes a corresponding movement of the measurement tool from the user-selected location to the recommended location.

6. The robotic medical system of claim 5, wherein: the memory further includes instructions that, when executed by the one or more processors, cause the one or more processors to: retract the measurement tool prior to causing the robotic movement.

7. The robotic medical system of claim 1, wherein:

the memory further includes instructions that, when executed by the one or more processors, cause the one or more processors to:

retract the measurement tool prior to activating the manual manipulation mode.

8. The robotic medical system of claim 1, wherein:

comparing the user-selected location with the recommended location includes one of:

determining a separation distance between the user-selected location and the recommended location; or determining a difference between a first distribution of a plurality of first user-selected locations and a second distribution of a plurality of first recommended locations, wherein the plurality of first user-selected locations includes the user-selected location and the plurality of first recommended locations includes the recommended location.

9. The robotic medical system of claim 1, wherein:

the memory further includes instructions that, when executed by the one or more processors, cause the one or more processors to:

determine the location of the measurement tool based on a configuration of the robotic arm.

10. The robotic medical system of claim 1, wherein:

the memory further includes instructions that, when executed by the one or more processors, cause the one or more processors to:

determine information of the patient based on the user-selected location for placing the port; and prior to comparing the user-selected location with the recommended location, generate the recommended location based on the procedure model and the information of the patient.

11. The robotic medical system of claim 1, wherein:

the memory further includes instructions that, when executed by the one or more processors, cause the one or more processors to:

activate a port placement assistance mode based on a user input, wherein the determining, comparing, and providing are performed in accordance with a determination that the robotic medical system is in the port placement assistance mode.

12. The robotic medical system of claim 11, wherein:

the memory further includes instructions that, when executed by the one or more processors, cause the one or more processors to:

detect removal of the measurement tool from the robotic arm; and in response to detecting the removal, deactivate the port placement assistance mode.

13. The robotic medical system of claim 1, wherein:

the memory further includes instructions that, when executed by the one or more processors, cause the one or more processors to:

detect the coupling of the measurement tool to the robotic arm; and in response to detecting the coupling, activate a port placement assistance mode on the robotic medical system, wherein the determining, comparing, and providing are performed in accordance with a determination that the robotic medical system is in the port placement assistance mode.

14. The robotic medical system of claim 13, wherein:

the memory further includes instructions that, when executed by the one or more processors, cause the one or more processors to:

detect removal of the measurement tool from the robotic arm; and in response to detecting the removal, deactivate the port placement assistance mode.

15. The robotic medical system of claim 14, wherein:

the memory further includes instructions that, when executed by the one or more processors, cause the one or more processors to:

after deactivating the port placement assistance mode:

determine a pre-docking pose of the robotic arm based on the recommended location; and cause movement of the robotic arm to the pre-docking pose in accordance with the determination.

16. The robotic medical system of claim 1, wherein the measurement tool comprises at least one of:
- a cannula for making a physical contact with a patient, or
- a stylus for making a physical contact with a patient.

17. The robotic medical system of claim 1, wherein the measurement tool comprises a laser or a sensor coupled to a distal end of the robotic arm, the laser or the sensor capable of locating a surface on a patient without a physical contact with the patient.

18. A method performed by a medical robotic system including a robotic arm, a user interface for moving the robotic arm, and a measurement tool coupled to the robotic arm, the method comprising:
- determining, based on a location of the measurement tool, a user-selected location for placing a port on a patient;
- comparing the user-selected location with a recommended location for placing the port on the patient, wherein the recommended location is based on a procedure model;
- providing a notification in accordance with the comparison;
- receiving, via the user interface, a user request for activating movement of at least a portion of the robotic arm; and
- in response to receiving the request, causing robotic movement of the at least a portion of the robotic arm, wherein the robotic movement causes a corresponding movement of the measurement tool from the user-selected location to the recommended location.

19. A robotic medical system, comprising:
- a robotic arm;
- a measurement tool coupled to the robotic arm;
- one or more processors; and
- memory storing instructions that, when executed by the one or more processors, cause the one or more processors to:
  - determine, based on a location of the measurement tool, a user-selected location for placing a port on a patient;
  - compare the user-selected location with a recommended location for placing the port on the patient, wherein the recommended location is based on a procedure model;
  - provide a notification in accordance with the comparison;
  - activate a port placement assistance mode based on a user input, wherein the determining, comparing, and providing are performed in accordance with a determination that the robotic medical system is in the port placement assistance mode;
  - detect removal of the measurement tool from the robotic arm;
  - in response to detecting the removal, deactivate the port placement assistance mode; and
  - after deactivating the port placement assistance mode:
    - determine a pre-docking pose of the robotic arm based on the recommended location; and
    - cause movement of the robotic arm to the pre-docking pose in accordance with the determination.

* * * * *